US009166874B2

(12) United States Patent  (10) Patent No.: US 9,166,874 B2
Mizutani  (45) Date of Patent: Oct. 20, 2015

(54) COMMUNICATION NETWORK SYSTEM AND COMMUNICATION NETWORK CONFIGURATION METHOD

(75) Inventor: Masahiko Mizutani, Fujisawa (JP)

(73) Assignee: HITACHI, LTD., Tokyo (JP)

( * ) Notice: Subject to any disclaimer, the term of this patent is extended or adjusted under 35 U.S.C. 154(b) by 210 days.

(21) Appl. No.: 13/825,393

(22) PCT Filed: Oct. 28, 2011

(86) PCT No.: PCT/JP2011/074954
§ 371 (c)(1),
(2), (4) Date: Jun. 13, 2013

(87) PCT Pub. No.: WO2012/114581
PCT Pub. Date: Aug. 30, 2012

(65) Prior Publication Data
US 2013/0258842 A1  Oct. 3, 2013

(30) Foreign Application Priority Data

Feb. 24, 2011 (JP) ................................. 2011-038859

(51) Int. Cl.
*H04L 12/24* (2006.01)
*H04L 12/707* (2013.01)
*H04L 12/703* (2013.01)
*H04L 12/753* (2013.01)

(52) U.S. Cl.
CPC ............ *H04L 41/0668* (2013.01); *H04L 45/22* (2013.01); *H04L 45/28* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 7,308,198 B1 * | 12/2007 | Chudak et al. ................... | 398/58 |
| 8,577,220 B1 * | 11/2013 | Wang et al. ....................... | 398/5 |
| 2008/0219268 A1 * | 9/2008 | Dennison .................... | 370/395.2 |
| 2009/0073988 A1 * | 3/2009 | Ghodrat et al. ........... | 370/395.53 |
| 2012/0127855 A1 * | 5/2012 | Alon et al. ..................... | 370/218 |

FOREIGN PATENT DOCUMENTS

JP  2006/080279 A1  8/2006
JP  2008-219496 A  9/2008

* cited by examiner

*Primary Examiner* — Christine Duong
(74) *Attorney, Agent, or Firm* — Volpe and Koenig, P.C.

(57) ABSTRACT

A redundant path configuration method and a control method are disclosed. An intercommunication path for mutually transmitting and receiving a signal is provided among the BHEs each of which is a top of a tree. When failures occur in an active system path in certain AE, a standby system path (BHE) relays communication between the AE and the (active system) BHE so as to secure continuity of communication. The intercommunication path through which a data signal does not flow in a normal operation is used as a traffic accommodation path in an emergency among the BHEs. By setting a bypass between the tops of the trees, when a failure occurs in one tree, a signal is transferred from the active system BHE to the standby system path in which another BHE is a top to build a sub-tree bypassing the failure point and to secure a communication path.

10 Claims, 37 Drawing Sheets 1110 (A)

| No. | INPUT IF ID 1111 | INPUT ROUTE/ FLOW ID 1112 | OUTPUT IF ID | OUTPUT ROUTE/ FLOW ID 1113 | PRIORITY (W/P) 1114 | FAILURE (Y/N) 1115 | TYPE (W/P) 1116 | OTHER FLAGS 1120 | |
|---|---|---|---|---|---|---|---|---|---|
| | | | | | | | | CORRESPONDING ENTRY 1119 | OTHERS |
| 1 | UNI-i1 | VLAN-j | NNI-k1 | LSP-m2 | H1 | N | W | 2, 3 | |
| 2 | UNI-i2 | VLAN-j | NNI-k2 | LSP-m2 | H2 | N | W | 1, 3 | |
| 3 | UNI-i | VLAN-j | NNI-l | LSP-n | L | N | P | 1, 2 | |
| 4 | NNI-x | LSP-y | UNI-p | VLAN-q | H | N | W | 5 | |
| 5 | NNI-z | LSP-w | UNI-p | VLAN-q | L | N | P | 4 | |

(B)

| INPUT ROUTE/ FLOW ID 1117 | OUTPUT ROUTE/ FLOW ID (W/P) 1118 | OTHER FLAGS 1119 |
|---|---|---|
| UNI-1 | W | |
| UNI-2 | W | |
| ... | | |
| UNI-NDL | P | |
| NNI-1 | VLAN-1 | |
| NNI-2 | VLAN-5 | |
| ... | | |
| NNI-MUL | VLAN-k | |

W/P: Working/Protection [Path or Connection]
NDL: N-th Physical/Logical IF for Downlink
MUL: M-th Physical/Logical IF for Uplink 1110B-1 } APPLY TO INPUT FROM User side
1110B-2 } APPLY TO INPUT FROM Backhaul side

| 1310 | | | | | | | |
|---|---|---|---|---|---|---|---|
| | | | Working Path | | Protection Path | | |
| FLOW ID | COMMUNICATION DIRECTION | INPUT ROUTE ID | OUTPUT ROUTE ID | INPUT ROUTE ID | OUTPUT ROUTE ID | SELECTED SYSTEM (P/W) | OTHER FLAGS |
| Flow-1 | Up | VLAN-j | LSP-m | VLAN-j | LSP-n | W | |
| Flow-2 | Down | LSP-y | VLAN-q | LSP-w | VLAN-q | W | |
| ... | | | | | | | |

| INPUT PHYSICAL IF-ID 1317 | LINE TYPE 1318 | COMMUNICATION DIRECTION 1319 | Logical Path ID 13170 | | SYSTEM TYPE 1398 | OTHER INFORMATION 1399 |
|---|---|---|---|---|---|---|
| | | | INPUT ROUTE ID 13171 | OUTPUT ROUTE ID 13172 | | |
| PHY-1 | GbE | Up | VLAN-j | LSP-m | W | |
| PHY-1 | GbE | Up | VLAN-j | LSP-n | P | |
| PHY-10 | 10GbE | Down | LSP-y | VLAN-q | W | |
| PHY-10 | 10GbE | Down | LSP-w | VLAN-q | P | |
| ... | | | | | | |

(B)

1210

| FLOW ID | LINE TYPE | COMMUNICATION DIRECTION | Logical Path ID | | SYSTEM TYPE | TRANSFER WAITING TIME | OTHER INFORMATION |
| --- | --- | --- | --- | --- | --- | --- | --- |
| | | | INPUT ROUTE ID | OUTPUT ROUTE ID | | | |
| Flow-1 | GbE | Up | VLAN-j | LSP-m | W | 100 msec | |
| Flow-1 | GbE | Up | VLAN-j | LSP-n | P | 100 msec | |
| Flow-2 | 10GbE | Down | LSP-y | VLAN-q | W | 0 | |
| Flow-2 | 10GbE | Down | LSP-w | VLAN-q | P | 0 | |
| ... | | | | | | | |

| 5511 | 5512 | 5513 | 5514 | 5515 | 5516 | 5517 | 5518 | 5519 |
|---|---|---|---|---|---|---|---|---|
| LOGICAL IF ID | LOGICAL PATH ID | ACCOMMODATED FLOW COMMUNICATION DIRECTION | INPUT ROUTE ID | OUTPUT ROUTE ID | TYPE (W/P) | FAILURE (Y/N) | USAGE (C/D) | OTHER FLAGS |
| to171-i1 | LSP-i1 | Up | (PW-A) | VLAN-I | W | N | C | <1> |
| to171-i2 | LSP-i2 | Up | (PW-A) | VLAN-I | P | N | C | <2> |
| to171-j1 | LSP-j1 | Down | (VLAN-X) | PW-B | W | N | C | <3> |
| to171-j2 | LSP-j2 | Down | (VLAN-X) | PW-B | P | N | C | <4> |
| to171-k1 | LSP-k1 | Up | PW-I | (VLAN-Y) | W | N | C | |
| to171-k2 | LSP-k2 | Up | PW-I | (VLAN-Y) | P | N | C | |
| to171-l1 | LSP-l1 | Down | VLAN-Z | (PW-J) | W | N | C | |

...

(B)

| 5510a | 5510b | 5510c | 5510d | |
|---|---|---|---|---|
| RECEPTION DIRECTION | TRANSMISSION DIRECTION | FLOW COMMUNICATION DIRECTION | STANDBY PATH USE (Y/N) | |
| From BHE171 | To CREs | Up | Y | <1> |
| From BHE171 | To AE112 | Down | Y | <2> |
| From AE112 | To BHE171 | Up | Y | <3> |
| From AE112 | To BHE171 | Down | Y | <4> |
| From CREs | To CREs | Up | N | 5510-5 |
| From CREs | To AE112 | Down | N | 5510-6 |

(A) 5310

| FLOW ID 5311 | COMMUNICATION DIRECTION 5312 | Working Path 5313 | | Protection Path 5314 | | SELECTED SYSTEM 5315 | LINE TYPE 5316 | OTHER FLAGS 5399 |
|---|---|---|---|---|---|---|---|---|
| | | INPUT ROUTE ID 5313-1 | OUTPUT ROUTE ID 5313-2 | INPUT ROUTE ID 5314-1 | OUTPUT ROUTE ID 5314-2 | | | |
| F-a | Down | VLAN-Z | LSP-J | VLAN-Z | LSP-M | W | D | |
| F-b | Up | LSP-I | VLAN-Y | LSP-I | LSP-Z | W | D | |
| F-c | Up | LSP-K | VLAN-W | LSP-J | LSP-N | P | C | |
| ... | | | | | | | | |

| PHYSICAL IF-ID | LINE TYPE | IF TYPE/ COMMUNICATION DIRECTION | Logical Path ID | | SYSTEM TYPE | OTHER INFORMATION |
| --- | --- | --- | --- | --- | --- | --- |
| | | | INPUT ROUTE ID | OUTPUT ROUTE ID | | |
| PHY-1 | GbE | Down | VLAN-Z | PW-A | W | |
| PHY-2 | GbE | Down/PP | VLAN-Z | PW-M | P | |
| PHY-3 | 10G-POS | Up | PW-C | VLAN-A | W | |
| PHY-4 | 10G-POS | Up/PP | PW-I | PW-Z | P | |
| PHY-5 | 10GbE | Up/PP | PW-K | VLAN-I | W | |
| PHY-6 | 10GbE | Up/PP | PW-L | VLAN-I | P | |
| ... | | | | | | |

PP: Protection Path

FIG.24

COMMUNICATION NETWORK SYSTEM AND COMMUNICATION NETWORK CONFIGURATION METHOD

TECHNICAL FIELD

The present invention relates to a communication network system and a communication network configuration method. The present invention relates particularly to a relay network which accommodates a plurality of subscriber networks and can connect the subscriber network to high-speed interconnect networks of telecommunications carriers, or the subscriber network to backbone networks of various service providers, information delivery service networks or other subscriber networks such that subscribers enjoy a variety of on-line services, and relates to means for improving communication reliability and quality in the relay network (a method of communication path redundancy and path switching when communication failures occur).

BACKGROUND ART

With the increase in demands for communication using broadband, a user-oriented access line has been shifted to a large capacity access line using an optical fiber instead of an access technique which is based on a telephone line such as a Digital Subscriber Line (DSL). Currently, a Passive Optical Network (PON) system (hereinafter, referred to as a PON simply, an optical passive network system, or a passive optical network system in some cases) is frequently used for an access line service in terms of line construction costs and maintenance and management costs. For example, standardization in International Telecommunication Union Telecommunication Standardization Sector (ITU-T) is a representative example. The Western countries have started to introduce Gigabit PON (GPON) since around 2006.

With the increase in opportunities for home users (communication service subscribers) to access the Internet and collect information or use information services required for social lives, there have been requests for preparation for communication networks, particularly, completion of access network providing services which connect subscribers to communication networks. That is, carriers, which provide the communication networks, are required to increase capital for increasing the number of users accommodated in each station along with an increase in the number of users of access lines. In order to increase the number of users, a method of additionally introducing the PON or of increasing the number of users accommodated in each PON system has been examined. In relation thereto, next generation PON techniques called 10 Gigabit PON (10GPON) and 10 Gigabit Ethernet (registered trademark) PON (10GEPON) have been examined as means for performing transmission at a higher bit rate than in the related art in ITU-T and Institute of Electrical and Electronics Engineers (IEEE).

The above-described subscriber accommodation equipment is installed in a building of a communication carrier. In order to relay a connection between a subscriber and an opposite device (another user, a web server, or the like), typically, there is a network configuration in which a signal from a subscriber is input to a relay transmission network (hereinafter, referred to as a relay network in some cases) from the subscriber accommodate equipment, and, simultaneously, a signal is transferred in an opposite direction to the signal, and thereby the user can obtain information. The relay network is connected to provider networks or core networks, and plays a role of distributing a user signal to one or more provider networks or core networks and transferring a signal from the provider networks or the core networks to the user in a reverse direction. This relay network is called an access network or a backhaul.

Although a dedicated line service using an Asynchronous Transfer Mode (ATM), frame relay, SONET/SDH, or the like is frequently used for a user network in the related art, recently, a low-priced packet communication network exemplified by Ethernet (registered trademark) has been frequently used with an increasing request for cost reduction and the progress of a communication technique and a device manufacturing technique which can handle expanded transmission capacity. On the other hand, SONET/SDH is the mainstream as a communication technique inside a core network, and forms a large capacity and high reliability network in order to transmit data which is collected via a plurality of access networks.

In recent years, along with becoming widespread of the Internet, a packet (or also referred to as a frame) communication technique exemplified by Ethernet (registered trademark) and Multi Protocol Label Switching (MPLS) has progressed and attracted attention as a base technique for forming a communication network. Features of the packet network lie in ease of handling or reduction in development (introduction) costs. In addition thereto, circumstances in which a standard technique which targets a packet communication technique and is related to maintenance and management is being established are main causes for the communication carriers to introduce and expand the packet communication technique. Definition or the like of the above-described maintenance and management function or a function of the packet communication network has been discussed in the standardization groups such as ITU-T, IEEE, and The Internet Engineering Task Force (IETF).

CITATION LIST

Patent Literature

Patent Literature 1: JP-A-2008-219496

SUMMARY OF INVENTION

Technical Problem

An object of the present invention is to provide a redundancy method of a communication path for suppressing consumption of network resources such as communication lines or communication equipment (signal processing performance) to the minimum in a relay network in a case of performing redundancy of the communication path in order to secure continuity of a communication service, in the relay network (backhaul) which accommodates user sites and access lines built by various communication techniques such as wireless access, Ethernet (registered trademark), MPLS, PON, MC, xDSL, ATM, and SONET/SDH and is used to provide communication paths on which various services over the Internet via an Internet Service Provider (ISP) network or a core network can be used. Particularly, the relay network (backhaul) has a function of linking a plurality of access lines, and thus a topology of the paths gives one-to-multi connection. In relation to communication network redundancy (protection) in one-to-multi connection, for example, if the related art disclosed in Patent Literature 1 or the like is used, there is a means such as preparation of a set of standby tree type communication networks; however, in this related art, a main constituent is a means for securing a plurality of paths which have low possibility of actual use or of making only some of the paths forming a tree redundant so as to be protected.

In light of the above-described problems, an object of the present invention is to provide a redundant communication network system and a communication network configuration method capable of minimizing wasting of network resources and protecting all tree type paths formed in a relay network.

Solution to Problem

In a communication system of the present invention, for example, edge equipment included in a relay network is classified into two types. One is access line side edge equipment (AE) that accommodates an access line, and the other is a backhaul edge equipment (BHE) which provides communication means with an ISP network or a core network side (a so-called WAN side). The BHE is located at the top of a tree structure formed in a relay network, and includes communication paths with the plurality of AEs. In addition, the AE includes a communication path for one or more BHEs, and belongs to one or more trees. Each of the AE uses one of a plurality of trees (BHE) to which the AE belongs as an active system, and sets a priority for the other trees (BHE) which are used as standby system paths. Further, there is provided an intercommunication path for mutually transmitting and receiving a signal between the BHEs each of which is a top of the tree. When failures occur in the active system path in certain AE, the standby system path (BHE) relays communication between the AE and the (active system) BHE so as to secure continuity of communication. The intercommunication path through which a data signal does not flow in a normal operation is used as a traffic accommodation path in an emergency between the BHEs. By setting a bypass between the tops of the trees, when a failure occurs in one tree, a signal is transferred from the active system BHE to the standby system path in which another BHE is a top so as to build a sub-tree (hierarchical tree) bypassing the failure point and to secure the communication path. The reason why a plurality of BHEs are provided and the bypass between the BHEs is used is that, although a communication path is built through connection between a plurality of management domains in a typical communication network, in this case, a method of monitoring the inside of the management domain and a connection section between the domains is a basic method in defining a responsibility dividing point. In other words, this is because, even if a communication path inside the management domain varies, the variation is confined in a single management domain, and a specific device (or a specific interface) which provides an external interface does not vary, which is a preferable form in terms of an operation (in terms of connection contract between carriers).

According to the first solving means of the present invention, there is provided a communication network system, and a communication network configuration method using the communication network system comprising:

a plurality of edge equipments (AEs) on an access line side that accommodate an access line; and a plurality of backhaul edge equipments (BHEs) connected to a network side, wherein each of the BHEs is located at a top of a tree structure formed in a relay network including the plurality of AEs, and includes communication paths with the plurality of AEs;

includes an intercommunication path through which a data signal does not flow in a normal operation and a data signal is mutually transmitted and received as a traffic accommodation path in an emergency between each of the plurality of BHEs, each of which is a top of the tree structure; and includes a BHE transfer table which stores in advance a correlation between an input communication path and an output communication path, and an inter-BHE path table which stores in advance a correlation between an input communication path and an output communication path in the intercommunication path, wherein each of the plurality of AEs has communication paths for the plurality of BHEs, and is connected to the plurality of BHEs in advance via paths independent from one another;

sets an active system path for one of the plurality of BHEs which are tops of a plurality of tree structures to which the self AE belongs, and sets a standby system path for one or a plurality of BHEs among the other BHEs;

wherein the AE, in a normal operation state, receives data communication from a first BHE, and periodically receives a connection checking frame for checking normality of a communication path in order to monitor communication circumstances of a first communication path between the AE and the first BHE;

the AE determines that a failure occurs in the first communication path when a subsequent connection checking frame is not received until a specific time has elapsed; and the AE sends a path switching request frame to a second BHE using a second communication path with the second BHE in which abnormality is not recognized on the communication path, wherein, when the second BHE receives the path switching request frame transmitted by the AE, the second BHE recognizes that some sort of problem which disrupts continuous communication between the AE and the first BHE occurs;

the second BHE makes the second communication path connected between the AE and the second BHE valid as a main signal path in a second BHE transfer table in the second BHE, sets a communication path directed to the AE using the intercommunication path connecting the first BHE and the second BHE for a downlink signal to the AE, and changes settings so as to set a transmission path by the intercommunication path for an uplink signal from the AE; and the second BHE further transmits a transfer request frame for accommodating communication which is directed to the AE from the first BHE in the intercommunication path, to the first BHE, wherein, when the first BHE receives the transfer request frame from the second BHE, the first BHE changes settings in the first BHE transfer table in the first BHE so as to switch a path, which receives an uplink signal from the AE, from the first communication path to the intercommunication path; and the first BHE further changes settings in the first BHE transfer table so as to transfer a downlink signal directed to the AE received from the network to the intercommunication path, in relation to the downlink signal to the AE which has been transferred using the first communication path connecting the first BHE to the AE, and wherein a sub-tree having a sub-tree structure in which the second BHE of a standby system by passing a failure point is placed as a top is built under the first BHE of an active system, and communication between the AE and the first BHE of the active system is relayed by a standby system path via the second BHE of the standby system.

According to the second solving means of the present invention, there is provided a communication network system, and a communication network configuration method using the communication network system comprising:

a plurality of edge equipments (AEs) on an access line side that accommodate an access line; and a plurality of backhaul edge equipments (BHEs) connected to a network side, wherein each of the BHEs is located at a top of a tree structure formed in a relay network including the plurality of AEs, and includes communication paths with the plurality of AEs;

includes an intercommunication path through which a data signal does not flow in a normal operation and a data signal is mutually transmitted and received as a traffic accommodation path in an emergency between each of the plurality of BHEs, each of which is a top of the tree structure; and includes a BHE transfer table which stores in advance a correlation between an input communication path and an output communication path, and an inter-BHE path table which stores in advance a correlation between an input communication path and an output communication path in the intercommunication path, wherein each of the plurality of AEs has communication paths for the plurality of BHEs, and is connected to the plurality of BHEs in advance via paths independent from one another;

includes an AE transfer table which stores in advance a correlation between an input communication path and an output communication path, sets an active system path for one of the plurality of BHEs which are tops of a plurality of tree structures to which the self AE belongs, and sets a standby system path for one or a plurality of BHEs among the other BHEs;

wherein a first BHE, in a normal operation state, receives data communication from the AE, and periodically receives a connection checking frame for checking normality of a communication path in order to monitor communication circumstances of a first communication path between the AE and the first BHE;

the first BHE determines that a failure occurs in the first communication path when a subsequent connection checking frame is not received until a specific time has elapsed; and the first BHE sends a transfer request frame to the second BHE using an intercommunication path connected to the second BHE, wherein, when the second BHE receives the transfer request frame transmitted by the first SHE, the second BHE recognizes that some sort of problem which disrupts continuous communication between the AE and the first BHE occurs;

the second BHE makes the second communication path connected between the AE and the second BHE valid as a main signal path in a second BHE transfer table in the second BHE, sets a communication path directed to the AE using the intercommunication path connecting the first BHE and the second BHE for a downlink signal to the AE, and changes settings so as to set a transmission path by the intercommunication path for an uplink signal from the AE; and the second BHE further sends a switching instruction frame to the AE so as to switch an uplink signal sending path from the first communication path to a second communication path with the second BHE, in which abnormality is not recognized on the communication path, and wherein the AE changes settings in the AE transfer table so as to switch an uplink signal sending path from the first communication path to the second communication path with the second BHE, in which abnormality is not recognized on the communication path, when the switching instruction frame is received, and wherein, on the other hand, the first BHE changes settings in the first BHE transfer table in the first BHE so as to switch a path, which receives an uplink signal from the AE, from the first communication path to the intercommunication path; and the first BHE further changes settings in the first BHE transfer table so as to transfer a downlink signal directed to the AE received from the network to the intercommunication path, in relation to the downlink signal to the AE which has been transferred using the first communication path connecting the first BHE to the AE, and wherein a sub-tree having a sub-tree structure in which the second BHE of a standby system by passing a failure point is placed as a top is built under the first BHE of an active system, and communication between the AE and the first BHE of the active system is relayed by a standby system path via the second BHE of the standby system.

Further, according to the present invention, it is possible to provide a communication network system, and a communication network configuration method using the communication network system, according to the above-mentioned communication network system and the above-mentioned communication network configuration method, wherein, in a case where the AE has already been connected to the first BHE via the second communication path and the second BHE due to a failure regarding the first communication path connecting the AE to the first BHE, when the second BHE detects a failure regarding the second communication path according to stop of periodical reception of a connection checking frame which is transmitted from the AE to the second BHE, the second BHE sends a switching request frame to the third BHE using the intercommunication path, wherein, when the third BHE receives the switching request frame transmitted by the second BHE, the third BHE recognizes that some sort of problem which disrupts continuous communication between the AE and the second BHE occurs;

the third BHE makes the third communication path connected between the AE and the third BHE valid as a main signal path in a third BHE transfer table in the third BHE, sets a communication path directed to the AE using the intercommunication path connecting the first BHE and the third BHE for a downlink signal to the AE, and changes settings so as to set a transmission path by the intercommunication path for an uplink signal from the AE; and the third BHE further sends a switching instruction frame to the AE so as to switch an uplink signal sending path from the first communication path to a third communication path with the third BHE, in which abnormality is not recognized on the communication path, and wherein the AE changes settings in the AE transfer table so as to switch an uplink signal sending path from the first communication path to the second communication path with the second BHE, in which abnormality is not recognized on the communication path, when the switching instruction frame is received, and wherein, on the other hand, the first BHE changes settings in the first BHE transfer table in the first BHE so as to switch a path, which receives an uplink signal from the AE to the intercommunication path connected to the third BHE; and the first BHE further changes settings in the first BHE transfer table so as to transfer a downlink signal directed to the AE received from the network to the intercommunication path connected to the third BHE, in relation to the downlink signal to the AE, and wherein a sub-tree having a sub-tree structure in which the third BHE of a standby system by passing a failure point is placed as a top is built under the first BHE of an active system, and communication between the AE and the first BHE of the active system is relayed by a standby system path via the third BHE of the standby system.

Advantageous Effects of Invention

According to the present invention, in the relay network collecting access lines, an intercommunication path between BHEs which provides a WAN side interface is used for path protection when failures occur. The BHE is a collection point of communication in the relay network, and thus failures in an important communication path can be grasped in this collection point (BHE). A bypass is provided between the BHEs by using this feature, and thereby it is possible to promptly handle (change a communication path) communication failures which have occurred in the relay network. In addition, communication circumstances between the collection point and a plurality of AEs are monitored in each communication path, and thereby there is an effect of preventing influence of failures in some communication paths from being exerted on the overall relay network. For example, when a failure is detected in a certain AE, the above-described sub-tree configuration is applied to the AE only, and thus only a signal addressed to the AE flows through the bypass between the BHEs. Therefore, it is possible to prevent extra instantaneous communication interruption in communication between AE in which there is no extra load on the bypass or failure and BHE. In addition, in the present invention, only the bypass between BHEs is a standby system path which is not used for a normal operation, and thus it is not necessary to make all the trees redundant unlike in the related art, and it is possible to efficiently distribute resources. Further, since almost overall communication in the relay network can be protected, it is possible to satisfy a plurality of requests together which are contradictory to the concept in the related art in one-to-multi communication.

BRIEF DESCRIPTION OF DRAWINGS

FIG. 11 is an explanatory diagram illustrating a configuration example of the transfer table 1110 of a reception signal held by a path control unit 1100 of AE 112 of FIG. 10.

FIG. 12 is an explanatory diagram illustrating a configuration example (A) of the management table 1310 held by a path management unit 1300 forming a controller 1000 of the AE 112.

FIG. 13 is an explanatory diagram illustrating another configuration example (B) of the management table 1310 held by the path management unit 1300 forming the controller 1000 of the AE 112.

FIG. 14 is a configuration example of the delay table 1210 held by a delay control unit 1200 forming the controller 1000 of the AE 112.

FIG. 22 is a table configuration diagram illustrating a configuration example of the inter-BHE path table 5510 in the functional block of the BHE 172 of FIG. 20.

FIG. 23 is an explanatory diagram illustrating a configuration example (A) of the management table 5310 held by a path management unit 5300 in a controller 5000 of the BHE 172 (FIG. 20).

FIG. 24 is an explanatory diagram illustrating a configuration example (B) of the management table 5310 held by the path management unit 5300 in the controller 5000 of the BHE 172.

DESCRIPTION OF EMBODIMENTS

A. First Embodiment
1. System
1-1. System Configuration

Figure 1:
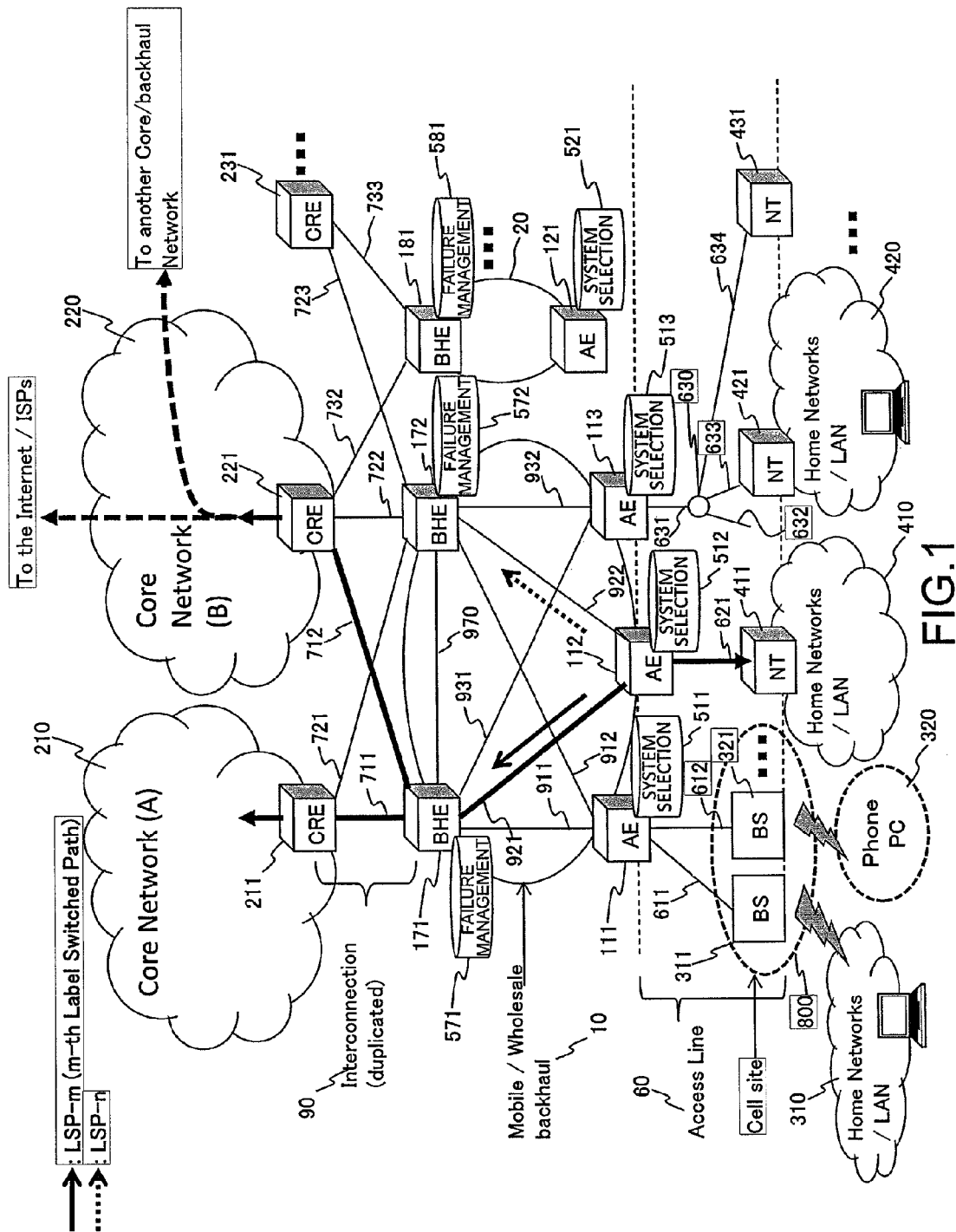
FIG. 1 shows an example of the configuration diagram of a communication network using a relay network (backhaul) for accommodating access lines.

FIG. 1 shows a network configuration which is assumed in the present embodiment. This figure shows a configuration example of the communication network using a relay network (backhaul) for accommodating access lines. The network configuration using the relay network 10 is a general configuration in a communication carrier network which accommodates an access line 60 which connects a base station for mobile service to a carrier building, or a user site to the carrier building. A scheme of realizing the access line 60 includes PON, Media Converter (MC), and wireless access. The PON system is constituted by optical fibers 631, 632, 633 and 634 and an optical splitter 630. In this figure, Access Edge Equipment (AE) 113 is PON subscriber accommodation equipment, and Network Terminals (NTs) 421 and 431 correspond to subscriber devices. The NTs 411, 421 and 431 are line collecting devices in user networks, for respectively connecting a user network 410, a user network 420, and other user networks to the relay network 10. The optical fiber 631 forming the PON is referred to as a line collecting optical fiber, and the optical fibers 632 to 634 are referred to as branch line optical fibers. The MC is a communication form used for connection of an optical fiber in one-to-one type, and this figure shows a state in which AE 112 and the NT 411 are connected to each other with the MC technique as an example (the line 621 is an optical fiber). The wireless access is a communication scheme for connecting wireless base stations (BSs) 311 and 321 which are connected to the AE 111 via the lines 611 and 612, to the user network or user terminals 310 and 320, in this figure. An access function for accommodating the user network 310 including the BSs 311 and 321 or the user terminal 320 is referred to as a wireless access site (Cell Site) 800. In the wireless access site 800, various communication schemes using a metal line or an optical fiber are used as connection schemes of the AE 111 and the BSs 311 and 321, and, in recent years, a scheme of accommodating a plurality of BSs using the PON system has started to be introduced. In this figure, lines connected to the AEs 111, 112, 113 and 121 are collectively referred to as the access lines 60.

In addition, this figure shows core networks 210 and 220. In the present embodiment, core network edge equipments (CoRe Edge Equipment (CRE)) 211 and 221 provide connection points to different Internet Service Providers (ISPs), the edge equipments 211 and 221 do not perform intercommunication. This is because whether or not direct signal transmission and reception between the edge equipments are performed does not influence implementing the present invention and the present embodiment. In description of a path protection operation of the communication system of the present embodiment, a network configuration as simple as possible is assumed. Further, there may be another core network, and, there is CRE 231 as an example thereof in this figure. In addition, a network configuration example is shown in a case where connection between still another core network (not shown) and the relay network 10 (via the BHE 171 or 172) or a relay network 20 (via BHE 181) is performed.

There is a use of the relay network (an access network or backhaul) 10 which accommodates the access line 60 and is used to relay communication between the user networks 310, 320, 410 and 420 and the core networks 210 and 220. The relay network 10 has an access line accommodation function and a function of connection to the core network in order to provide the above-described relay function. In addition, the relay network has a function of connecting the user networks (including company sites; general users using the communication network in this configuration of the figure and users on business are hereinafter collectively referred to as users) collected in the access line accommodation equipment AEs 111 to 113 and 121, to edge equipments (Backhaul Edge Equipment (BHE)) 171, 172 and 181 which provide core network side interfaces. A specific example of the line collecting function will be described with reference to this figure. The BHE 171 has a function of temporarily collecting communication signals from the access lines accommodated by the AEs 111, 112 and 113 before being transferred to the core networks 210 and 220, selecting a necessary transfer destination (core network), and transferring the signals to the core network side edge equipment CREs 211, 221 and 231. The BHE 172 also accommodates communication with the user networks collected in the same AEs 111 to 113 via the access line 60. In other words, the user networks are collected in the AEs 111 to 113 via the access lines, and communication with the core networks 210 and 220 from the AEs 111 to 113 via the relay network 10 is collected in the core network side edge equipment BHEs 171 and 172 of the relay network 10. As such, the communication with the core network via the relay network 10 has a tree structure in which the BHEs 171 and 172 are some tops. The CRE 231, the BHE 181, and the AE 121 also have the same function, the access lines 60 accommodated in the AE 121 are collected in the BHE 181 in the tree structure, and thus communication with the core network side edge equipment CRE 231 can be performed. Hereinafter, the relay network 20 is assumed to have a function equivalent to the relay network 10, and thus description of the relay network 10 is also applied to the relay network 20. This figure is aimed at showing communication with a plurality of core networks including the core networks 210 and 220 from the relay network 20 as well, and the relay network 10 is a target of description since a function unique to only the relay network 20 is not particularly necessary in the present embodiment.

In the relay network 10, the BHEs 171 and 172 accommodate respectively the same AEs 111, 112 and 113 in building a tree structure in which the BHE is a top. In other words, when viewed from the AEs 111, 112 and 113, there are communication paths of two directions from the AE to the BHE. In this configuration, the AEs 111, 112 and 113 belong to both of two tree type communication paths in which the BHEs 171 and 172 are tops. The BHEs 171 and 172 maintain communication paths with the core networks which can be connected by the interconnection 90 with the core networks, and thus the AEs 111 to 113 can communicate with the core networks via any of the BHE (171 or 172). Although it is assumed that there are lines for connection between the BHE 171 and the CRE 231, the BHE 181 and the CRE 211, they are not shown for easy view.

The relay network 10 is realized using a packet communication technique. The packet communication technique may employ Ethernet (registered trademark), MPLS, or the like. In the present embodiment, maintenance and management of a transfer network is preferentially taken into consideration, and a case where the relay network 10 is formed using the MPLS technique is assumed. In addition, operations and effects of the present invention and the present embodiment are not limited to a case of employing an MPLS protocol, and can also be realized using an Ethernet (registered trademark) line or a Virtual LAN (VLAN) which is a logical line thereof. In the present embodiment, a maintenance and management (OAM) function which can be applied to a communication path is provided, and the operations and the effects can be realized using all communication techniques having an OAM function equivalent to the OAM function described below.

As described above, the AEs 111 to 113 may be connected to the core network via either of the BHEs 171 and 172 in this configuration example. In this figure (FIG. 1), it is assumed that, in a normal operation state, the AEs 111 and 112 perform communication with the core network via the BHE 171, and the AE 113 is in a state of being capable of communicating with the core network through connection to the BHE 172. To differently use the BHEs 171 and 172 is aimed at reducing an equipment load on the BHE. Since both the BHEs 171 and 172 play a role of collecting signals from users and distributing the signals to the core networks 210 and 220, they are required to work always at a high load. For this reason, it is generally desirable to differently use a plurality of BHEs. Of course, in a case where the BHE can be expected to have a sufficient process performance, for example, only the BHE 171 can process whole communication of the AEs 111 to 113. In this case, the BHE 172 stands by as a standby system, and is used as replacement equipment when the BHE 171 breaks down or a failure occurs in communication between the AEs 111, 112 and 113 and the BHE 171.

Hereinafter, a connection relationship inside the relay network 10 will be described in the network configuration example of this figure. The relay network 10 is formed by combining a plurality of transmission equipments. In lines 911, 912, 921, 922, 931 and 932 which connect the AEs 111 to 113 and the BHEs 171 and 172, the AE may be directly connected to the BHE, and or one or more communication equipments (or also referred to as relay equipment which is not shown) may be present between the AE and the BHE. Therefore, the lines 911, 912, 921, 922, 931 and 932 may indicate physical layer links and may indicate logical connection passing through a plurality of relay equipments. Hereinafter, they are not particularly differentiated from each other and are referred to as lines.

Now, it is assumed that the AEs 111 and 112 belong to a tree of the BHE 171. In other words, the AEs 111 and 112 perform communication with the BHE 171 using the lines 911 and 921. In addition, the AE 113 performs communication with the BHE 172 using the line 932. Further, the lines 912, 922 and 931 which are not used for the operation are lines used in an emergency when communication failures occur inside the relay network 10 or delay is expanded due to congestion, or when equipment failures occur in the BHE 171 or the BHE 172 or a load increases.

Next, a description will be made of a line configuration example between the relay network 10 and the core networks 210 and 220. In this figure, the BHE 171 and the CREs 211 and 221 are respectively connected to the lines 711 and 712. Here, it is assumed that a configuration method of the interconnection 90 mainly employs connection using a physical line. A practical operation configuration may be a configuration in which logical lines such as a plurality of VLANs, MPLS paths or Pseudo Wires (PWs) are multiplexed on a physical line, but a line used for connection between the BHE and the CRE is generally directly connected thereto, and the configuration example of this figure indicates a connection relationship of such a line. Similarly, the BHE 172 is connected to the CREs 211, 221 and 231 via the lines 721, 722 and 723, respectively. In addition, the BHE 181 is connected to the CREs 221 and 231 via the lines 732 and 733, respectively. Communication circumstances regarding the BHE 171 and the BHE 172 of interest in the configuration example of this figure are acquired. The BHE 171 relays communication with the CREs 211 and 221 from the AEs 111 and 112, and thus distributes a signal from the AE 111 or the AE 112 to the CRE 211 or the CRE 221 based on destination information of the signal. In communication in a reverse direction, a signal from the CRE 211 or the CRE 221 is distributed to the AE 111 or the AE 112 based on destination information of the signal. This is also the same for the BHE 172 which distributes communication from the AE 113 to the CREs 211, 221 and 231 and also transfers a signal from the CREs 211, 221 and 231 to the AE 113. As described above, all the lines are used to transmit signals in the interconnection 90 at all times.

In the relay network 10, the AEs 111 to 113 can select any one from a plurality of paths (here, two paths) when communication to the core networks 210 and 220 is performed. To use either one path is aimed at reducing extra signal processes in order to make valid a transmission capacity of the relay network 10 which is a packet communication network to the maximum. For this reason, the AEs 111 to 113 are respectively provided with databases (hereinafter, the database is also referred to as a DB) 511, 512 and 513 for path selection (system selection). For the above-described reason, these databases are updated using variations in signal process circumstances in the relay network or the BHE as triggers and are operated such that a communication service which is currently provided to a user does not stop to the extent possible. On the other hand, the BHEs 171, 172 and 181 are provided with failure management DBs (571, 572 and 581). These DBs are used to monitor whether or not communication circumstances of one or more AEs connected to each BHE and a communication state in the lines (the interconnection 90) for transferring a signal from the BHE to the core network are normal, and to determine whether or not to change transmission paths from the BHE to the core networks 210 and 220 or communication paths from the BHE to the AEs 111 to 113. These DBs periodically monitor a communication state in each line and hold records regarding whether or not a physical connection state of the line is normal, or variations in a communication performance due to congestion or the like, in order to perform the above-described determination.

Figure 2:
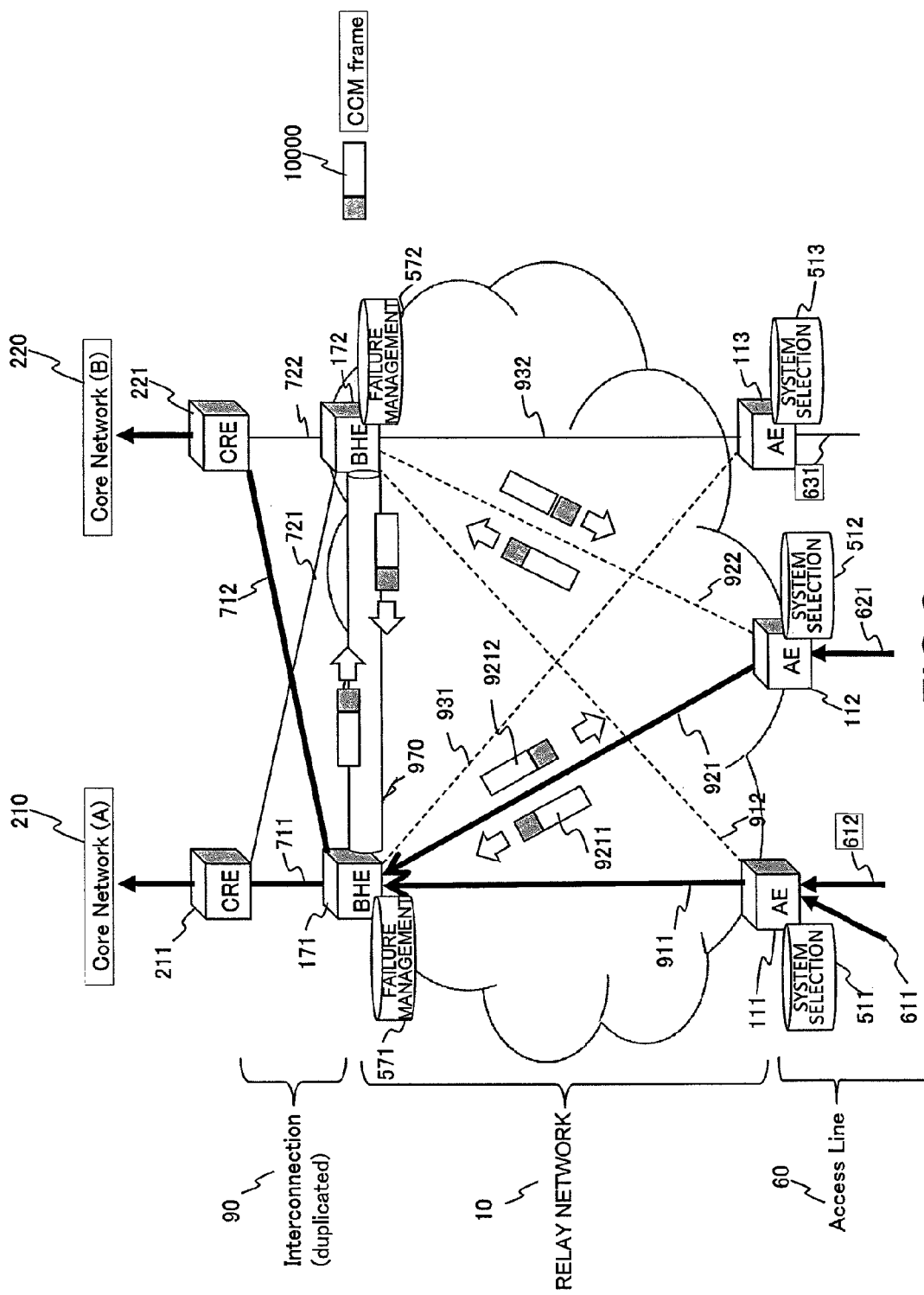
FIG. 2 shows the enlarged relay network 10 of FIG. 1 and is a network configuration diagram illustrating an example in which lines and equipments are disposed in the relay network 10.

FIG. 2 shows the enlarged relay network 10 of FIG. 1 and is a network configuration diagram illustrating an example in which lines and equipments are disposed in the relay network 10. With reference to this figure, a description will be made of a maintenance and management method in the relay network in the configuration of FIG. 1. Each path is set to be identified independently in the relay network 10 by an identifier (label) of Label Switched Path (LSP) provided in a SIMM header of the MPLS.

In the paths 911, 912, 921, 922, 931 and 932 formed in the relay network 10, a Continuity Check Message (CCM) frame is periodically transmitted in order to check normality of the packet communication path, and it is checked whether or not transmission and reception are performed as set by an administrator (as expected). The CCM frame is also referred to as a Continuity Check (CC) message or a Connectivity Verification (CV) frame. In the present embodiment, the name for a frame for checking communication normality is unified to a CCM frame. The CCM frame 10000 is periodically issued from equipment which is an end point of each path, and opposite terminal end equipment confirms arrival of the CCM frame. When the arrival can be confirmed, an arrival time point and an arrival interval are further confirmed, and it is determined whether or not a communication performance of the line is maintained.

This figure shows a communication state management method of a triangular path formed by the AE 112 and the BHEs 171 and 172 in order to show a state in which the CCM frame 10000 is transmitted and received. Here, the AE 112 is described as a representative example, and a transmission and reception method of the CCM frame to and from the BHEs 171 and 172 is also the same for the AEs 111 to 113. Hereinafter, attention is paid to a signal process in communication between the AE 112 and the BHEs 171 and 172, and this will be described as a representative example.

In the MPLS (Ethernet (registered trademark) OAM regulations: the same process is performed even using ITU-T Recommendation Y.1731), a communication direction is clearly differentiated. In a case of the MPLS, the identity of a flow is verified based on a combination of an input interface identifier and an input label value by using a table held in a transfer table (FIG. 10: 1110) provided in the communication equipment. Similarly, a flow is identified based on a combination of an output interface identifier and an output label value. Therefore, the relay equipment in the relay network 10 holds the transfer table (FIG. 10: 1110) in which an input flow which can be verified from an input interface identifier and an input label value is correlated with an output interface identifier and an output label value for outputting the flow. Thus, for example, there is a possibility that a communication signal (including the CCM frame) from the AE 112 to the BHE 171 and a communication signal (including the CCM frame) from the BHE 171 to the AE 112 may pass through the same physical line, and there is a possibility that the signals may pass through paths (physically) different from each other and be transmitted and received in a case where a plurality of physical lines are installed. The present invention and the present embodiment are not required to be limited to any configuration. In any case, a transmission side may send the CCM frame at a constant transmission interval, and a reception side may check whether or not the frame is received at a normal time interval. In addition, in order to clearly show an operation (a difference in replacement path configuration methods due to the failure circumstances when communication failures occur) to which the present invention and the present embodiment are applied, a case where physical lines are different depending on a communication direction will be described as an example in the present embodiment.

The same process as in a case of the AE 112 and the BHE 171 is also performed in a checking process of communication circumstances of the line 922 connecting the AE 112 to the BHE 172. In addition, the same process is also performed in a communication checking process of the line 970 connecting the BHE 171 to the BHE 172. In the former case, a transmission end and a reception end of the CCM frame are respectively the AE 112 and the BHE 172, and the BHE 172 and the AE 112 in a reverse direction. In the latter case, a transmission end and a reception end of the CCM frame are respectively the BHE 171 and the BHE 172. In communication in a reverse direction, a transmission end and a reception end are respectively the BHE 172 and the BHE 171.

As described above, by periodically confirming communication circumstances in the sections connecting the AEs 111 to 113 to the BHEs 171 and 172 respectively, it is possible to check continuity of communication in each communication section. In a case where delivery of the CCM frame is not confirmed (normal reception (an arrival time point and an arrival interval expected in normal operation) of the CCM frame cannot be confirmed), it is considered that some sort of abnormality occurs in a line on the communication path or the relay equipment in a section of transmission and reception of the CCM frame and a communication direction thereof. This abnormality indicates, inmost cases, an increase in processed loads in the relay equipment due to traffic concentration, an abnormal operation (or break-down) of a communication function of the relay equipment, or abnormality (disconnection of the optical fiber or poor connection state/contact between the relay equipment interface and the line) of a communication line connecting relay equipments to one another. Therefore, it is necessary to take a measure (path switching) for securing a path which can perform communication in a step in which transmission abnormality of the CCM frame is confirmed.

Figure 3:
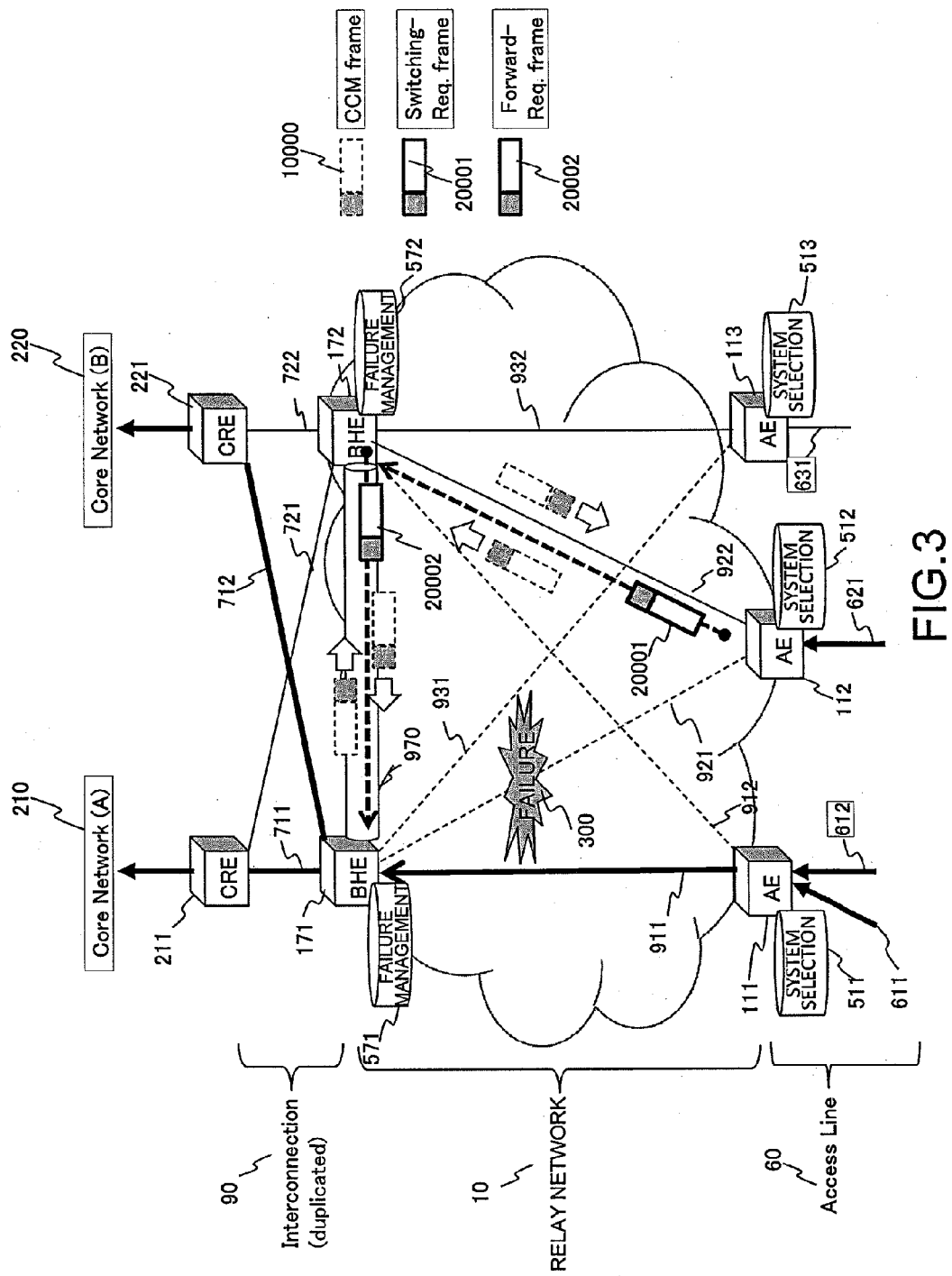
FIG. 3 is a communication path configuration diagram illustrating a path switching method in a case where connectivity is not confirmed in the communication circumstances checking process described in FIG. 2.

FIG. 3 is a communication path configuration diagram illustrating a path switching method in a case where connectivity is not confirmed in the communication circumstances checking process described in FIG. 2.

In this figure, a case is assumed in which a path failure 300 influences both the line from the AE 111 to the BHE 171 and the line in the reverse direction. Generally, a plurality of communication media (for example, there is a cable using a copper line or an optical fiber) in which communication directions are different. Therefore, in a physically abnormal state such as line disconnection, communication in both directions is influenced. In addition, if the path failure 300 is congestion (a rapid increase in signal process load) in the relay equipment (not shown) or equipment break-down, it also disrupts the communication in both directions.

Due to the path failure 300, transmission and reception of CCM frames 9211 and 9212 cannot be performed between the AE 112 and the BHE 171. The path failure 300 can be detected from the fact that periodical reception of the CCM frame which is transmitted from the BHE 171 stops in the AE 112. In the BHE 171, the path failure is detected in the same manner based on a phenomenon in which the CCM frame received from the AE 112 stops. Through this detection, both the AE 112 and the BHE 171 determine that continuous communication in the path 921 is difficult. As a result, the equipments 112 and 171 of both ends start switching to replacement paths in each communication direction.

When the AE 112 detects the path failure 300, the AE recognizes the danger in which a signal to be received thereby does not arrive. Then, the AE 112 requests the BHE 172 to relay communication with the BHE 171 by using a replacement system path (accurately, a part thereof) 922 which is set in advance. Here, a switching request frame 20001 is used. A configuration example of the switching request frame 20001 will be described in detail with reference to FIG. 29. When the request is received, the BHE 172 requests the BHE 171 to switch a transfer path which is directed to the AE (here, the AE 112). That is, a change in signal distribution settings is requested so as to send information directed to the AE 112 to the BHE 172 using the standby path 970. A request signal (transfer request frame) 20002 used here is a control frame different from the CCM frame 10000. A configuration example of the transfer request frame 20002 will be described in detail with reference to FIG. 29.

Figure 4:
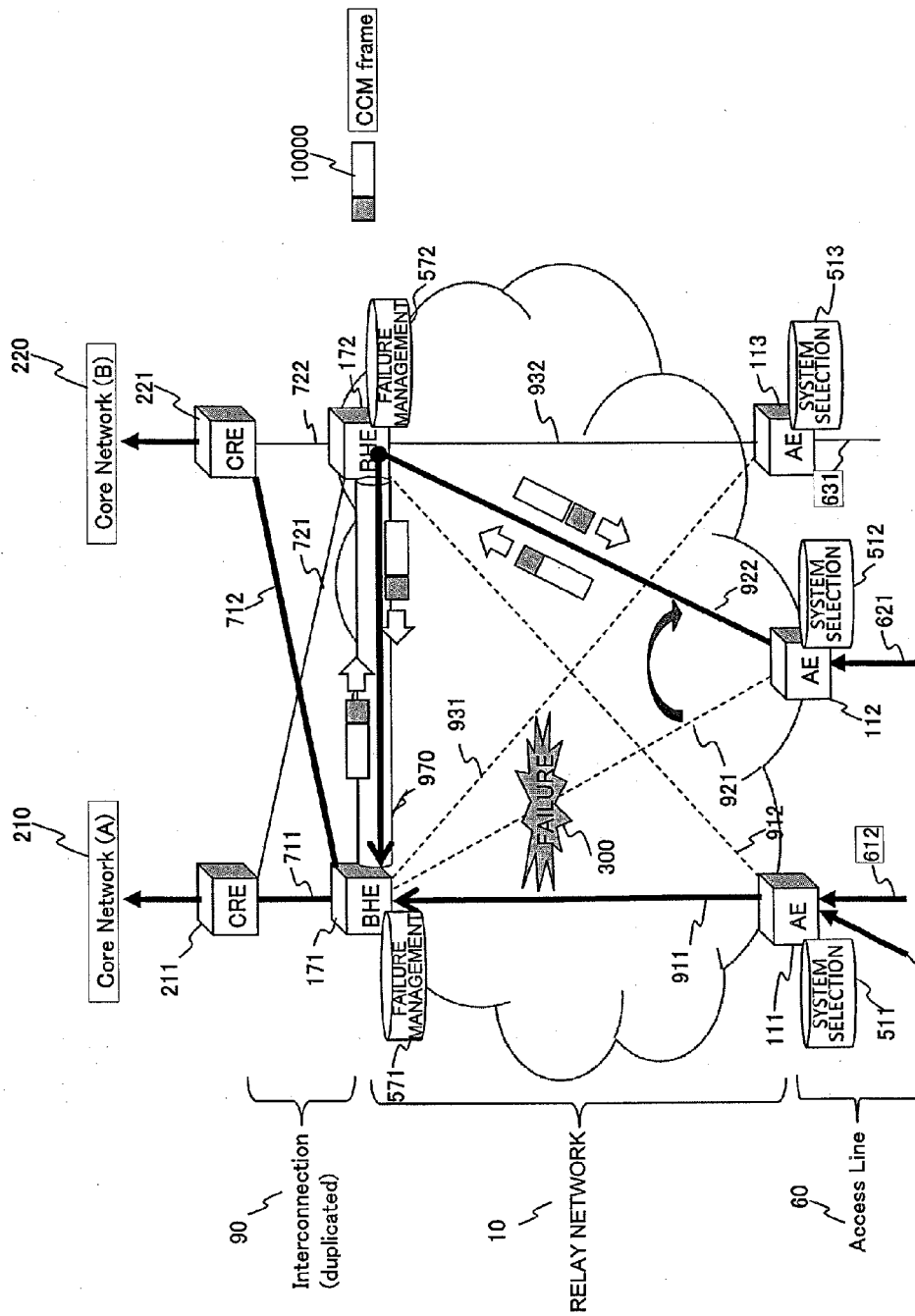
FIG. 4 is a communication path configuration diagram illustrating a standby system path configuration method in a case where connectivity is not confirmed in the communication circumstances checking process described in FIG. 2.

FIG. 4 is a communication path configuration diagram illustrating a standby system path configuration method in a case where continuity is not confirmed in the communication circumstances checking process described in FIG. 2. As described in FIG. 2, a path configuration example of a case where an abnormal state (or an abnormal operation) at the time of delivery of the CCM frame 10000 is detected is shown. With reference to this figure, a description will be made of a communication path configuration method in a state in which the path failure 300 occurs in any location on the communication path 921. This figure shows a replacement system (standby system) path in which a signal output from the AE 112 arrives at the BHE 171 via the BHE 172, as a communication path after the switching.

A feature different from the existing switching method (for example, PTL 1 or ITU-T recommendation G.8031) lies in that the BHE 172 is a relay point of the switching request signal and communication after a path is changed. In other words, the tree type communication network in which the BHE 172 is a top forms a sub-tree when viewed from the BHE 171, and further has a configuration in which the BHE 171 is added in addition to the CREs 211 and 221 as high rank equipment of the BHE 172 when viewed from the BHE 172. This feature is derived from a configuration in which (1) the BHEs 171 and 172 are communication relay (collection) equipment having an equivalent function, and (2) all the AEs 111 to 113 are connected to the BHEs 171 and 172 in advance via paths which are independent from one another. From the feature of (1), by changing the connection relationship between the BHEs 171 and 172, the AEs 111 to 113 can come and go in a single hierarchical tree. Further, the communication path between the BHEs is used for data communication as a bypass path, and thereby a form of the communication network is changed to a multi-hierarchical tree of two or more hierarchies so as to continuously perform communication. From the feature of (2), when a path change which depends on a communication network building plan is needed, it is possible to secure a communication path having an equivalent performance without labors such as installation of lines or movement of equipment. Further, an existing protection switching technique mainly uses a method in which an operation system and a standby system (switched destination) are set in advance for each communication unit (for example, "connection" or "path") as indicated by 1+1 or 1:1 (generally, N+M type or N:M type (a method of preparing for M standby paths in order to protect N items of communication)), and, if each item of communication is to be more reliably protected, communication network resources which are preliminarily necessary increase to that extent, whereas, in the present embodiment, communication is collected in the BHEs 171 and 172, the standby path 970 connecting between the BHEs is shared as a standby path, and thereby it is not necessary to secure a large number of network resources. In addition, since there is a low probability that a plurality of path failures may occur, a part of the communication path 970 is shared by all the AEs 111 to 113, and thereby it is possible to effectively use the resources. In the existing technique, only a single communication unit is protected for a single standby line (the number of settings), but the standby path 970 can be assigned to all items of communication in the configuration of the relay network 10. The cost-effectiveness thereof is high. The relay network 10 has a configuration in which one-to-multi connection having the AEs 111 to 113 as tops and one-to-multi communication having the BHE 171 or the BHE 172 as a top overlap each other, and, in the protection switching process, the BHEs 171 and 172 are interconnection points between the individual paths 911, 912, 921, 922, 931 and 932 and the sharing path 970. Generally, when the number of accommodated items of communication is taken into consideration, the BHEs 171 and 172 are higher in a process performance of the communication equipment than the AEs 111 to 113. In most cases, the BHE employs a configuration of equipment itself with the higher reliability than the AE. Further, a large capacity line is easily to be used for the standby path 970 between the BHEs, and, since traffics do not flow into the standby path 970 in a normal operation, it is easy to cope with the emergency.

1-2. Outline Sequence

Figure 5:
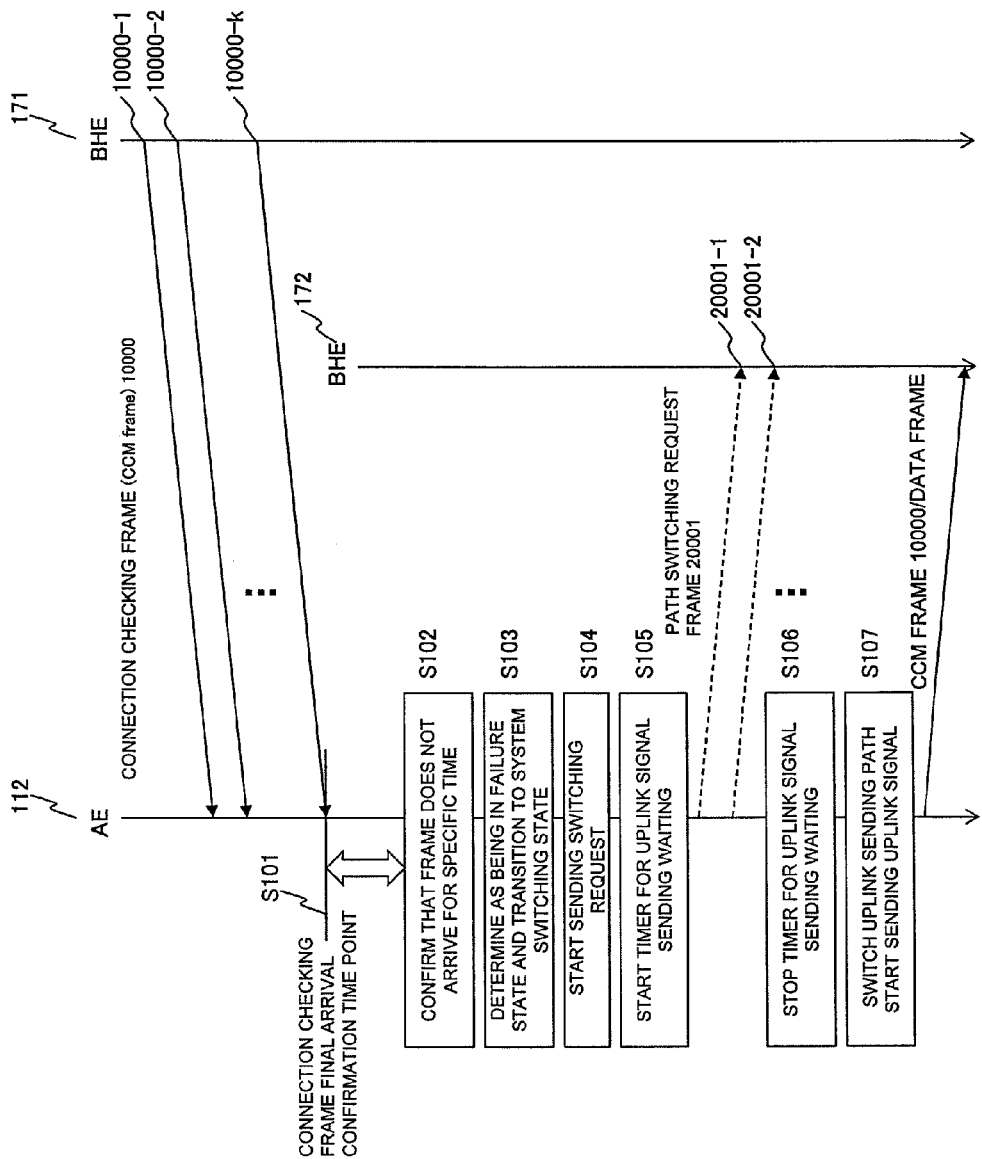
FIG. 5 is a sequence diagram illustrating a flow of processes related to path switching between AE 112 and BHE 172 in the network configuration diagram of FIG. 3.

FIG. 5 is a sequence diagram illustrating a series of processes related to switching paths passing through the AE 112, the BHE 172 and BHE 172 in the network configuration diagram of FIG. 3.

In a normal operation state, the AE 112 receives data communication from the BHE 171, and periodically receives the CCM frame 10000 in order to monitor communication circumstances of the corresponding communication path 921 (10000-1, 10000-2, and 10000-$k$). When the CCM frame 10000 is normally received, the AE 112 records a time point when the CCM frame is received, and resets a timer for measuring an arrival time interval. This figure shows a situation in which the failure 300 occurs in the communication path 921 in a step in which the CCM frames 10000 are received up to the CCM frame 10000-$k$.

The time point recorded in the AE 112 is a time point when the CCM frame 10000-$k$ is received (S101). Successively, in a case where the next CCM frame is not received until a specific time (the set time depends on a request by a carrier or a set value in equipment, and is, for example, 3.5 times or the like more than the arrival time interval of the CCM frame) has elapsed (S102), the AE 112 determines that some sort of failures occur in the path 921. More accurately, it is determined that some sort of trouble occurs in downward communication (communication from the BHE 171 to the AE 112) using the path 921 (S103).

Next, the AE 112 sends a communication path switching request 20001 to the BHE 172 using the communication path 922 with the BHE 172 which does not recognize the abnormality on the communication path (S104). An example is shown in which a plurality of frames 20001 are sent as the switching request frame in order to prevent notification failure due to a bit error on the communication path 922 or a signal/frame loss. This figure shows a state in which 20001-1, 20001-2, and frames subsequent thereto are sent. At the same time as step S604, the AE 112 stops (waits) a user data frame process for a specific time. This is because the AE 112 waits until a series of processes related to the path switching such as update of a path table are completed in the BHE 172 (and the BHE 171) which are new reception equipment of a signal sent from the AE 112, and data loss is prevented from being generated during the waiting time. In order to manage this waiting time, the switching request frame 20001 starts to be sent, and, at the same time, a waiting timer starts to be counted (S105). In addition, when a counted value (waiting duration) of the timer reaches a specific value (S106), transmission of the switching request frame 20001 finishes, and user data frames accumulated in the AE 112 are resumed to be sent (S107). In the sequence of this figure, a configuration change of a table in the BHE 172 is requested. This process will be described later in detail (after FIG. 31).

Figure 6:
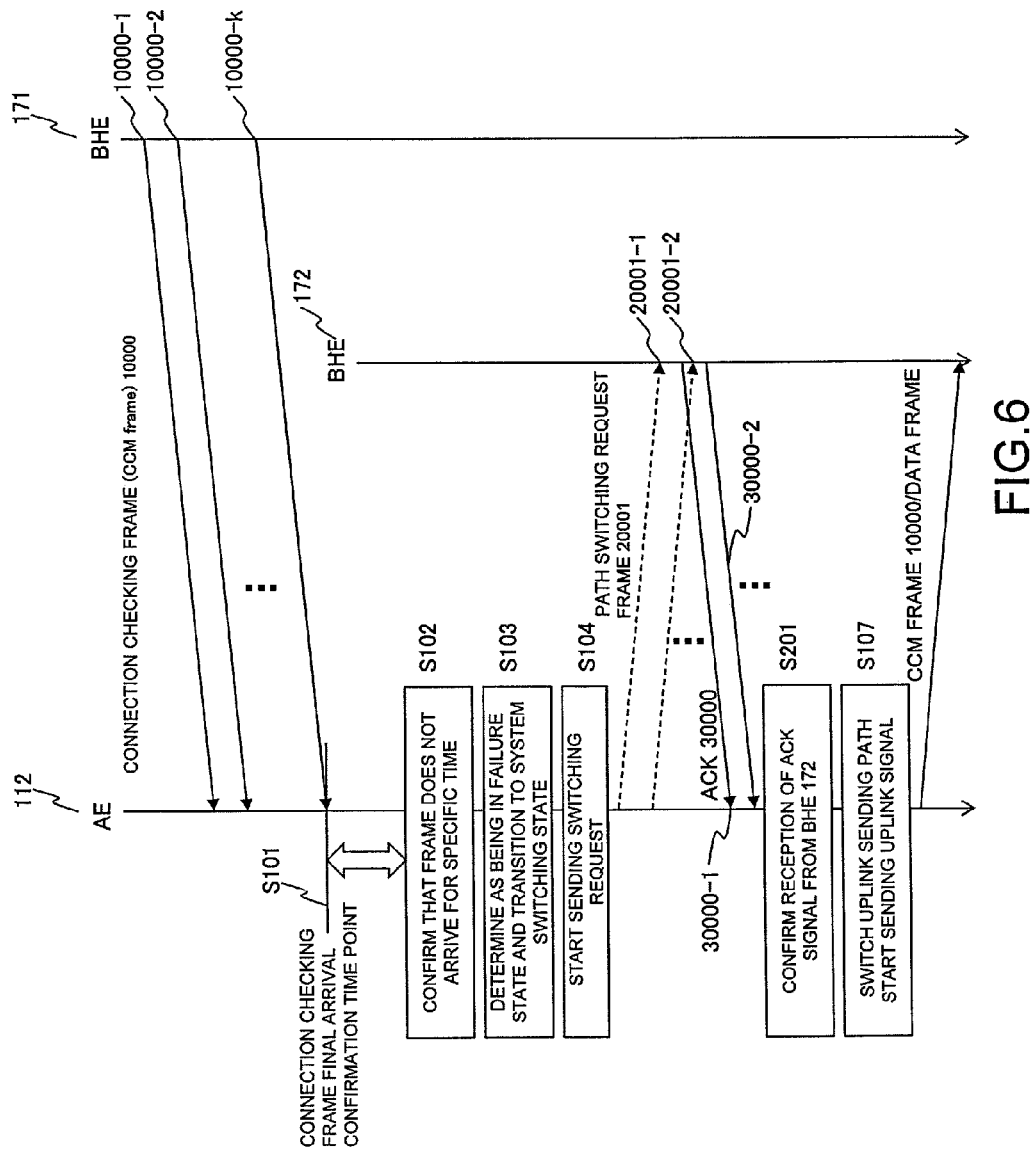
FIG. 6 is a sequence diagram illustrating a flow of processes different from FIG. 5, related to path switching between the AE 112 and the BHE 172 in the network configuration diagram of FIG. 3.

FIG. 6 is a sequence diagram illustrating a flow of a path switching process using a switching operation example different from FIG. 5, when failures occur in a communication path between the AE 112 and the BHE 171 in the network configuration diagram of FIG. 3.

The sequence of this figure is the same as that in FIG. 5 up to the step of sending the path switching request frame 20001 to the BHE 172. Therefore, description of steps S101 to S104 will be omitted.

When the switching request frame 20001 (20001-1, 20001-2, and subsequent frames) is received from the AE 112, the BHE 172 changes a path set therein so as to set a communication path from the BHE 172 to the AE 112. Along with the path information update process, the BHE 171 is notified of a transfer request frame 20002, and thus the BHE 171 is requested to transfer a signal directed to the AE 112 to the BHE 172, and a path change is requested such that a reception path of an uplink signal from the AE 112 is set to the standby path 970 (FIG. 3). When a specific time has elapsed after the transfer request frame 20002 starts to be sent or an ACK signal (not shown in this figure) for the transfer request frame 20002 from the BHE 171 is received, it is regarded that a transfer setting change process in the BHE 171 is completed. The BHE 172 confirms that the update of path information therein is completed, and sends an ACK signal 30000 for notifying of the transfer preparation completion to the AE 112 using completion of the process in the BHE 172 and the BHE 171 as a trigger. This figure shows a state in which the ACK 30000 is also transmitted in multiple times in preparation for any failures on the path 922 (30000-1, 30000-2).

When the ACK signal 30000 is confirmed, the AE 112 changes a sending destination from the path 921 to the path 922, and starts communication directed to the core networks 210 and 220 via the BHE 172 (S107). A process after the ACK 30000 is confirmed is the same as in FIG. 5. A change in the table configuration inside the BHE 172 will be described later in detail (after FIG. 31).

Figure 7:
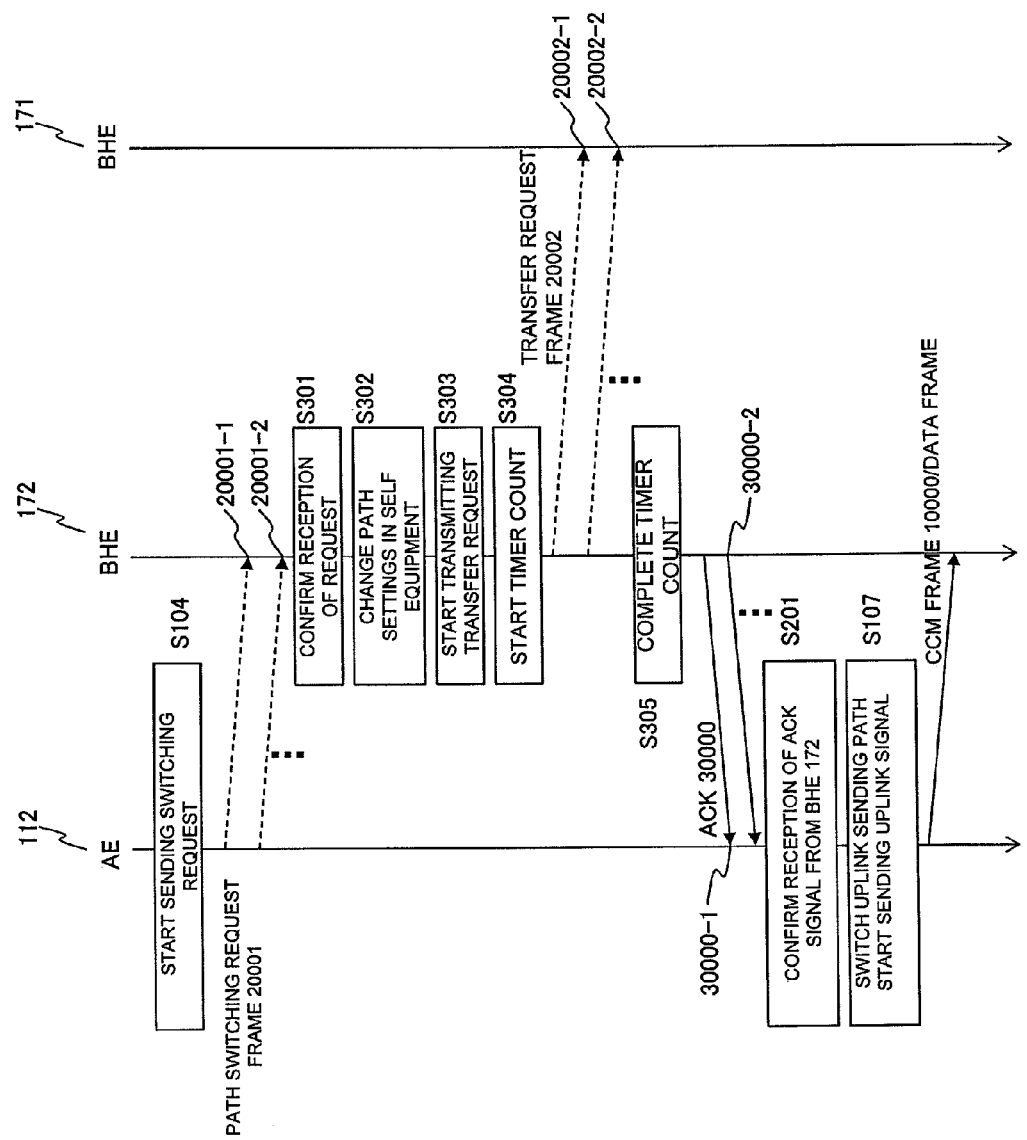
FIG. 7 is a sequence diagram illustrating a flow of processes related to a transfer path resetting process between BHE 171 and BHE 172 in the sequence diagram of FIG. 6.

FIG. 7 is a sequence diagram illustrating a flow of processes in a case where a path switching control signal using a standby communication path between the BHE 171 and the BHE 172 in the sequence (a case of using the ACK signal) of FIG. 6 is transmitted and received.

First, the BHE 172 receives the switching request frame 20001 which is transmitted by the AE 112, following step S104 of FIG. 6. Using this as a trigger, the BHE 172 recognizes that a certain problem occurs which impedes continuous communication between the AE 112 and the BHE 171. Although the AE 112 transmits a plurality of switching request frames 20001 (20001-1 and 20001-2) for signal redundancy, path setting tables (a transfer table and a path table) in the SHE 172 are changed in the step (S301) in which the BHE 172 normally receives the frames. In other words, the standby path 922 which is not used in a normal operation becomes valid as a main signal path, and simultaneously a communication path directed to the AE 112 is set using the standby path 970 which connects the BHE 171 to the BHE 172 (S302). In addition, at the same time, a communication path is changed such that a transmission path is set to the standby path 970 in relation to an uplink signal from the AE 112 (S302).

For example, the BHE 172 has a BHE transfer table and/or an inter-BHE path table as described later, correlates an input communication path with an output communication path, and further stores active and standby identification information or failure identification information in advance in each table. In addition, when arrival of the path switching request frame is recognized, the BHE 172 sets a flag of the active and standby identification information or the failure identification information in standby system path information which is set in the BHE transfer table and/or the inter-BHE path table thereof in advance, so as to make an entry of the intercommunication path valid. The BHE 172 can perform path switching on a targeted flow by referring to the BHE transfer table and/or the inter-BHE path table.

In confirming normal reception in step S301, for example, normal reception may be recognized at a time point when a predetermined number of switching request frames 20001 are received, or a method may be used in which, after the switching request frame 20001 is received once, a confirmation frame is transmitted to the AE 112, and the switching request from the AE 112 is determined as being valid at a time point when reception of a reply (reconfirmation) frame for the confirmation frame from the AE 112 is confirmed.

A path setting in the self equipment is changed after the switching request frame 20001 is confirmed, and a transfer request frame 20002 for accommodating communication from the BHE 171 to the AE 112 in the standby path 970 is transmitted to the BHE 171. In addition, the transfer request frame 20002 is transmitted in multiple times in order to increase failure resistance (20002-1 and 20002-2). At this time, along with the start of transmission of the transfer request frame 20002, a timer for waiting for completion of a transmission setting to the standby path in the BHE 171 is activated (S304). In a step (S305) in which it is confirmed that a specific time has elapsed using the timer, the transfer request frame 20002 stops being transmitted, and the ACK signal 30000 for notifying of completion of preparation for the standby paths 922 and 970 is sent to the AE 112. An operation after the notification of the ACK 30000 is sent is the same as in FIG. 6.

In the same manner, after step A104 of FIG. 5, the same processes as in FIG. 7 (S301 to S305 etc.) may be performed.

Figure 8:
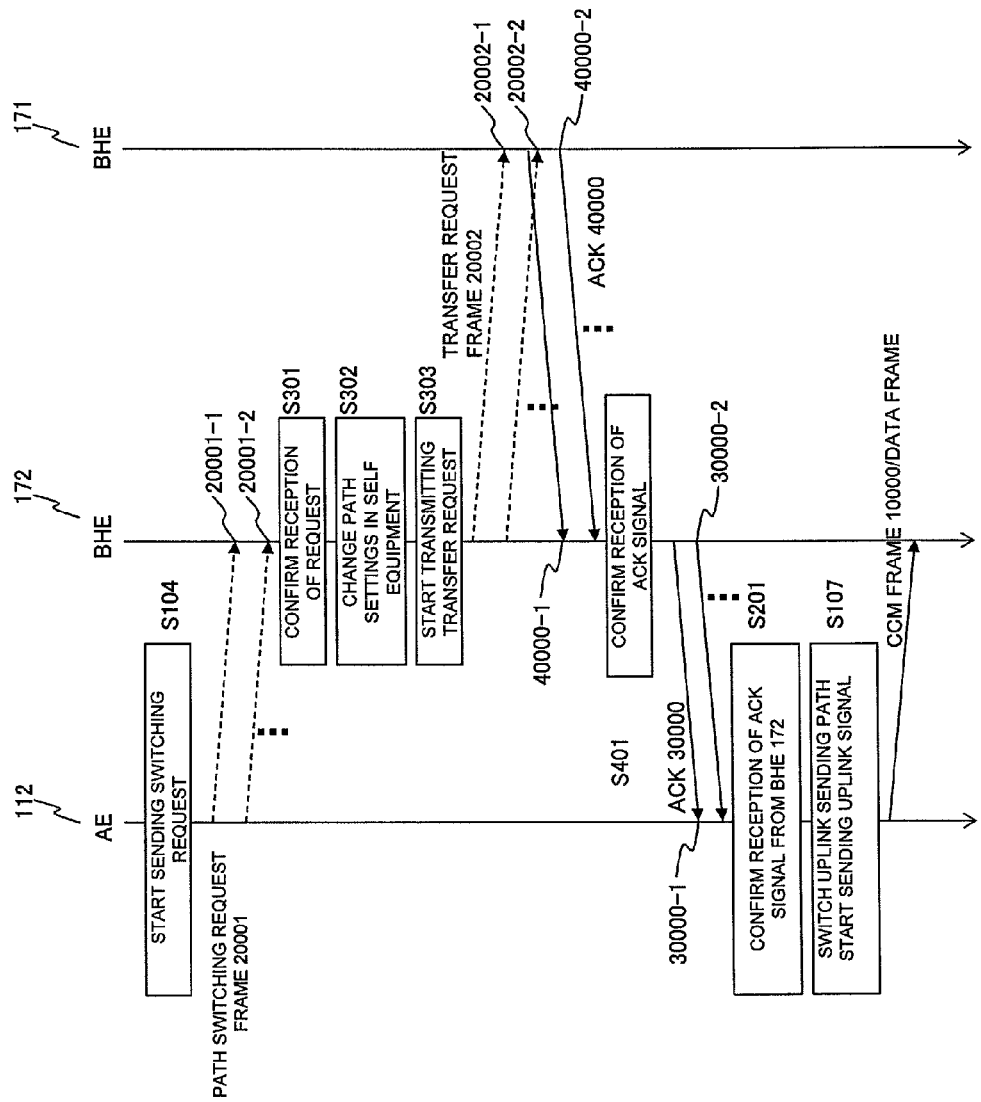
FIG. 8 is a sequence diagram illustrating a flow of processes different from FIG. 7, related to a transfer path resetting process between the BHE 171 and the BHE 172 in the sequence diagram of FIG. 6.

FIG. 8 is a sequence diagram illustrating a flow of processes different from FIG. 7 in a case where a path switching control signal using a standby communication path between the BHE 171 and the BHE 172 in the sequence (a case of using the ACK signal) of FIG. 6 is transmitted and received.

Processes from the transmission start of the switching request frame 20001 from the AE 112 until transmission of the transfer request frame 20002 starts in the BHE 171 are the same as in FIG. 7. Therefore, description up to step S303 in this figure will be omitted.

When the transfer request frames 20002 (20002-1, 20002-2, and the subsequent same frames) are received from the BHE 172, the BHE 171 changes path settings therein so as to set communication paths for a downlink signal directed to the AE 112 using the standby communication path 970 from the BHE 171 to the BHE 172, and for an uplink signal which has the AE 112 as a transmission source. After the transfer request frame 20002 is normally received, in a step in which the path setting in the self equipment is completed, an ACK signal 40000 for notifying of the transfer preparation completion is sent to the BHE 172. This figure shows a state in which the ACK 40000 is also transmitted in multiple times in preparation for any failure on the path 970 (40000-1 and 40000-2). As a method of conforming normal reception of the transfer request frame 20002, for example, normal reception may be recognized at a time point when a predetermined number of switching request frames 20001 are received, or a method may be used in which, after the switching request frame 20001 is received once, a confirmation frame is transmitted to the AE 112, and the switching request from the AE 112 is determined as being valid at a time point when reception of a reply (reconfirmation) frame for the confirmation frame from the Ad 112 is confirmed.

After the ACK signal 40000 is confirmed, the BHE 172 transmits the ACK frame 30000 for notifying of completion of preparation for the standby system paths 922 and 970 to the AE 112 via the path 922. A process after the AE 112 confirms the ACK 30000 is the same as in FIGS. 5 and 7.

In the same manner, after step A104 of FIG. 5, the same processes as in FIG. 8 (S301 to S303 and S401 etc.) may be performed.

Figure 9:
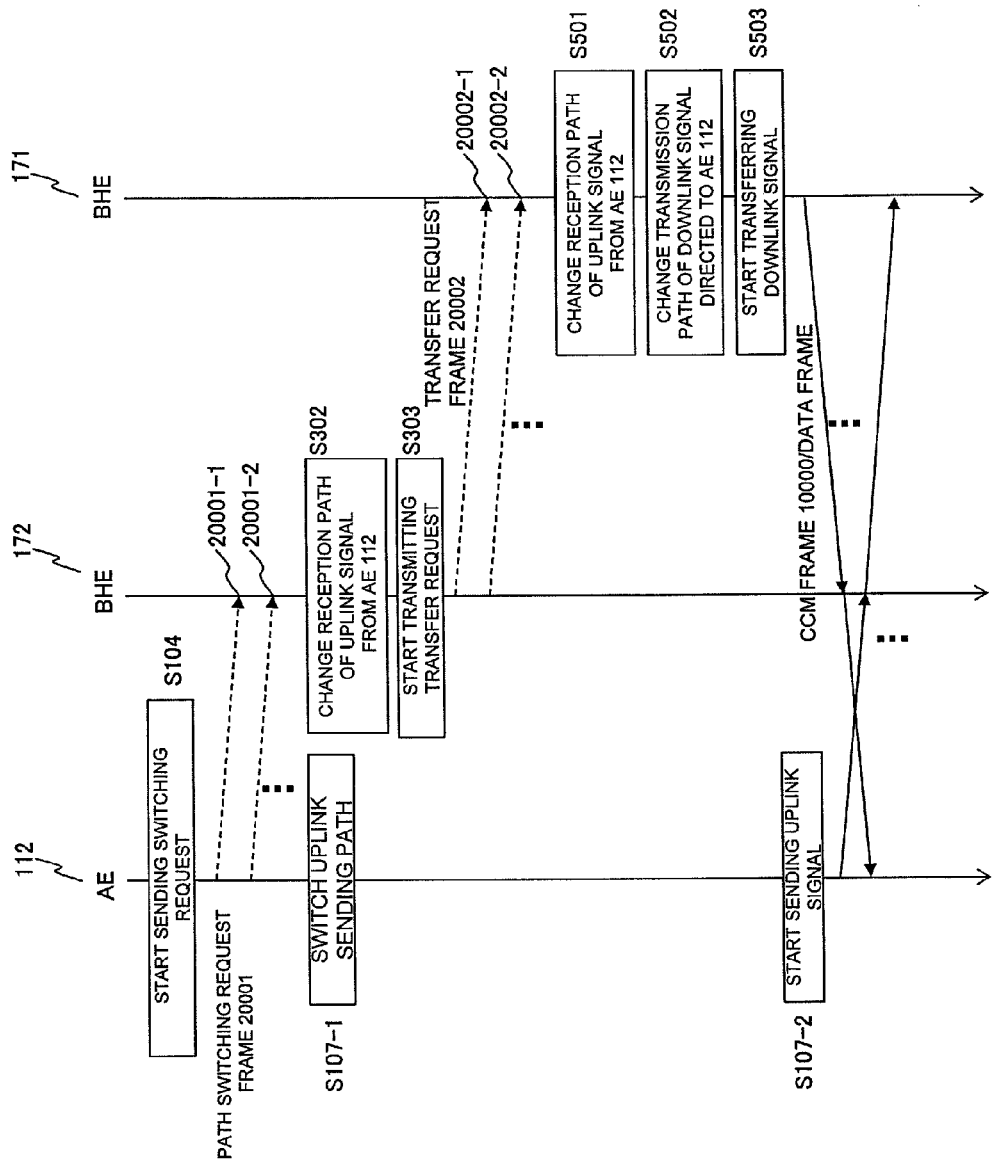
FIG. 9 is a sequence diagram illustrating path setting change procedures of the BHE 171 in the path switching process shown in FIGS. 5 to 8.

FIG. 9 is a sequence diagram illustrating changing procedures of the path setting table (path table) of the BHE 171 in the path switching sequence shown in FIGS. 5 to 8. This figure shows path setting procedures in the opposite edge equipment BHE 171 when the AE 112 is used as trigger equipment (that is, assuming that the AE 112 detects failures) for performing a series of path switching processes.

The process procedures from steps S104 to S303 are processes common to FIGS. 5 to 8, and thus description thereof will be omitted. In addition, the AE 112 may change a transmission path of an uplink signal to the standby system path 922 at a time point when the path switching request frame 20001 is sent to the BHE 172 (S107-1). When this path changing is performed, specifically, contents described in a transfer table (FIG. 10: 1110) and a management table (FIG. 10: 1310) are changed.

When the transfer request frames 20002 (20002-1 and 20002-2) are normally received from the BHE 172, the BHE 171 changes a path for receiving an uplink signal from the AE 112 which is a corresponding access line side edge equipment, from the active system path 921 to the standby path 970 between the BHEs (S501). Further, in relation to a downlink signal which is transferred from the BHE 171 using the path 921, a transmission path is changed to the standby paths 970 and 922 passing through the BHE 172 (S502). The path changing which is necessary in the BHE 171 is transferring a downlink signal directed to the AE 112 received from the core networks 210 and 220, to the standby path 970. A relay process in the BHE 171 is performed using the transfer table held in the BHE 171.

For example, the BHE 171 has a BHE transfer table and/or an inter-BHE path table as described later, correlates an input communication path with an output communication path, and further stores active and standby identification information or failure identification information in advance in each table. In addition, when arrival of the path switching request frame is recognized, the BHE 171 sets a flag of the active and standby identification information or the failure identification information in standby system path information which is set in the BHE transfer table and/or the inter-BHE path table thereof in advance, so as to make an entry of the intercommunication path valid. The BHE 171 can perform path switching on a targeted flow by referring to the BHE transfer table and/or the inter-BHE path table.

When the above-described processes are completed, entire communication (uplink/downlink signal process) between the AE 112 and the BHE 171 which has been performed using the active system path 921 before the failure 300 occurred is performed via the BHE 172, thereby securing communication between the AE 112 and the BHE 171. The AE 112 resumes sending of an uplink signal when the sending timer count is completed as shown in FIG. 5 or the ACK is received as shown in FIGS. 6 to 8 (S107-2).

2. Edge Equipment AE 2-1. Configuration of AE

Figure 10:
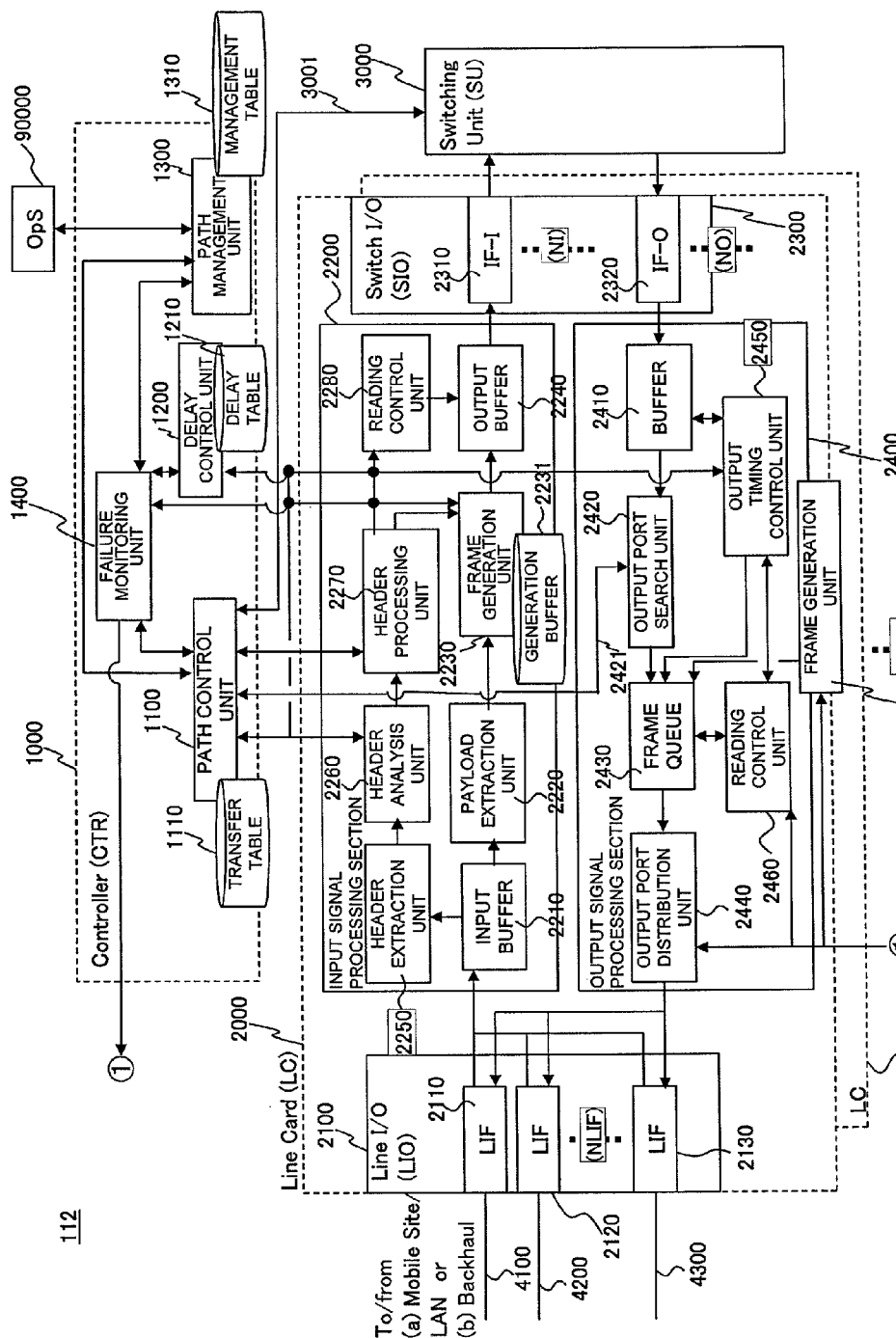
FIG. 10 is a block configuration diagram illustrating a configuration example of the user side edge equipment AE of the relay network 10 which accommodates access lines.

FIG. 10 shows a block configuration example of the user side edge equipment AE of the relay network 10 accommodating the access lines. Functional configurations of the AEs 111, 112 and 121 are approximately the same. Therefore, in this figure, a representative configuration example of these AEs will be described targeting the AE 112.

The AE 112 includes a line card 2000 (hereinafter, abbreviated to an LC in some cases; the LC is also referred to as an interface card), a switching unit 3000, and an equipment controller 1000 (hereinafter, abbreviated to a CTR in some cases). In a general configuration of the communication equipment, a plurality of LCs 2000 are accommodated, and the respective LCs 2000 are connected to one another via the switching unit 3000 (or in a connection form using direct data exchange paths between the LCs). The switching unit 3000 may be replaced with a direct connection path between the LCs. In addition, generally, there are cases where the switching unit 3000, the CTR 1000, and the LC employ a redundant configuration in which a standby system block having equivalent functions is provided in preparation for equipment breakdown. In addition, the features of the present invention and the present embodiment are not influenced by whether or not there is a redundant configuration inside the equipment. For this reason, a redundant configuration method is not shown in this figure. Of course, even introduction of the redundant configuration does not influence implementation of the present invention and the present embodiment, and effects expected by the present invention and the present embodiment do not vary.

Hereinafter, each function will be described along a flow of a signal input to the AE 112.

First, user data (hereinafter, also referred to as a main signal) is input to a line input and output unit 2100 (hereinafter, abbreviated to an LIO unit) of the LC 2000 via the access line 60. The LIFs 2110, 2120 and 2130 are interfaces (LIFs) for accommodating lines. In this configuration, it is assumed that the number of NLIF interfaces are provided. When the LIF confirms that the user data is input, the user data is transferred to an input buffer 2210. The input buffer 2210 is one of functions of an input signal processing unit 2200, and temporarily holds an input signal until the signal is terminated or a transfer process thereof is completed. The LIFs 2110 to 2130 include an optical signal transmission and reception module or an electrical line interface, recognize a reception start position (or a reception start time point) of a signal, and extract the signal for each specific cycle in a case of a synchronous line and with the packet/frame units in a case of a packet/frame communication line. A signal stored in the input buffer is a signal extracted through the above-described process in the LIFs 2110 to 2130, and holds formed information for each predefined unit.

Next, the input signal processing unit 2200 will be described. Here, the description will be made assuming that a form of a received signal is a frame form. Through the above-described process, header information including information (frame control information) related to a transfer process of the information such as a destination identifier and a transmission source identifier of the received information, and payload information including the information itself are stored in the input buffer. After the information is stored, the frame is divided into a header part and a payload part.

First, a header extraction unit 2250 reads the header part from the input buffer 2210 and transfers the header information to a header analysis unit 2260. The header analysis unit 2260 refers to the received header information, confirms a destination of the frame, and confirms path information in order to send the frame from an appropriate output line. In addition thereto, it is checked whether or not appending, conversion, and deletion of the header information are necessary. In a case where the input frame is an MPLS frame, there are cases where an MPLS label which is appended to the input frame is different from an MPLS label to be appended at the time of output. Further, before and after passing through the AE 112, a case where a process priority of the information, a value of Time To Live (TTL), or the like is required to be updated is also included in the header information conversion process. This operation of the header information is performed in a header processing unit 2270. After the header information of an output frame is fixed through the above-described process, the header information is transferred to a frame generation unit 2230. Here, the header information is stored in a frame generation buffer 2231.

On the other hand, in the payload part (a main body of the received information) a payload extraction unit 2220 is extracted from the input buffer 2210. Since, in a typical frame configuration, a header part and a payload part are continuously located, the header extraction unit completes reading of the header, and, then, the payload extraction unit confirms an information start position and starts reading. For this, the payload extraction unit 2220 also has a header identifying function, or the payload extraction unit 2220 is notified of a payload start position from the header extraction unit 2250. The configuration can be realized by either method, and, here, the former configuration is assumed (the head identifying function in the payload extraction unit 2220 is not shown; detailed description of the function is omitted). The payload information is transferred to the frame generation unit 2230 so as to form an output frame in combination with corresponding header information. A difference between a process time from header extraction to header configuration completion and an arrival time to the frame generation unit 2230 from the payload extraction unit is absorbed by the frame generation buffer 2231. In other words, a side which arrives earlier waits until the header information and the payload (information main body) are combined in the frame generation buffer 2231 and thus a frame is formed. After an output frame of the information is generated, the output frame is moved to an output buffer 2240. The output buffer 2240 provides a queue for a plurality of frames waiting for output to the switching unit 3000. A reading control unit 2280 is provided so as to perform a process such as a priority output of a frame in relation to output to the switching unit 3000 from the queue. Information which is a basis of reading control in the reading control unit 2280 is based on a header processing result of each frame accumulated in the output buffer. In this figure, the header processing unit 2270 gives the information to the reading control unit 2280.

The switching unit 3000 generally secures a sufficient capacity for the number of input frames (input data amount) from each LC 2000 (and 2000-2). The switching unit selects an appropriate LC 2000 based on destination information in relation to a frame received from an input signal processing section 2200 and transfers the frame to an output signal processing section 2400 of the LC 2000. A correspondence relationship between the destination information and the transmission destination LC is determined by a path control unit 1100 and a transfer table 1110. In this figure, since the whole or some of the path information can be shared by the path control unit 1100 and the switching unit 3000, a control line 3001 is shown. Alternatively, as another method, a method may be used in which, since the switching unit 3000 has only to know an identifier of a transmission destination LC (inside the switching unit 3000) of a received frame, the header processing unit 2270 inserts the identifier into the frame header in advance. In this case, since the information is valid information only inside the equipment, the identifier is inserted into a region which is generally called an equipment inner header in order to be appended to the outside of the header information, for example. The equipment inner header is deleted in advance when the frame is sent from the LIO (2100) to the outside. A location for deletion is inside the output signal processing section 2400 or the LIO (2100). In the present embodiment, although a method of deleting an inner header in the LIO (2100) is assumed in a case of appending the inner header, the present invention and the present embodiment can be implemented in either method.

The output signal processing section 2400 plays a role of making a frame which is received from the switching unit 3000, sent from an appropriate LIF which is directed to a destination of the frame. In a step in which a frame is received from the switching unit 3000, the LC 2000 including a sending interface of the frame is selected, but an output interface is not specified yet. The output signal processing section 2400 determines the output interface.

Timing when the output signal processing section 2400 receives an output frame from the switching unit 3000 is generally indefinite (cannot be controlled by the output signal processing section 2400 side). Therefore, there is provided a buffer 2410 which temporarily accumulates a frame which is received from the switching unit 3000 via a switch interface part of the output frame from the buffer 2410, and determines an interface (one of the number of NLIF interfaces indicated by the reference numerals 2110 to 2130) which will send the frame. This interface may be indicated by only an identifier of a physical line or may be identified through combination of both identifiers of a physical line and a logical line. In a case of an Ethernet (registered trademark) frame or an MPLS frame, a plurality of VLAN tags or MPLS labels may be often inserted into a frame header. In this case, there is a probability that transmission of a forward frame may be impossible unless there is an identifier of the logical line even if only the physical line is assigned. For this reason, the physical/logical line identifiers are sent in a state of maintaining a frame form stored in the buffer 2410 as an output frame except for an identifier stored in the above-described inner header (generally, information which can be identified by other communication equipments). An output port is determined based on the transfer table 1110 of the path control unit 1100. In the present embodiment, since information included in the transfer table 1110 can be shared by the output port search unit 2420 and the path control unit 1100, a control line 2421 is shown. As described above, an output port may be designated in the method of using the equipment inner header. In this case, the control line 2421 is not necessary. The header processing unit 2270 inserts an output port identifier into the inner header by referring to the transfer table 1110, and the output port search unit 2420 stores the frame in a frame queue 2430 which is provided for each destination port by referring to the identifier.

A reading control unit 2460 has a function of finally determining timing when a frame is sent from the AE 112. A reading control method includes changing order of frames to be processed due to a priority output based on the header information of the frame, congestion on a path in output destination lines 4100 to 4300 corresponding to the frame queue 2430, traffic concentration on some output lines inside the frame queue 2430, or the like. Information which is a basis of the reading control in the reading control unit 2280 is based on monitoring of a state of the frame queue 2430 as well as the frame header, and state monitoring with the failure monitoring unit 1400 using the control line. A frame which is instructed to be output by the reading control unit 2460 is transferred from the frame queue 2430 to an output port distribution unit 2440. The output port distribution unit 2440 transfers the frame to a predetermined line interface LIF (any one of 2110 to 2130 in this configuration example) according to the line identifier inserted into the frame header. The reason why the output port distribution unit 2440 is provided on the rear stage of the frame queue 2430 is that, for example, in a case where a communication network employing a Line Aggregation (LAG) technique performs large capacity communication by linking a plurality of physical lines, it is necessary to practically select a line for sending each frame, and a frame copying process is necessary to transmit frames on all the lines in a case of a multicast frame. Since an output frame generated according to header information of an input frame is stored in the frame queue 2430, a relationship of the number of frames between the input frame and the output frame is one to one. The reading control unit 2430 performs sending/waiting instruction based on the frame header information and the payload information. Therefore, the output port distribution unit 2440 has a function of finally specifying a sending line.

As shown in FIGS. 2 and 3, if a use path is to be switched when path failures occur, the AE 112 is required to register two or more sending destinations of frames in the transfer table regardless of whether an output port is determined by 2420 or the header processing unit 2270. Further, a priority is given to the line group, and thereby to which line a frame is preferentially output (that is, which line is used as an active system or a standby system) is set. The failure monitoring unit 1400 determines a normal state or an abnormal state, and the output port distribution unit 2440 distributes an output line according to the determination.

Process procedures in the delay control unit are as follows. When the AE 112 receives a CCM frame from the BHE 171, the CCM frame is processed according to the above-described procedures. Since the CCM frame is the AE 112, if the header analysis unit 2260 detects that the CCM frame is directed to the self equipment, an operation of the header information which is a subsequent process is not necessary. The header analysis unit 2260 notifies the failure monitoring unit 1400 of an arrival time and an arrival interval of the CCM frame via the control line. The failure monitoring unit 1400 checks the notified communication circumstances of the CCM frame and determines whether or not the circumstances are in an abnormal state. The determination method depends on implementation much, and, for example, there is a method in which it is determined that failures occurs on a monitoring target path if a CCM frame is not normally received over 3.5 times more than the CCM frame transmission cycle as described in the ITU-T or IEEE standard regulations. When the path failures are detected, the failure monitoring unit 1400 instructs the frame generation unit 2230 to generate a switching request frame. This switching request frame is a frame which is sent to the BHE 172. The switching request frame is generated, is then promptly stored in the output buffer 2240, and is read as a high priority frame in response to an instruction to the reading control unit 2280 from the failure monitoring unit 1400. The frame which is stored in the buffer 2410 via the interfaces (IF-I (2310) and IF-O (2320)) of the switch interface (SIO) unit is read as a high priority frame in response to an instruction from the failure monitoring unit 1400 or according to inner header information appended to the frame, and is promptly transferred to the frame queue 2430. Further, the frame is output from the reading control unit 2460 of the frame queue 2430 as a high priority frame, and is sent to a line directed to the BHE 172 by the output port distribution unit 2440. The failure monitoring unit 1400 is required to record the path in which the failures occur. In this configuration example, the failure monitoring unit 1400 can also refer to the transfer table 1110 using the control line connecting the failure monitoring unit 1400 to the path control unit 1100. Since this mutual reference is used, the transfer table 1110 includes a field indicating (identifying an operation path) failure circumstances (path use circumstances) in addition to the path distribution information (FIG. 11). Of course, a method may be employed in which the failure monitoring unit 1400 has a path list independent from the transfer table, and failure circumstances are recorded in this list.

FIG. 11 shows a table configuration example of the transfer table 1110 of FIG. 10. This table 1110 correlates an input path of a signal with an output path thereof. The table 1110 includes a parameter 1116 indicating whether or not failures occur in each registered path, and a line priority 1115 which is used to select a use line in a case where a plurality of lines can be used. The line priority field 1115 is indexes (one thereof) for giving a priority to a communication line which may possibly be a transmission destination when the AE 112 processes a received signal. This table further includes a line type field 1119, and it is determined whether a path via which a signal is received and a route to which the signal is output at each time point are of active system or of standby system on the basis of the field.

The AE 112 processes the received signal (assuming a packet format in the present embodiment) using the table of FIG. 11A. Specifically, a "flow" formed by a series of packet groups and a path through which the flow should pass are identified. For this reason, identifiers (route ID) 1111 of the physical lines 4100 to 4300 or the physical interfaces 2110 to 2130 for receiving a signal and an identifier (a flow ID) 1112 for a signal (logical line) multiplexed on a corresponding line are used. An output route ID 1113 and an output flow ID 1114 are used to identify an output line corresponding thereto. In other words, a received flow and a path through which the flow passes are specified through a combination of four types of parameters.

In the present embodiment, the BHEs 171 and 172 form a pair of redundant systems in a communication path from the AE 112 to the core networks 210 and 220. Each path is indicated by an active system (Working Path/Connection; W) or a standby system (Protection Path/Connection; P). The first entry and the third entry of FIG. 11A are applied to signals which are input from the same physical line and have the same logical identifier. The first entry is an active system (high priority) and the second entry is a standby system (low priority). A failure state field 1116 indicates whether or not a communication state on a path identified by each entry is normal.

When the failure monitoring unit 1400 checks a communication state of the CCM frame and detects communication abnormality, a failure occurrence flag is recorded in the failure circumstances field 1116 on the path. Since communication in the path is required to stop along with the failure flag, a priority flag of the entry is changed when the abnormality is detected. For example, when failures occur in an output destination path of the first entry, a failure mark is written in the failure field 1116 of the entry, a priority of the path is changed to "Low", and a priority of the second entry which is a replacement path is changed to "High".

In the field in which other flags are described, for example, whether or not there is a signal using the entry, whether or not the entry is valid (based on a contract (an operation state) or a failure state), or a standby system entry number (a table address indicating the entry) corresponding to the entry is described. Particularly, it is important in the present embodiment to hold a correspondence relationship between an active system path and a standby system path. For example, in most cases, if paths are different, different identifiers are used as identifiers of logical lines. In addition, there are cases where 1+1 redundant systems (or Link Aggregation) are formed for a single flow. In these cases, it is necessary for the AE 112 to perform a transfer process by combining received signals from a plurality of paths in which identifiers of a physical line and a logical line are different from each other. Even in this special setting as such, the entries are correlated with each other in advance, and thereby it is possible to promptly search for a corresponding replacement path when failures occur.

It is important to correlate a logical line identifier (the output route ID 1113 and the output flow ID 1114) of an output line with a physical line identifier of an interface which practically outputs a signal. In a case where the input route ID 1111 and the output route ID 1113 are IDs indicating physical lines, there is no problem, but in a case where each rout ID is a logical route ID, it is necessary to correlate the logical line with a physical line for practically sending a signal. This case is also handled using the other-flag field 1119.

FIG. 11(B) shows a configuration example obtained by simplifying the transfer table 1110. In the table (B), identifiers 1117 of (typically, a plurality of) access lines 60 accommodated by the AE 112, and identifiers 1118 which correlate the access lines 60 with an active system path (for example, the path 921 in FIGS. 1 to 4) or a standby system path (for example, the path 922 in FIGS. 1 to 4) in the relay network 10, are described.

When an input signal from the access line 60 (referred to as a User Network Interface (UNI)) is transferred to a Network Interface (referred to as an NNI), the AE 112 determines whether the signal is transferred to an active system path or a standby system path by referring to this table. In order to employ the configuration of FIG. 11(B), it is necessary to correlate the access line 60 (the path 621 in the AE 112) with the input route/flow ID (1117) one to one. In addition, also in relation to the relay network 10 side interface, it is necessary to correlate the active system path 921 with the output route/flow ID (1118) or correlate the standby system path 922 with the output route/flow ID (1118) one to one. A means for this correlation is the same as that in setting the table (A). In other words, the means can be employed by designating a physical line as a route ID or performing correlation using the other flag field.

In addition, FIGS. 11(A) and 11(B) include both of (1) the entry (1110B-1) corresponding to upward communication in which an input signal from the access line 60 is transferred to the core networks 210 and 220 and (2) the entry (1110B-2) corresponding to downward communication in which a signal is output to the access line 60 from the relay network 10. This table configuration may be divided for each communication direction (upward/downward) and be mounted.

FIG. 12 shows a configuration example (A) of the management table 1310 held by the path management unit 1300 forming the controller 1000 of the AE 112. This table is a database which collects path information set in the AE 112 (the transfer table 1110 of FIG. 11 is some of the path information). The path management unit 1300 has a function of transmitting and receiving information to and from an Operating System (OpS) 10000, and the management table 1310 plays roles of holding path setting information input from an operator, and checking communication circumstances in each path of which an operation is in progress so as to be presented to the operator (enabling the operator to monitor a state).

The configuration example (A) of this figure is a configuration example corresponding to the table entries of FIG. 11(A). This example includes identifiers (flow IDs) 1311 of Flow-1 and Flow-2 which are search targets when referring to the table entry, a signal transmission direction (communication direction) 1312 for each flow, active system path setting information 1313 for the flow, a standby system path setting information 1314 for the flow, an identifier 1315 of a redundant system path (active system/standby system) which is currently used by the flow, and an other flag filed 1316.

The active system path setting information 1313 for each flow includes an input route ID 1313-1 and an output route ID 1313-2, and the standby system path setting information 1314 includes ID 1314-1 and an output route ID 1314-2.

This configuration example shows that a flow identifier appended to an uplink communication signal which is received (from the access line 60) by the AE 112 is VLAN-j, and LSP-m or LSP-n is used as a flow identifier when the received flow is transferred inside the relay network 10. In addition, it is shown that a path which is currently used by the flow is an active system (W). This is also the same for downlink communication, and it is shown that, VLAN-q which is set to be directed to the access line 60 is applied (appended) to the signal Flow-2 (identifier: LSP-y or LSP-w) which is received from the relay network 10 by the AE 112, so as to be transferred. A system which is currently selected and used by Flow-2 is an active system (W).

FIG. 13 shows another configuration example (B) of the management table 1310 held by the path management unit 1300 forming the controller 1000 of the AE 112. This table configuration diagram shows an example in which some of the information forming the management table 1310 is collected. It is possible to realize path management by collecting and maintaining the table configuration diagram (A) shown in FIG. 12 and the configuration example (B) of this figure in a single table, or by a method of maintaining (A) and (B) as divided tables and providing communication means which maintains the tables without contradiction to each other by referring to parameters described in the mutual tables at any time.

FIG. 13 correlates a physical line interface with header information. On the other hand, FIG. 12 correlates header information with a flow ID. In other words, the configuration (A) correlates the high rank layer information (operation administrator-oriented information such as service design-setting policy/concept) with the header information, and the configuration (B) correlates a low rank layer information (hardware information) with the header information.

The table (B) of this figure shows a correspondence relationship between the physical line interfaces 2110 to 2130 which receive a signal and a logical line which is multiplexed on the physical line 4100 and is identified using header information such as an MPLS label in relation to each input signal (flow). At the same time, the physical line interface is correlated with a hierarchized logical line (or hierarchized flow) in which an identifier is further added to a logical line (header information indicating the logical line) and a signal is multiplexed (for example, stacking of VLAN tags of Ethernet (registered trademark) or stacking of MPLS labels) and is transferred.

The entry of the table (B) is set for each physical line interface identifier 1317 (physical IF-ID). An interface type 1318 (line type) which is different for each communication protocol is set in the entry. As the line type, for example, there are a Gigabit Ethernet (registered trademark) line (GbE), 10 GbE, POS, 10 Gbps-POS (10G-POS), and the like. Although a form in which they are directly described in the table is shown in this figure, there may be a configuration in which an identifier such as a line number is set for each line type, and the identifier is described in this table, when the table (B) is actually built. Since a single physical line 1317 can include a plurality of logical lines, the physical line 1317 includes the same identifier in the entry 1317 so as to match the number of logical lines. Further, this table records a communication direction 1319 for each logical line therein. Since paths used in an outbound path and an incoming path may be set to be different in communication between the AE 112 and the BHE 171 (172), it is necessary to record the communication direction 1319 for each logical line. Further, a logical path identifier 13170 for forming a logical path is included. An input route ID 13171 and an output route ID 13172 are described in the logical path identifier 13170. In a case of a signal in which an identifier of an input signal is indicated by the input route ID 13171 when the signal passes through the physical line 1317 of the entry in the direction described in the communication direction 1319, a series of correlation between the parameters is defined in which the output route ID 13172 is appended to the signal so as to be output from the AE 112. Further, the system type 1398 regulates whether a communication signal expressed by a combination of the above-described parameters 1317 to 13172 is used in an active system path (W) or a standby system path (P). The system type 1398 is an item for determining a use priority of each path in a case of setting a plurality of logical paths, and, for example, in a case of two paths, identifiers for identifying the active system and the standby system are described therein. Further, in a case of setting a plurality of paths in order to protect between the AE 112 and the BHE 171 (172), an identifier indicating a use priority (ordering to be validated) of each path is described in the system type 1398. In an other-information field 1399, information of validity of the entry (whether or not the entry is invalid), a use frequency of the path, the set band in a case of setting a band assignment to each path, and the like is described.

FIG. 14 is a configuration example of the delay table 1210 held by the delay control unit 1200 of the AE 112.

This table 1210 includes a flow ID (1311), a path ID (a logical line ID (13170)) indicating a path through which the flow passes, and a transfer waiting time (1211) which is to be requested for the flow. In addition, as other parameters, a line type 1318, a communication direction 1319, a system type 1398, and other information(s) 1299 are included. Other parameters are information which is referred to when the transfer waiting time 1211 is determined, or information which is referred to and thereby an appropriate waiting time setting is possible. For example, the transfer waiting time 1211 is required to be set to be shorter as the line type 1318 (that is, a line speed) is faster (a transfer performance is higher) in order to reduce influence on communication. In addition, in a case where a communication direction is directed to the core networks 210 and 220 (an uplink signal), some transfer waiting time 1211 is necessary when the path is switched in the relay network 10 in the AE 112; however, in a case of a downlink signal, the transfer waiting time 1211 in the AE 112 is regarded as a signal instantaneous interruption time which is required for the path switching process. The signal instantaneous interruption time in the latter (when a downlink signal is transferred) is used in a case of changing a process priority (a priority of a reading process from the frame queue 2430) of a data frame which is transferred to the access line 60 from the AE 112 according to the type of data frame, before and after switching, for example.

In determining the transfer waiting time (1211), a count time of a timer is referred to in a case of using the transfer waiting timer when the switching process is performed as shown in FIG. 5. The transfer waiting timer is provided in the delay control unit 1200, and the transfer waiting time is determined by referring to a value of the timer counter when a signal passing through the path is received from the access line 60 during the path switching process. In other words, the timer counter and the transfer waiting time 1211 of the table 1210 are synchronously operated. On the other hand, in a configuration in which transfer is resumed using a reception confirmation of an ACK signal from the BHE 172 as a trigger according to the sequence shown in FIGS. 6 to 8, a predefined maximum value is described in the transfer waiting time 1211, and a signal of the flow is sent when transfer can be resumed. The maximum value set at this time may be determined for each flow ID 1311 (according to the type of service accommodated by the logical line 13170). The waiting time is managed with the signal (frame) unit, and whether a frame which exceeds a transfer waiting time (maximum value) of the flow from a signal reception time is discarded or accumulated is determined depending on the type of service. In a case of confirming the ACK as in the latter case, a flag indicating whether or not transfer is possible according to reception/non-reception of an ACK is described in the other-information field 1299 and is used together with the transfer waiting time field 1211.

Figure 15:
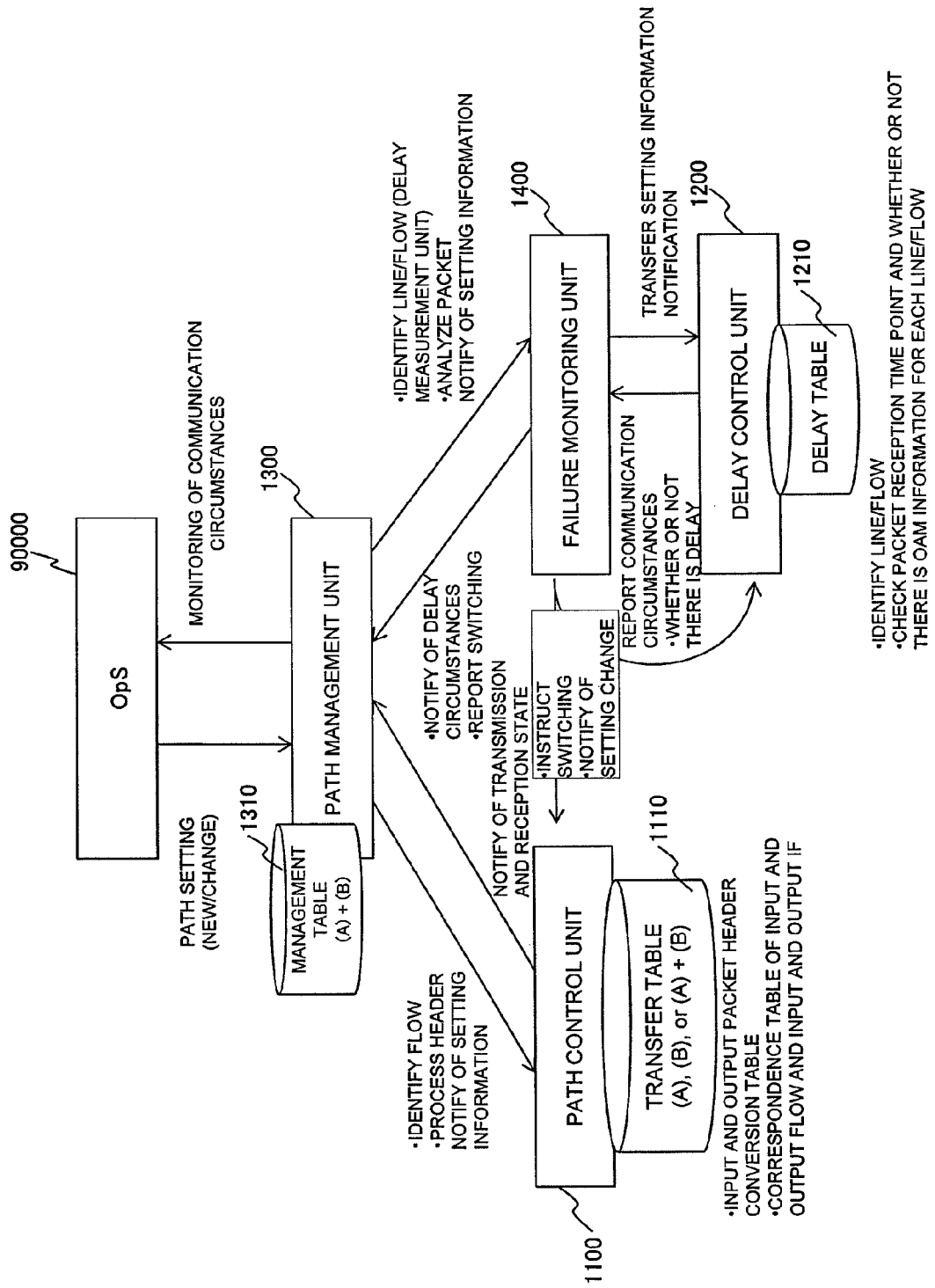
FIG. 15 is an explanatory diagram illustrating a mutual relationship among the respective management tables shown in FIGS. 11 to 14.

FIG. 15 shows an interrelationship among the tables shown in FIGS. 11 to 14. A role of each table, a configuration example thereof, and a use method when practically operated are the same as described with reference to FIGS. 11 to 14, and thus repeated description will be omitted here.

2-2. Process of AE

Figure 16:
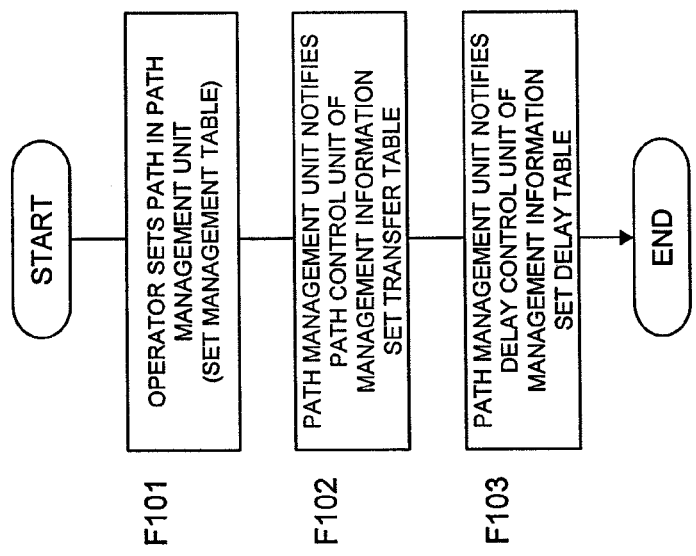
FIG. 16 is a flowchart illustrating a flow of processes related to setting path information in the AE 112.

FIG. 16 is a flowchart illustrating a flow of processes related to setting path information in the AE 112. The operator accesses communication equipment such as the AE 112 or the BHE 171 via the OpS (90000) and inputs communication path settings for forming a communication network therein. In the present embodiment, the path management unit 1300 manages whole path information which is input to the AE 112. Therefore, path setting information input from the operator and communication circumstances in each path are recorded in the database 1310 (the management table) managed by the path management unit 1300. The operator may access the path management unit 1300 in order to check communication circumstances.

This flowchart shows a flow of processes when an initial setting of the AE 112 is performed. First, path information is input to the path management unit 1300 from the operator. The path information is held in the path management unit 1300 as the management table 1310 (F101). The path information which is temporarily held in the path management unit 1300 is shared by the delay control unit 1200 and the path control unit 1100 and is used to perform a process required for each function. The path control unit 1100 holds the path information which is held by the path management unit 1300, in a form of the transfer table 1110 in order to perform a transfer process based on a header analysis result of an input frame (FIG. 11) (F102). Further, the delay control unit 1200 monitors a delay time on a communication path at any time, and records state variations such as deterioration in a communication performance or communication disconnection caused by congestion or failures on the path. In addition, a process of delaying (waiting up to sending time) sending from the AE 112 for a specific time is performed according to the type of transferred information. In order to realize it, the delay control unit 1200 holds the information of the path management unit 1300 in a form of the delay table 1210 (F103). In addition, the transfer table 1110 reflects the latest circumstances thereon at any time in response to a control signal from the failure monitoring unit 1400 in a case where switching of a communication path occurs or the like. The information held in the delay table 1210 is also rewritten at any time according to communication circumstances. A notification of the communication circumstances generated by each functional unit is sent to the path management unit 1300 periodically or at any time in a case where a communication state varies, so as to be reflected on the management table 1310.

Figure 17:
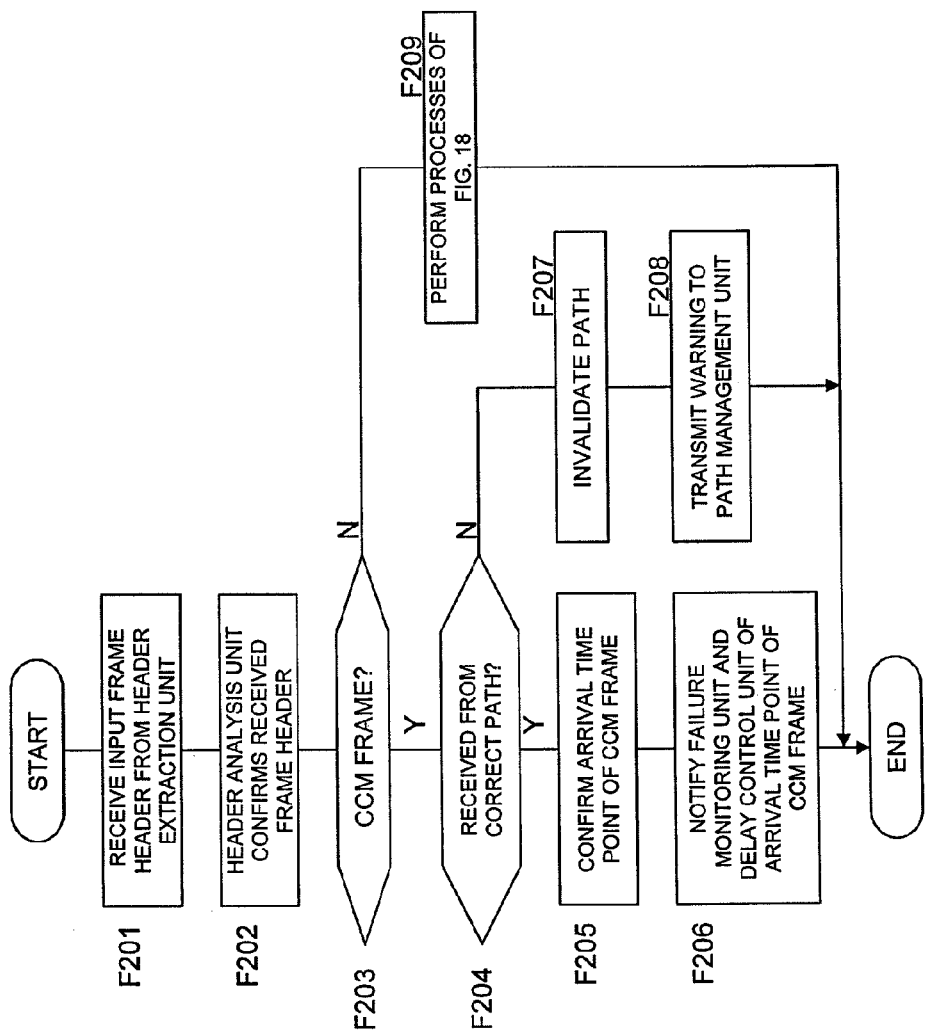
FIG. 17 is a flowchart illustrating processes related to a path monitoring frame (a CCM frame) in a header analysis unit 2260 of the AE 112.

FIG. 17 is a flowchart illustrating processes related to a path monitoring frame (a CCM frame) in a header analysis unit 2260 of the AE 112. As a frame type processed by the header analysis unit 2260, there are a user data frame received from the access line 60, a CCM frame received from the BHEs 171 and 172, and an OAM frame for performing control inside the relay network 10. Among them, this figure extracts and shows a flowchart regarding a process on the CCM frame related to the path switching process of the present embodiment.

The header analysis unit 2260 starts a header analysis process using an input of frame header information from the header extraction unit 2250 as a trigger (F201). After the process starts, first, the received frame header is analyzed (F202). In this step S202, information (parameter) required for the analysis process is extracted from the received frame header information, and a process method is determined inside the header analysis unit 2260 by referring to the parameter, or the path control unit 1100, the failure monitoring unit 1400, and the delay control unit 1200 are notified of the parameter, and a header analysis process is performed by referring to a response notification from each functional unit obtained as a result thereof or in a form according to the response notification.

Figure 18:
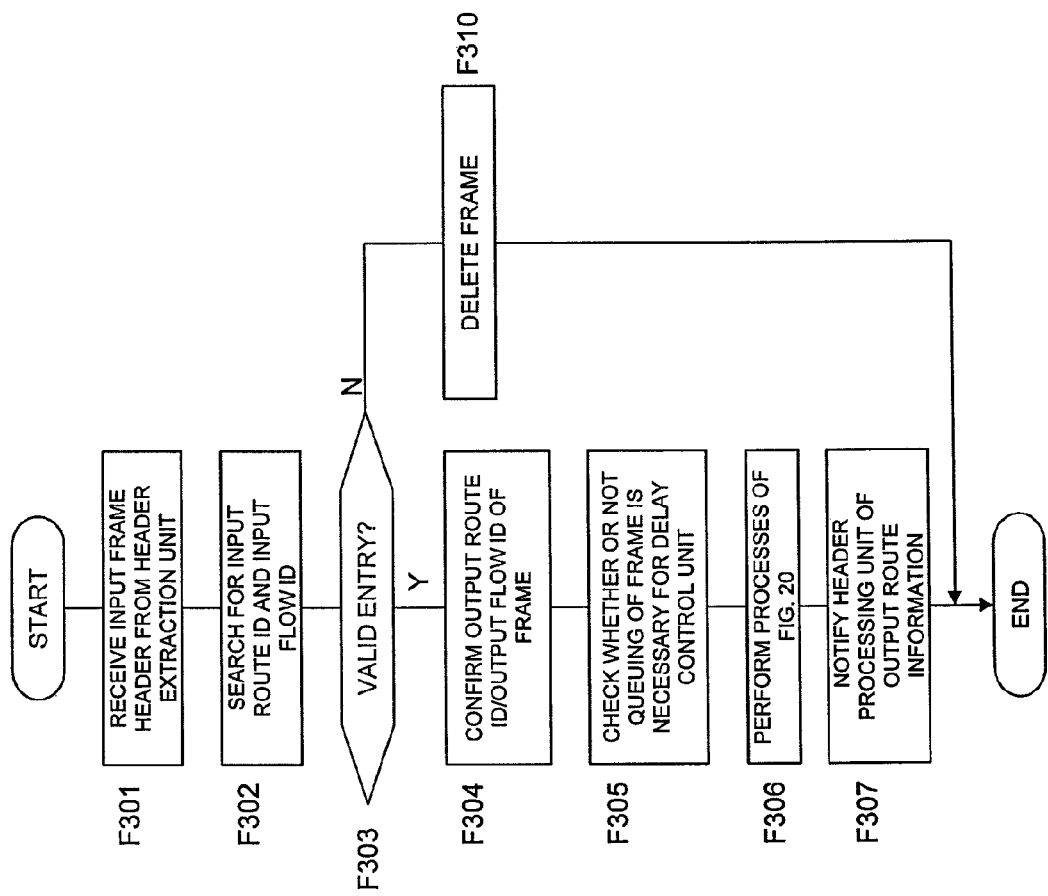
FIG. 18 is a flowchart illustrating process procedures of a user data frame in the header analysis unit 2260 of the AE 112.

Processes after step S203 are processes related to the CCM frame. First, it is determined whether or not the received frame is a CCM frame (F203). If the received frame is a normal data frame which is not the CCM frame, for example, a data frame received from the BHE 171 or a data frame received from the access line 60, a header process is performed on the normal frame, and the frame is terminated or is transferred as shown in FIG. 18 described later (F209). If the received frame is recognized as the CCM frame in step S203, the flow is moved to a process on the CCM frame.

First, it is checked whether or not the CCM frame is received from a normal path (F204). If the CCM frame is to be sent, equipment or an equipment interface which is a generation and transmission source thereof, and equipment or an equipment interface which is used as a reception side of the CCM frame are required to be clearly regulated before the system is operated. This setting can be confirmed in the failure monitoring unit 1400 and the path control unit 1100 via the path management unit 1300. If the CCM frame is received from a path other than the expected paths, since the path is a path which is not set in the relay network 10 by the operator, the path is closed (F207), and a notification of the fact indicating that the unexpected CCM frame is received is sent to the path management unit 1300 for warning (F208).

If the CCM frame is received from a set (approved) path, an arrival time of the CCM frame at the AE 112 is recorded (F205). This time point is used to confirm a CCM frame reception interval when another CCM frame is received from the same path after a specific time has elapsed. In addition, in a case where the CCM frame can not be received for a specific time or more (for example, in a case where the path failure 300 occurs or the like), an elapsed time from a time point when the CCM frame finally arrives is referred to, and occurrence of the failure 300 is recognized using the above-described predetermined elapsed time. The failure monitoring unit 1400 and the delay control unit 1200 are notified of the arrival time recorded in step S205 and a path ID (a physical line ID or a logical line ID) for identifying the path through which the CCM frame passes (F206).

FIG. 18 is a flowchart illustrating process procedures of a user data frame in the header analysis unit 2260 of the AE 112. This figure shows the process in step F209 of FIG. 16.

The header information of the received frame is received from the header extraction unit 2250 (F301), and the information is inquired of the path control unit 1100 (F302). The path control unit 1100 searches the transfer table 1110 so as to check whether or not the frame is included in the entries, and check the validity of the entry when valid/invalid information of the entry is included in the other-flag field 1119 (F303). Here, in a case where the header information is not included in the entries of the transfer table 1110, or the entry is invalid, a notification is sent to the header analysis unit 2260 so as to discard (delete) the received frame (F310).

In a case of a valid entry, the path control unit 1100 extracts both or either an output route ID and/or an output flow ID of the frame (F304). In addition, the output route ID (1111, 1112, or 1117) and the output flow ID (1113, 1114, or 1118) are extracted from the transfer table 1110. Along with the search of the transfer table 1110, the path control unit 1100 checks whether or not queuing is necessary when transfer is performed for the delay control unit 1200 (F305). Whether or not queuing is necessary can be known, for example, by checking a communication state of a transmission destination (output route) of the frame from the delay table 1210 and by confirming the transfer waiting time 1211 which is described when a switching process is in progress for some reason such as occurrence of failures in the path or path holding at the time of maintenance by the operator. The header processing unit 2270 is notified of information (header processing information for outputting the frame to the output route) related to the output route ID and the output flow ID extracted from the transfer table 1110 and whether or not queuing is necessary (and queuing time when the queuing is necessary) (F307). Process procedures of the frame information in the delay control unit 1200 in step F306 will be described with reference to FIG. 20.

Figure 19:
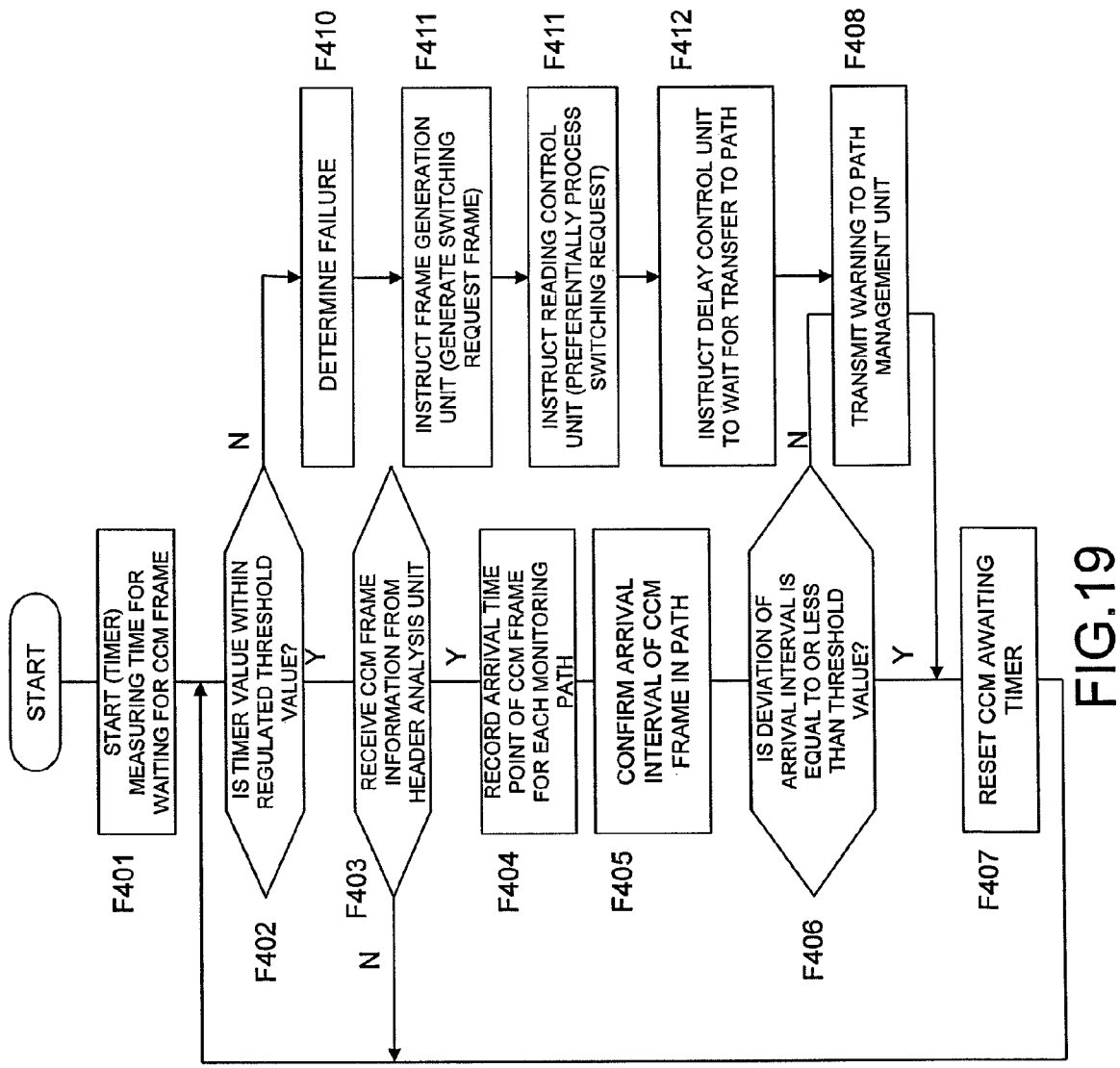
FIG. 19 is a flowchart regarding an information process of the path monitoring frame (CCM frame) in a failure monitoring unit 1400 of the AE 112.

FIG. 19 is a flowchart illustrating process procedures of the path monitoring frame (CCM frame) in the failure monitoring unit 1400 of the AE 112.

After forming of the redundant system paths (the active system path 921 and the standby system path 922) connecting the AE 112 to the BHE 171 and the BHE 172 is completed, communication starts between the equipments (enters an operation state). Along with the operation start, the CCM frame 10000 starts to be transmitted to the paths 921 and 922 in the upward direction and the downward direction. Each of the AE 112 and the BHEs 171 and 172 sends a CCM, receives the CCM frame 10000 from the opposite equipment connected via the paths 921 and 922, and monitors arrival circumstances of the CCM frame, thereby determining whether or not a communication state of the path 921 or 922 is normal. In order to monitor the arrival circumstances of the CCM frame, along with the operation start, each of equipment (here, the AE 112 as an example) activates a timer which measures waiting time until the CCM frame is received (F401). The timer measures a CCM frame arrival interval and is used to determine whether or not communication is normally performed based on this information.

The failure monitoring unit 1400 confirms the timer activated in step F401 for each specific time. At this time, an elapsed time is recognized from the timer count, and it is determined whether or not the elapsed time lies within a predetermined threshold value set in advance (F402). This predetermined threshold value may be set to 3.5 times more than the CCM frame transmission interval (since the value may be different depending on a request when equipment is used, the value is only a set example), for example, as described above. If the elapsed time lies within the predetermined value, it is further checked whether or not CCM frame information is received from the header analysis unit 2260 (F403). If the CCM frame is not received, the timer count is continuously performed and arrival of the CCM frame is awaited.

If the timer count value lies within the predetermined threshold value, and the CCM frame is received, processes after step F404 start. Based on the frame header information received from the header analysis unit 2260, an arrival time of the CCM frame which has arrived is recorded (F404). The arrival time can be obtained from an arrival time interval of the CCM frame and an arrival time point of the previously received CCM frame, obtained from the timer count value. An arrival time point of the latest CCM is compared with an arrival time point difference of the CCM frame received from the same path one step before, and thereby an arrival time interval is recorded (F405). In addition, the arrival time interval may also be obtained from an arrival timer count value. If the arrival time interval obtained in step F405 is deviated by a predetermined threshold value or more from a transmission and reception interval of the CCM frame in the path, set before the operation, the path management unit 1300 is notified of a warning (F408). The path management unit 1300 describes the warning in the management table 1310 and notifies the operator (or enables the operator to refer to). If the deviation of the arrival time is equal to or less than the predetermined threshold value, the CCM frame waiting timer activated in step F401 is reset, and reception of the next CCM frame is awaited (F407).

In a case where a timer value exceeds a specific time earlier than reception of the CCM frame, the failure monitoring unit 1400 recognizes that communication failures occur in the path (F410). In order to send the path switching request 20001 from the AE 112 to the BHE 172, the failure monitoring unit 1400 instructs the frame generation unit 2230 and the reading control unit 2280 or the frame generation unit 2470 and the reading control unit 2460 to generate and preferentially process the switching request frame 20001 (F411 and F412). Further, when path switching is performed (for example, when switching from the active system path 921 to the standby system path 922 is performed), since update of the transfer table 1110 due to the path switching, reflection of the updated information on the switching unit 3000, and update of the transfer table in the BHEs 171 and 172 require a specific time, the failure monitoring unit 1400 instructs the reading control unit 2280 to wait for transferring a frame to the path and notifies the delay control unit 1200 of a transfer waiting time to the path, thereby reflecting the information on the delay table 1210 (F412). The path management unit 1300 is notified of the path switching information and the transfer waiting time setting information at any time so as to be recorded in the management table 1310.

Figure 20:
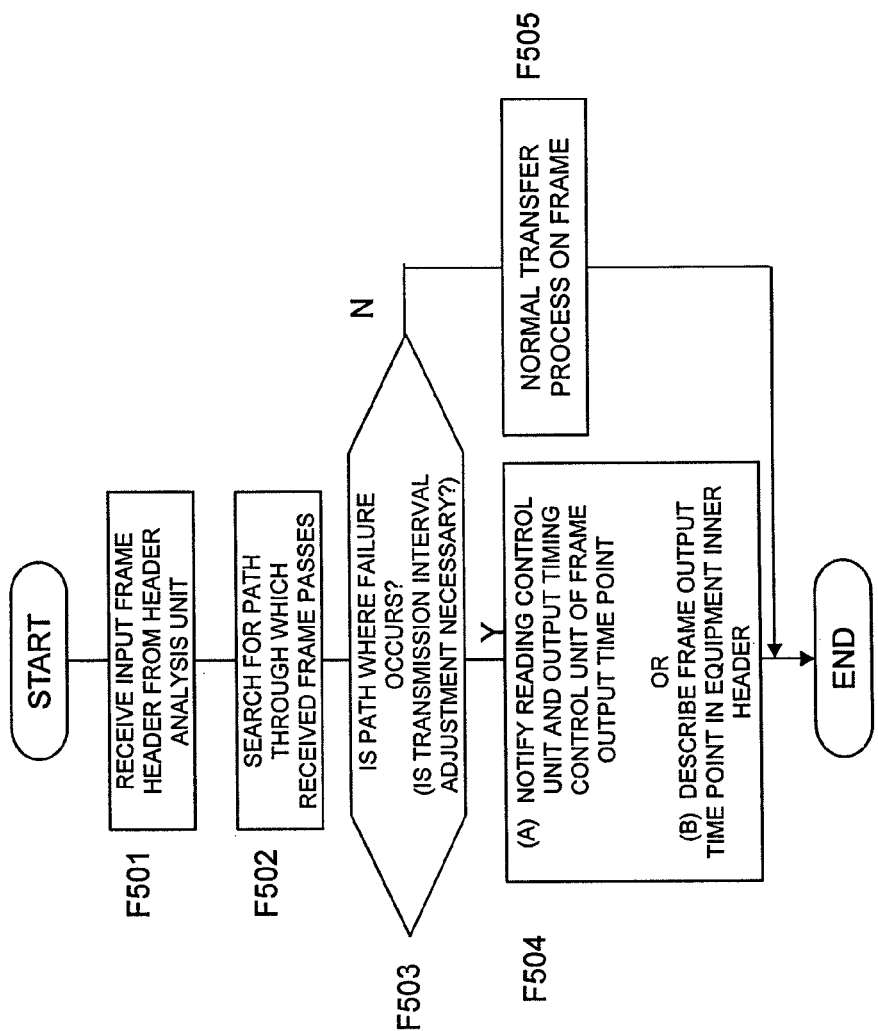
FIG. 20 is a flowchart illustrating process procedures related to transfer of a received frame in the delay control unit 1200 of the AE 112.

FIG. 20 is a flowchart illustrating process procedures related to transfer of a received frame in the delay control unit 1200 of the AE 112.

When received frame information is received from the header analysis unit 2260 (F501), a path through which the received frame passes is searched using the delay table 1210 (F502). Before step F502, an input path (a physical path ID or a logical path ID) of the frame is confirmed from the transfer table 1110, and the delay table 1210 is searched using sending destination path information (a physical path ID or a logical path ID) or a flow ID obtained from the transfer table 1110.

In a case where a sending destination of the received frame is under a switching process due to occurrence of failures or the like, and a frame directed to the path requires transfer waiting, the transfer waiting time 1211 is obtained from the delay table 1210 (F503). The reading control unit 2280 and the output timing control unit 2450 are notified of the transfer waiting time (output time point) when the frame is transferred, obtained here (F504). This method is a means for directly notifying the reception side LC and the transmission side LC from the delay control unit 1200. In addition, as a method of notifying the transmission side LC of the information, there is a method of using an equipment inner header for describing frame process information inside the equipment. In this method, a sending time point of the frame is described in a part of the equipment inner header, and the output timing control unit 2450 and the reading control unit 2460 of the transmission side LC confirm the sending time and send the frame according to the inner header. In any method, the received frame can be temporarily accumulated in the buffer and be sent at a predetermined time point. In a case where there is no designation of the transfer waiting time 1211 for a transmission destination path of the received frame, a normal transfer process is performed on the frame (F505). In this case, the delay control unit 1200 is not required to particularly instruct each functional unit of the LC 2000.

3. Backhaul Edge Equipment BHE 3-1. Configuration of BHE

Figure 21:
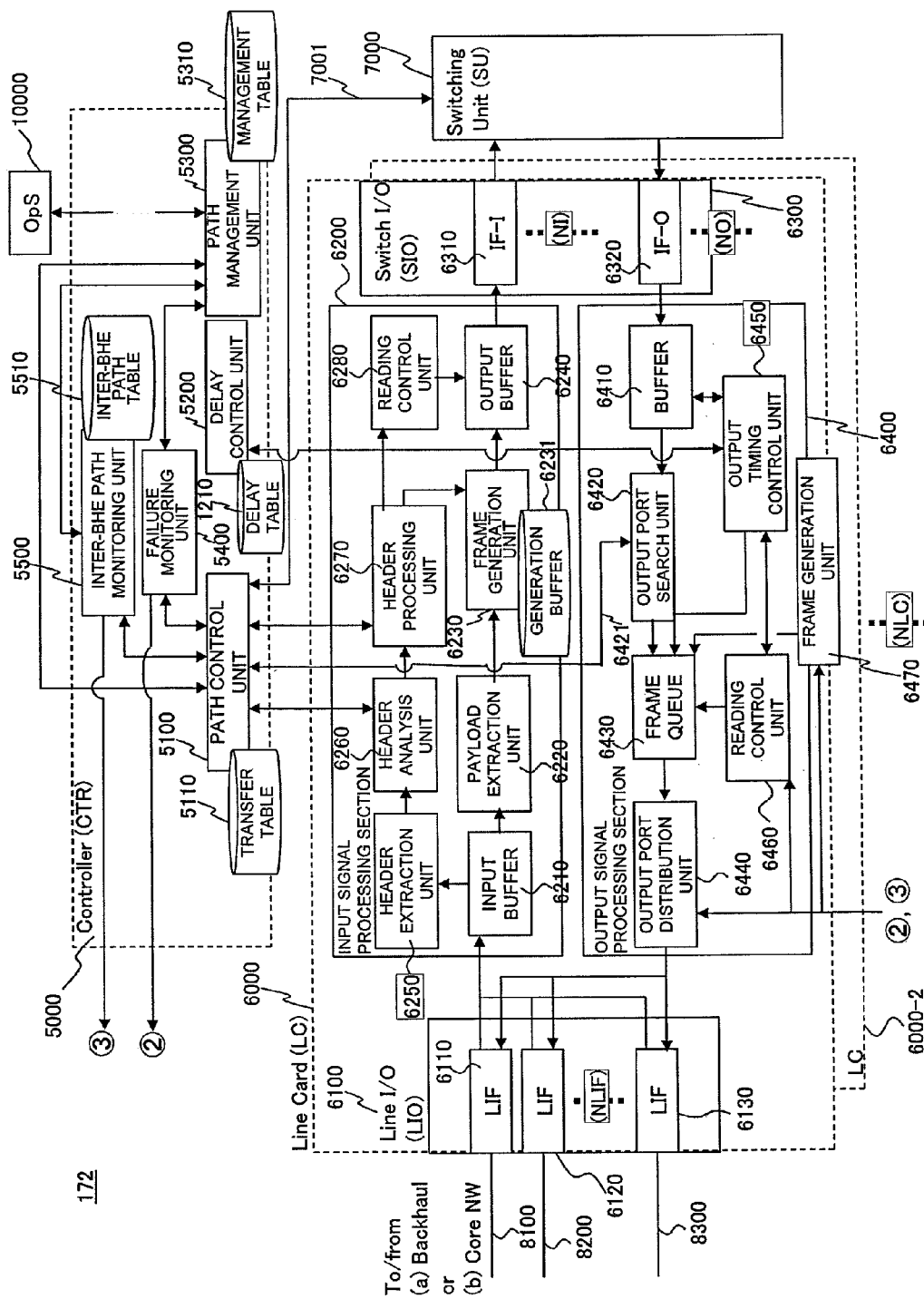
FIG. 21 is a block configuration diagram illustrating a configuration example of ISP network/core network side edge equipment BHE of the relay network 10 which accommodates access lines.

FIG. 21 is a block configuration diagram illustrating a configuration example of ISP network/core network side edge equipment BHE of the relay network 10 which accommodates access lines. Functional configurations of the BHEs 171, 172 and 181 are approximately the same as one another. Therefore, as a representative configuration example of these BHEs, this figure shows a functional block configuration diagram of the BHE 171.

The BHE 171 provides a signal relay function in the relay network 10, and further provides an interconnection function with the high rank networks (the ISP networks or the core networks) 210 and 220. The former is common to the communication function of the AE 112 shown in FIG. 10, and description thereof will be omitted in this figure. The latter has a function similar to the access line accommodation function of the AE 112. As an example of the similarity, the AE 112 and other AEs accommodate a plurality of access lines in some cases. As shown in FIG. 1, when the AE 111 accommodate the access lines 611 and 612, and receives a signal from the inside of the relay network 10 to the access line, the AE 111 determines to which access line the signal is transferred and distributes the signal. Similarly, when the BHEs 171 and 172 receive a signal from the relay network 10 to the high rank networks 210 and 220, the BHE determines to which high rank network the signal is transferred and distributes the signal.

There is a case where both the AE and the BHE simultaneously send a signal (packet) received from the relay network 10 to a plurality of lines accommodated in the AE and the BHE. For example, this case corresponds to a case where data for multiple users such as broadcast signals is transferred in the AE, and a case of performing simultaneous backup on a data center at a remote location from a company site or the like via the access line 60, the relay network 10, and the high rank networks 210/220 in the BHE.

As described above, processes in the BHE and the AE are approximately the same as each other with regard to a normal signal transfer process inside the relay network 10 and intercommunication between the relay network 10 and an external network (communication with the high rank networks 210/220 via the interconnection line 90, or communication with the user network via the access line 60), and thus detailed description related to the signal process will be omitted in this figure.

The BHE 171 includes an LC 6000, an SU 7000, and a CTR 5000 in the same manner as the AE 112 (FIG. 10). In a general configuration of the communication equipment, a plurality of LCs 6000 are accommodated, and the respective LCs 6000 are connected to one another via the SU 7000 (or connected in a connection form using direct data exchange among the LCs).

A configuration and a use method of a transfer table 5110 held by the BHEs 171 and 172 are also approximately the same as the configuration example of the transfer table 1110 of the AE 112 shown in FIG. 11. In the transfer table 5110, in the same manner as in the AE 112, transfer control information for performing transfer control inside the relay network 10 and intercommunication between the relay network 10 and the high rank networks 210 and 220 are held in a form of FIG. 11. The failure information 1116 shown in FIG. 11 is also used in the same manner for the transfer table 5110 of the BHEs 171 and 172. In other words, communication using the paths (paths connecting the BHE to the AEs 111 to 113) in the relay network 10 is monitored, and whether or not there are failures in each path is recorded.

A configuration and a use method of a delay table 5210 held by the BHEs 171 and 172 are also approximately the same as the configuration example of the delay table 1210 of the AE 112 shown in FIG. 14, and thus description thereof will be omitted in this figure. In the transfer table 5210, in the same manner as the delay table 1210 of the AE 112, transfer control information for performing transfer control inside the relay network 10 and intercommunication between the relay network 10 and the high rank networks 210 and 220 are held.

FIG. 22 is a table configuration diagram illustrating a configuration example of the inter-BHE path table 5510 in the functional block of the BHE 172 of FIG. 21. This table records therein information regarding the communication path 970 (also referred to as a standby path) between the BHEs shown in the network configuration diagrams of FIGS. 1 to 4.

The setting information of the standby path 970 includes path information for monitoring a path state (for transmitting and receiving a CCM frame) which is set in the path in advance and path information for mutual notification of path information between the BHEs. In addition, identification information for recognizing a flow ID (or a physical line ID and a logical line ID, or either one) which should be communicated using the standby path 970 is included in a case where failures occur in some scheduled (active system) communication paths inside the relay network 10.

A table configuration example of FIG. 22A is similar to those of the transfer table 1110 and the transfer table 5110 of the AE 112 and the BHE 172. In other words, logical (or physical) line interface identifiers 5511 for connection between the BHEs 171 and 172, (typically, a plurality of) logical paths (logical lines/flows) IDs 5512 accommodated by the interfaces 5511, and communication directions 5513 of the respective flows, are included.

The communication direction of the flow is different depending on (1) whether the flow is received from the BHE 171 or (2) the flow is sent to the BHE 171. In addition, the communication direction is different depending on (A) whether the flow is transferred from the outside (the access line 60 or the core network) to the relay network 10 or (B) a reverse direction thereto. Each flow can be identified as being of four types through this combination. In addition, in a case where the physical line interface is required to be correlated with the logical line interface, the correlation can be realized using the other-flag filed in the same manner as in the transfer table 1110 (FIG. 11) of the AE 112 (here, the same description as in FIG. 11 will be omitted).

This table further includes an input route ID 5514 and an output rout ID 5515. These input and output route IDs are parameters for identifying each flow in the BHE 172. A usage flag 5518 of control (C) indicates that the flow does not use a standby system path. In a case where this flag is rewritten to data (D), this indicates that a flow identified using a combination of the parameters 5511 to 5515 of the entry performs communication using the standby path 970 due to communication abnormality or the like of a scheduled (active system) path inside the relay network 10. One of features of the present invention and the present embodiment is to use the standby path 970 for transfer of a data signal as well as a control signal.

In this configuration example, a table configuration which makes the communication on the standby path redundant for each flow passing through the standby system path is provided. This is a means for avoiding communication failures in the standby path 970 and thus preventing deterioration in a situation. For this reason, a priority (type) 5516 for designating an active system path (Working Path; W) or a standby system path (Protection Path; P) for each flow is included. Further, among the input/output route ID settings of this figure, the parameter in the parenthesis indicates a route ID used (that is, set in the standby path 970) for connection between the BHE 172 and the BHE 171.

In the table configuration example of FIG. 22A, the following is shown in order from the top of the entry.

<1> Reception flow from the BHE 171
<2> Transmission flow to the AE 112
<3> Transmission flow to the BHE 171
<4> Reception flow from the CRE Processes regarding these flows are as follows in order.

<1> Transfer process from the BHE 172 to the CRE
<2> Transfer process from the BHE 172 to the AE 112
<3> Transfer process of a signal which is received from the AE 112 by the BHE 172
<4> Transfer process of a signal which is received from the CRE by the BHE 172

FIG. 22(B) shows a classified table which collects a communication direction and transmission source/transfer destination of the frame for performing the above-described transfer process. The "flow" described in FIG. 22(A) indicates a flow which is accommodated in the standby path 970 in an emergency. This "flow" corresponds to a flow of which use is necessary (Yes; Y) in determination 5110*d* regarding whether or not the standby path is used in the table of FIG. 22(B). In other words, the entries 5110-5 and 5110-6 which do not use the standby path 970 are not required to be described in the inter-BHE path table 5110. In order to show a process relationship between the entry of FIG. 22(A) and the entry of FIG. 22(B), mutual correspondence is shown using the numbers <1> to <4> in the figures. The entries indicated by the same number have the same signal path inside the relay network 10. The table configuration example of FIG. 22(B) is not required to be used to monitor or switch a communication path. The table configuration example is information which is referred to when forming the inter-BHE path table 5510 (FIG. 22 (A)) or referred to when the operator performs path management.

FIG. 23 shows a configuration example (A) of the management table 1310 held by the path management unit 5300 in the controller CTR 5000 of the BHE 172 (FIG. 20). This table is a database which collects path information set in the BHE 172, and a table configuration method of this table is approximately the same as in FIG. 12. This table is some of information which should be held by the path management unit 5300 in the same manner as the management table in the AE 112 of FIG. 12. Information registered in this table includes the path information for forming the inter-BHE path table 5110 shown in FIG. 21(A).

This table includes a flow ID (5311), a communication direction 5312 of the flow, an active system path 5313 and a standby system path 5314 assigned to the flow, a selected system identifier 5315 indicating a system (active/standby) which is currently used by the flow, and a line type identifier 5316 indicating a usage of the flow. The parameters other than the line type identifier 5316 are the same as in the description of FIG. 12, and description thereof will be omitted in this figure.

Either Data (D) or Control (C) is set in the line type identifier 5316 as an identifier indicating a usage of the line. "D" is set in a data communication system path inside the relay network 10, and "C" is set in the standby system path 970. In a normal operation, only the path indicated by "C" is used for communication of control information. The path in which "D" is set is used for transmission of a data signal (audio, broadcast, Internet content, or the like). A communication state is monitored using an OAM frame or the like in all the lines, and thus health checking for the lines is performed.

From this configuration example, for example, the flow (F-c) uses LSP-K and VLAN-W respectively as the input route ID (5313-1) and output route ID (5313-2) of Working Path (5313) in a case where an active system path can be used. Since the communication direction 5312 is Up, it can be seen that the flow should be transferred to the CRE 211 or 221 from the AE 112 via the BHE 172.

This configuration example shows circumstances in which the flows identified by F-a and F-b perform communication using an active system path (W) and the flow identified by F-c uses a standby system path (P). the selected system identifier 5315 is a field updated at any time along with protection switching (including path switching based on judgment of the operator) according to circumstances of the communication path or path setting changing when a service is added/changed.

In a case where the data communication path is switched from the active system to the standby system, the selected system identifier 5315 is updated. In addition thereto, the line type identifier 5316 may be rewritten. In other words, the type of a control signal path is switched from "C" to "D", and thereby it is possible to understand path use circumstances on the management table. In the latter case, if a line used for communication in the active system path is rewritten from "D" to "C", or is rewritten to another identifier indicating occurrence of failures, an operation state is more easily checked.

In a case where failures occur in the communication path inside the relay network 10 assigned to each flow, the flow is promptly transferred to the CRE 211 or 221 via the BHE 171. In this case, a communication path (standby system) after the path switching includes the standby path 970 (that is, a communication line for control information, connecting the BHE 171 to the BHE 172).

In order to perform path switching to the standby path 970, flow identifiers (input route and output route) which are required to be appended to the flow (F-c) (a header of a packet group forming the flow) are LSP-J and LSP-N described in the standby system path (5314). Here, LSP-N is a logical line ID for transferring the flow (packets) to the standby path 970.

FIG. 24 shows a configuration example (B) of the management table 5310 held by the path management unit 5300 in the controller 5000 of the BHE 172. The table configuration diagram (A) shown in FIG. 23 and the configuration example (B) of this figure may be collected and maintained in a single table, or may be maintained as divided tables and may be maintained without contradiction to each other by referring to parameters described in the mutual tables at any time, depending on a mounting condition. A specific table configuration method is the same as in the configuration example (B) of FIG. 13, and thus description thereof will be omitted in this figure. A relationship between the table (A) of FIG. 23 and this figure (B), that is, correlation of a superordinate concept such as a service identifier with a line/flow identifier in (A), and correlation with a subordinate concept (hardware concept) such as a physical line/physical interface in (B) are the same as described with reference to FIGS. 12 and 13.

Upon comparison with the table of FIG. 13, in a case of mounting this table (B) in the BHE 172, entry types registered in the table increase. In other words, a parameter for identifying the standby path 970 is added. In this configuration example, the IF type/communication direction information (5319) field corresponds thereto. The entry indicated by Protection Path (PP) indicates a communication path including the standby system path 970 between the BHEs.

In this configuration example, among the entries of the physical IF-ID (5317), the entries from PHY-1 to PHY-4 indicate path settings for data communication. These entries use a standby system communication path via the standby path 970 in a case where failures occur in the active system path (W) and protection switching occurs. For this reason, the entry in which Working (W) is described in the system type information (5398) indicates an active system path setting, and the entry in which Protection (P) is described in the same information 5398 indicates a bypass path (standby system path) via the standby path 970.

On the other hand, a signal which is sent from the BHE 171 to the BHE 172 is a control signal for sharing operator setting information regarding each of BHE, or a data signal passing through the standby path 970 due to path switching when failures occur in a data path. In order to reliably transmit and receive the control signal in the standby path 970, and in order to reliably accommodate data signal communication as a standby system path, the standby path 970 uses a redundancy means such as 1:1 or 1+1 protection switching or application of LAG, thereby increasing failure resistance. In this configuration example, PHY-5 and PHY-6 have a relationship of an active system and a standby system with each other, and, thus, even if one communication is disrupted, the other path is set to be used, thereby increasing continuity of communication.

3-2. Process of BHE

Figure 25:
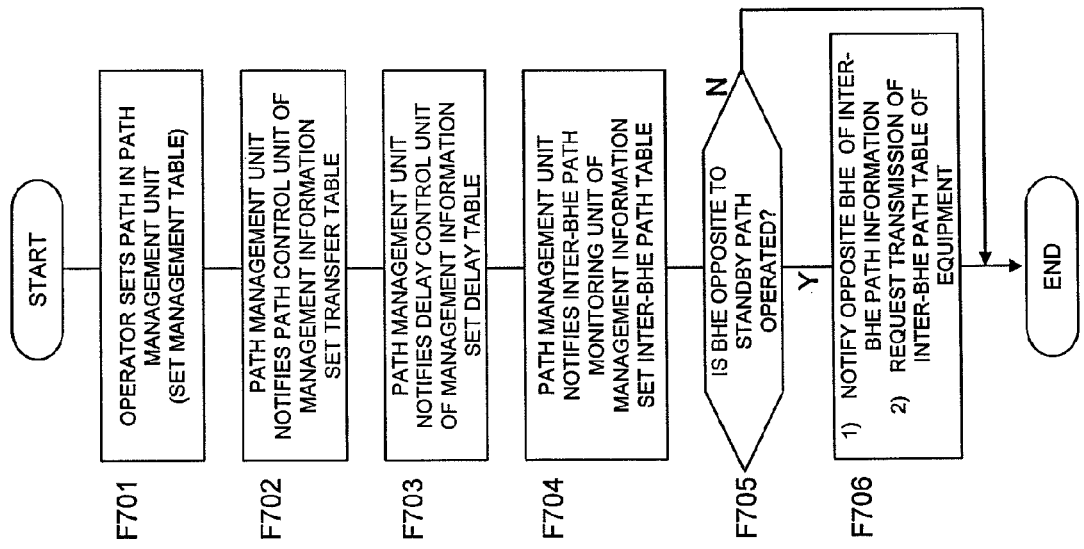
FIG. 25 is a flowchart illustrating a flow of processes related to setting path information in the BHE 172.

FIG. 25 is a flowchart illustrating a flow of processes related to setting path information in the BHE 172. The processes in this figure are approximately the same as the path information setting procedures of the AE 112 shown in FIG. 15. The operator accesses the communication equipment such as the AE 112 or the BHE 171 via the OpS (90000) and inputs communication path settings for forming a communication network therein. In the present embodiment, the path management unit 1300 manages whole path information input in the AE 112. Therefore, path setting information input from the operator and communication circumstances in each path are recorded in the database 1310 (the management table) managed by the path control unit 1300. The operator may access the path management unit 1300 in order to check communication circumstances.

The processes in steps F701 to F704 are the same as those in FIG. 15, and thus description thereof will be omitted. After path information settings in the BHE 172 or 171 are completed in step F704, it is checked whether or not communication between the BHE and the opposite BHE 171 or 172 connected via the standby path 970 is possible, that is, path information settings in the opposite BHE are completed (F705). If the communication is possible, first, the BHE 172 (or 171) notifies the opposite equipment of contents of the inter-BHE path table 5510 of the self equipment, and requests the opposite equipment (BHE) to notify of the inter-BHE path table of the equipment (F706). In the step in which the BHEs 172 and 171 share setting circumstances of the inter-BHE path table 5310 with each other, the path information setting process of the BHE 172 is completed. In addition, the inter-BHE path table from the opposite equipment is held by the inter-BHE path monitoring unit 5500 or the path management unit 5300 or both of them. In addition, a notification and a request of information are mutually performed in order to maintain consistency of this information by checking path information at any time even in a case where settings are changed by the operator even during an operation of the relay network 10 or a path switching process occurs from communication circumstances with the AEs 111 to 113. In relation to this information notification, in addition to the time when a specific event occurs, information sharing is performed periodically, after a predetermined time interval is set to the maximum value and an information sharing process is completed once, and before the predetermined maximum time has elapsed.

Figure 26:
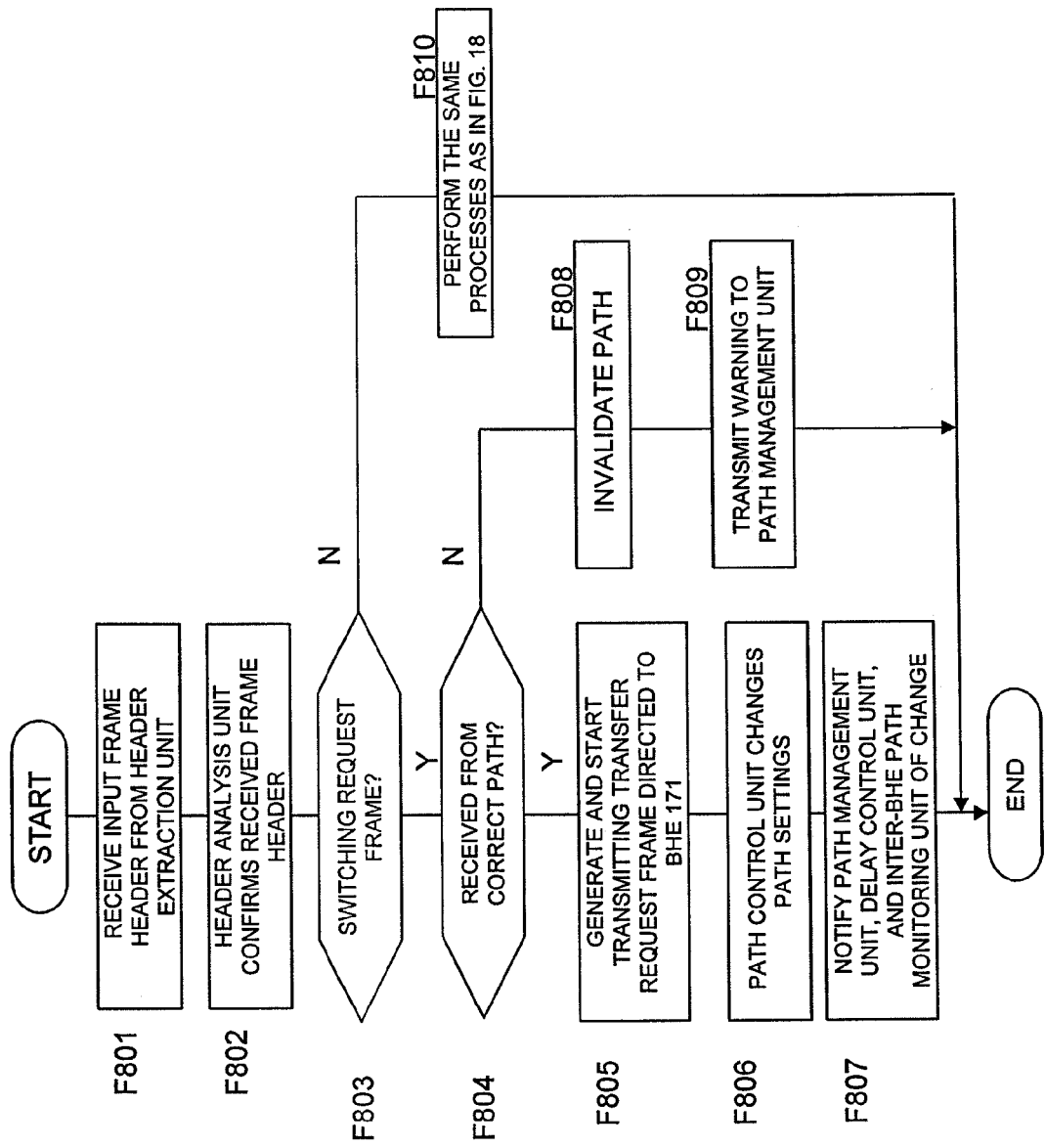
FIG. 26 is a flowchart illustrating process procedures when a path switching request 20001 is received by a header analysis unit 6260 of the BHE 172.

FIG. 26 is a flowchart illustrating process procedures when a path switching request 20001 is received by the header analysis unit 6260 of the BHE 172.

The processes in steps F801 to F804 and steps F808, F809 and F810 are approximately the same as the procedures of FIG. 16 which show a method of processing the CCM frame. Steps F801 to F804 respectively correspond to steps F201 to F204, and steps F808 to F810 respectively correspond to steps F207 to F209. Here, the figure extracts and shows processes in a case where the BHE 172 receives the path switching request frame 20001 from the AE 112.

If, in step F803, the path switching request frame 20001 is confirmed, and, in step F804, it is confirmed that the request frame is received from a correct path, the BHE 171 is requested to perform path switching so as to use a standby path, in order to secure a communication path using the standby path 970. Specifically, the AE 112 instructs the BHE 171 to change the transfer table so as to transfer a downlink signal directed to the AE 112 from the BHE 171 to the standby path 970, thereby receiving the communication signal in the downward direction. This instruction uses the transfer request frame 20002 (F805). The transfer request frame 20002 is generated by the frame generation unit 6230.

Further, in order to continuously perform uplink communication of the flow via the BHE 171, the path control unit 5100 changes the path information of the transfer table 5110 so as to transfer a signal arriving from the AE 112 to the standby path 970. In addition, the transfer table 5110 is rewritten such that a downlink signal directed to the AE 112 which is received via the BHE 171 is identified, and is transferred to the AE 112 using the path 922 (F806). Finally, the path control unit 5100 notifies the path management unit 5300, the delay control unit 5200, and the inter-BHE path monitoring unit 5500 of the updated contents of the transfer table 5110 (F807). The functional blocks which have been notified respectively perform reflection on the management table 5310, update of the delay monitoring path setting in the delay table 5210, and update of the use circumstances of the standby path 970 in the BHE path table 5510 (addition of a flow entry to the inter-BHE path table for accommodating a new flow).

Figure 27:
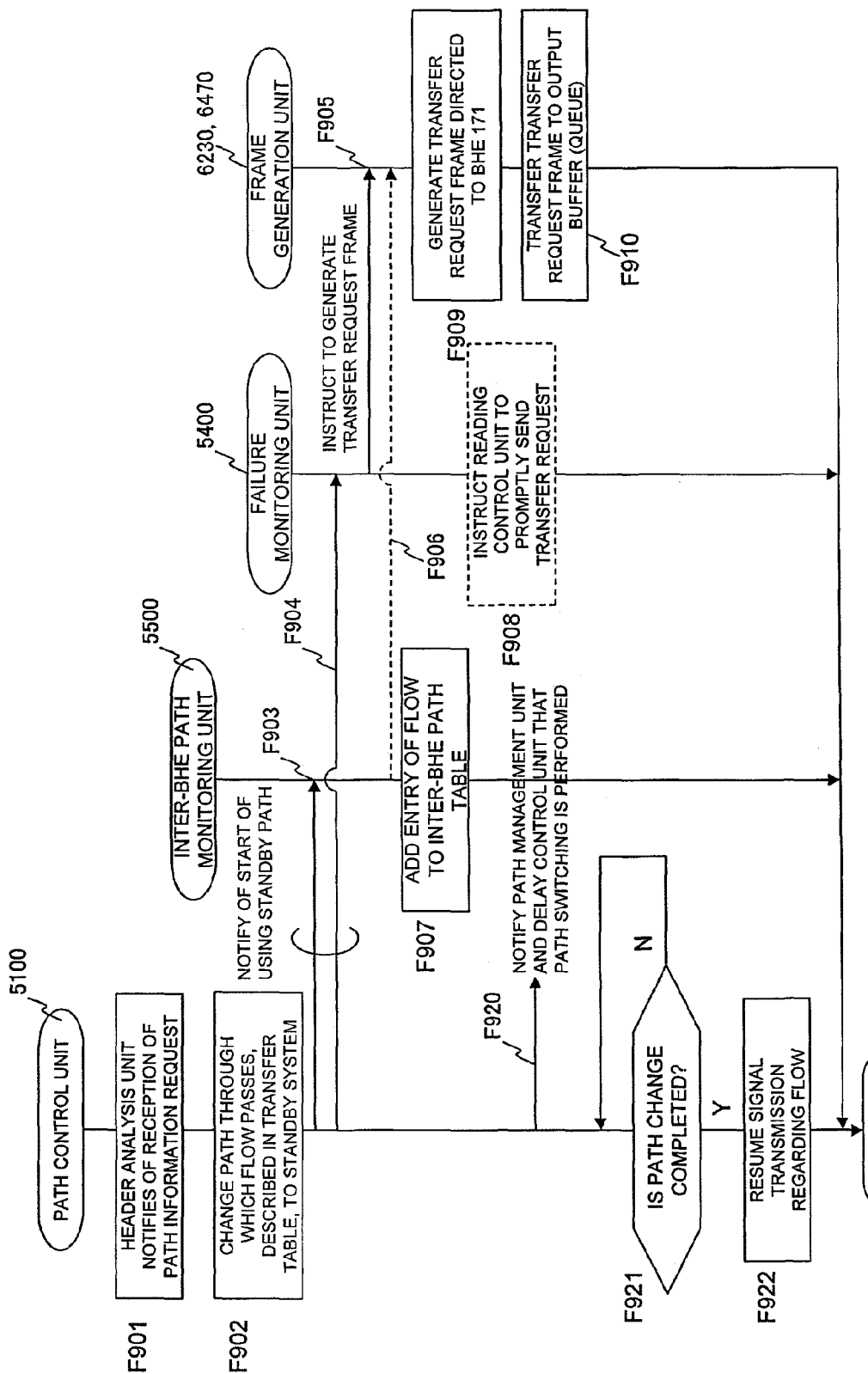
FIG. 27 is a flowchart illustrating procedures of the path switching process when a path switching request frame is received by the CTR 5000 of the BHE 172.

FIG. 27 is a flowchart illustrating procedures of the path switching process when a path switching request frame is received by the CTR 5000 of the BHE 172. This figure shows respective processes by the path control unit 5100, the inter-BHE path monitoring unit 5500, the failure monitoring unit 5400, and the frame generation unit (either 6230 or 6470; although description is made assuming the latter in this figure, realization is possible even using either functional block).

The path control unit 5100 is notified by the header analysis unit 6260 so as to recognize that the path switching request frame 20001 arrives (F901). Since standby system path information is set in the transfer table 5110 of the path control unit 5100 in advance, a failure flag is promptly set in the transfer table 5110 (a flag of the active system path is set to "1", or an invalid flag of the entry is set in the other-information filed) so as to make the entry of the standby system path valid. Through the above-described processes, path switching is performed for the flow (F902). In addition, a path called the standby system path here indicates the standby path 970 between the BHEs. If the path switching is completed, the path control unit 5300 notifies the inter-BHE path monitoring unit 5500 and the failure monitoring unit 5400 of the use start of the standby path 970 by using control signals F903 and F904, respectively. When the inter-BHE path monitoring unit 5500 is notified, the inter-BHE path monitoring unit adds an entry of the flow which is a switching target (a transfer target to the BHE 171) to the inter-BHE path table 5510 (F907). The failure monitoring unit 5400 instructs the frame generation unit 6470 to generate the transfer request frame 20002 directed to the BHE 171 in response to the notification. Further, the reading control unit 6280 (or 6460) is instructed to promptly read the transfer request frame (F908). In addition, in a case where the prompt reading instruction of the transfer request frame is sent to the reading control unit using inner header information, the process in step F908 is regarded as being included in a process (F909) of the frame generation unit 6470. Further, the notification F905 sent from the failure monitoring unit 5200 to the frame generation unit 6470 may be performed from the inter-BHE path monitoring unit 5500 to the frame generation unit 6470 (F906). When an instruction for generation of the transfer request frame is received from the delay monitoring unit 5200 or the inter-BHE path monitoring unit 5500, the frame generation unit 6470 forms a control frame 20002 directed to the BHE 171 (F909) in response thereto. The transfer request frame 20002 formed here is promptly transferred to the frame queue 6430, and is delivered via any one of the LIFs 6110 to 6130 (F910).

The path control unit 5100 notifies the path management unit 5300 and the delay control unit 5200 of the path change to the standby path 970 (F920). This notification F920 is necessary for the delay control unit 5200 to be informed of the path setting circumstances in order to set signal transmission and reception between the AE 112 and the BHE 171 as a new monitoring target, and for the delay control unit 5200 to recognize the communication path 922 with the AE 122 and the standby path 9709 as target paths.

In step F921, it is checked whether or not setting of a standby system communication path passing through the BHE 172 is completed. As a checking method at this time, as shown in FIGS. 7 and 8, there are a method of waiting for a specific time after the BHE 171 is notified of the transfer request and a method of checking whether or not a notification (ACK) of a process completion is received from the BHE 171. Although depending on a mounting design of communication equipment and a communication network, either method may be used to implement the present invention and the present embodiment. When the setting of the standby system communication path (update of the settings of various tables for interconnection between the path 922 and the standby path 970) is completed, communication between the AE 112 and the BHE 171 is resumed using the paths (F922).

4. Frame Configuration

Figure 28:
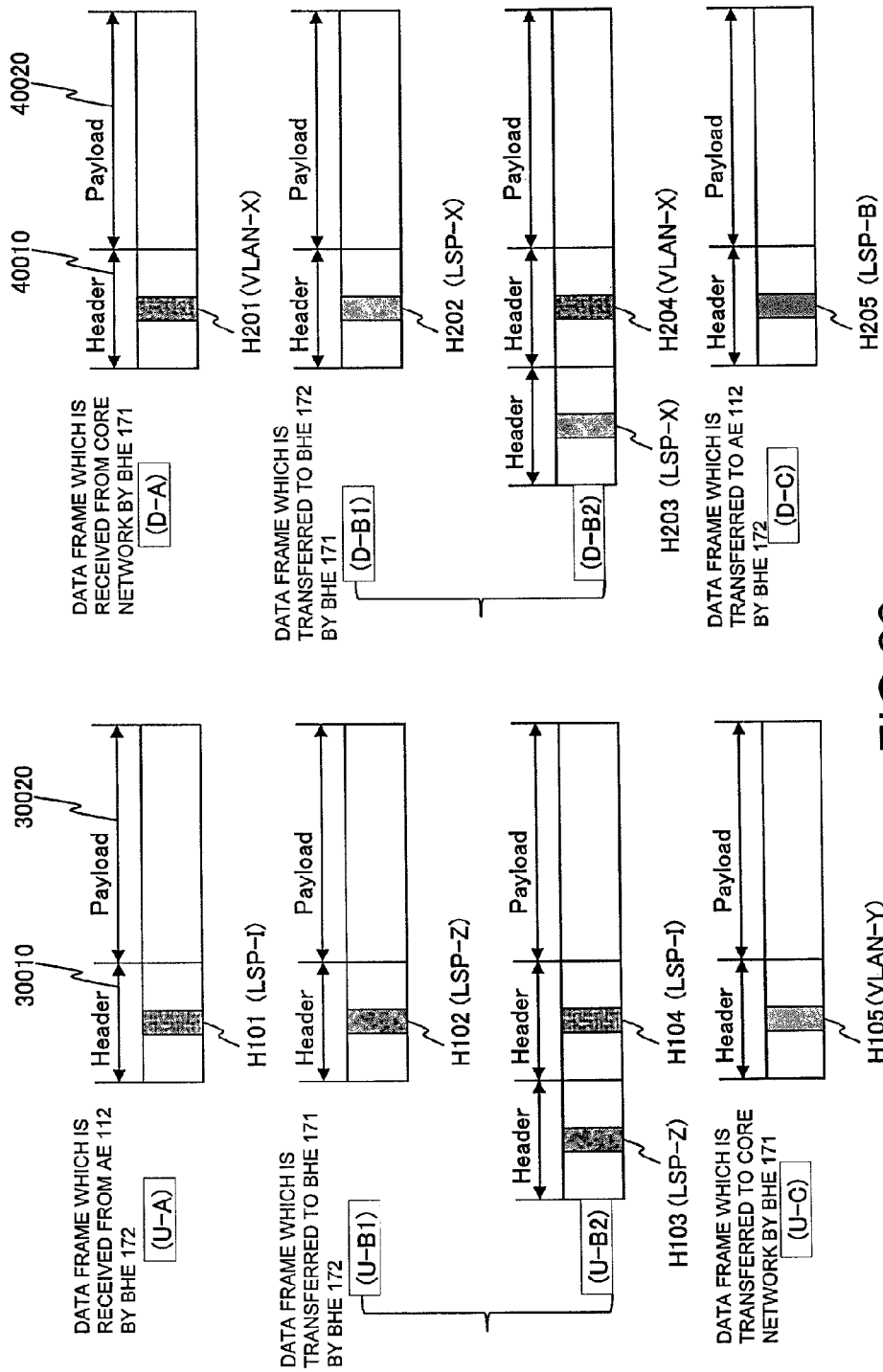
FIG. 28 is a signal configuration diagram illustrating a configuration example of the frame used for communication between the BHE 172 and the BHE 171 when using a standby path 970.

FIG. 28 is a signal configuration diagram illustrating a configuration example of the frame used for communication between the BHE 172 and the BHE 171 when using the standby path 970. There are two methods as methods of performing communication between the BHEs using the standby path 970. One method is to set an individual flow identifier (as described above, a VLAN tag or an MPLS label may be used as the identifier) for each flow in the standby path 970 and to convert the identifier when the BHE 172 relays communication between the BHE 171 and the AE 112 (that is, a method of performing an interconnection process), and the other method is to set a common identifier for a plurality of flows in the standby path 970 and to encapsulate a received frame with a header including the common identifier.

The figure U-A shows a configuration of a frame which is received from the AE 112 by the BHE 172 when an uplink signal is relayed. A frame header 30010 includes an identifier field H101, and the identifier inserts an identifier (for example, LSP-I in FIG. 22 or FIG. 23) for communication in the standby system path 922 in the AE 112. According to the first relay method, the BHE 172 changes LSP-I into a header H102 (LSP-Z) for transfer to the standby path 970 when the frame is transferred, and transfers the frame to the BHE 171. When the frame including the identifier H102 (LSP-I) is received, the BHE 171 converts the identifier H102 into an identifier H105 (VLAN-Y) which should be inserted when communication from the AE 112 is transferred in a normal operation, and sends the frame to the core network. In the series of processes, the BHE 172 refers to the transfer table 5110 and the inter-BHE path table 5510 (FIG. 22), determines whether or not a frame is to be transferred to the standby path 970 from the reception interface and the received frame header information, and inserts an appropriate frame identifier into the frame which is transferred. On the other hand, the BHE 171 grasps a correspondence relationship between the identifier H102 (LSP-I) of the frame header and a frame identifier in a normal operation path, and replaces the identifier with the identifier (VLAN-Y) set in advance in a normal operation when transferring the frame to the core network (more generally, processes of related header information as well as the identifier are performed). In the configuration of FIG. 22, the inter-BHE path table 5510 is held, and thereby it is possible to understand a header process when transfer is performed in a normal operation. The transfer table 5110 shows a correspondence relationship between identification information of a received frame and identifier information appended when a frame is sent, and the information forms an entry based on the inter-BHE path table 5510 as described above.

In the second relay method, a frame configuration shown in the figure U-B2 is used. In this case, a received frame is encapsulated in an original form and is transferred to the BHE 171 via the standby path 970. The BHE 171 can recognize that the frame passes through the standby path 970 from a reception path of the frame. Since the frame configuration is maintained and the frame is transmitted to the BHE 171, the frame identifier H104 for a standby system path appended by the AE 112 can be referred to. Thereby, it is possible to perform a frame process in a general linear redundant system between the AE 112 and the BHE 171 regardless of the presence of the BHE 172 which works as relay equipment. A process required by the BHE 171 is only a process selection function for treating a frame from which a primary header is deleted as a normally received frame in relation to a signal from the standby path, in addition to communication (header information) settings in an active system path with the AE 112 and communication settings in a standby system path.

This is also substantially the same for a downlink signal. Frame configurations D-B1 and D-B2 respectively show frame configuration examples corresponding to the first relay method and the second relay method. In the first method, a process when a frame is transferred from the BHE 172 to the AE 112 is the same as in the uplink signal, and an identifier H205 directed to the AE 112 corresponding to the identifier H202 is inserted into the frame which is transferred. In the second method, the frame identifier H201 does not vary when the frame is received from the core network before and after the frame passes through the standby path 970. Therefore, the BHE 172 is required to insert an identifier used in a linear redundant system in which the BHE 171 and the AE 112 form both ends. The identifier information can be realized by mutual notifications of path information between the BHEs 172 and 171. As a result, if the table shown in FIG. 21 can be built, the first and second methods can be applied.

Figure 29:
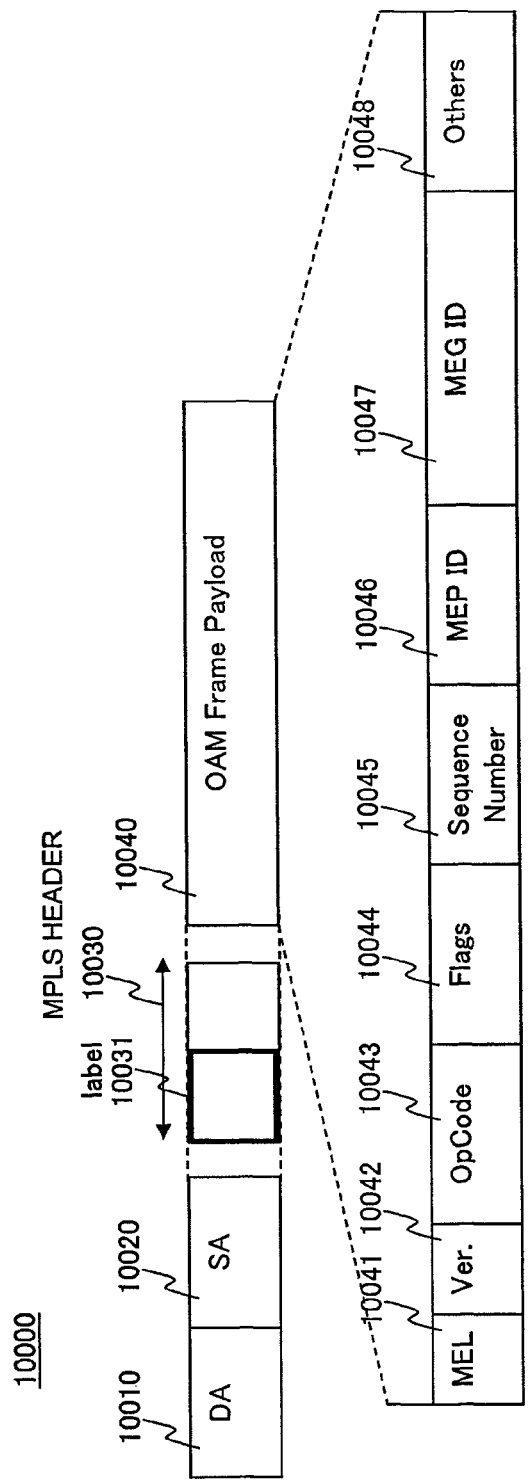
FIG. 29 is a signal configuration diagram illustrating a configuration example of the CCM frame.

FIG. 29 is a signal configuration diagram illustrating a configuration example of the CCM frame. Path monitoring using the frame starts along with operation start of an individual path or flow.

A frame configuration in this figure includes a destination address (DA) 10010, a transmission source address (SA) 10020, an MPLS header 10030 as L2 information, and a payload 10040. Equipment which receives this frame can determine a frame type, for example, by referring to a predetermined label value 10031 indicating an OAM frame.

Information of which a notification is to be sent using the CCM frame is stored in the payload 10040 part. Specific information examples include an MEG level (identification information indicating a logical connection relationship set in a monitoring target path, called a Maintenance Entity Group Level) 10041, OAM version information 10042, a code number OpCode (10033) indicating the CCM frame, Flags (10034) indicating a transmission cycle of the CCM frame and other additional function information, a sequence number field 10045, an MEP ID (10046) indicating equipment ID which sends the CCM frame, logical identification information MEG ID (10047) of a monitoring target path, and a field 10048 for other control informations. Details of the defined fields of the CCM frame are described in the ITU-T or IEEE standard regulations, and thus description thereof will be omitted here.

Figure 30:
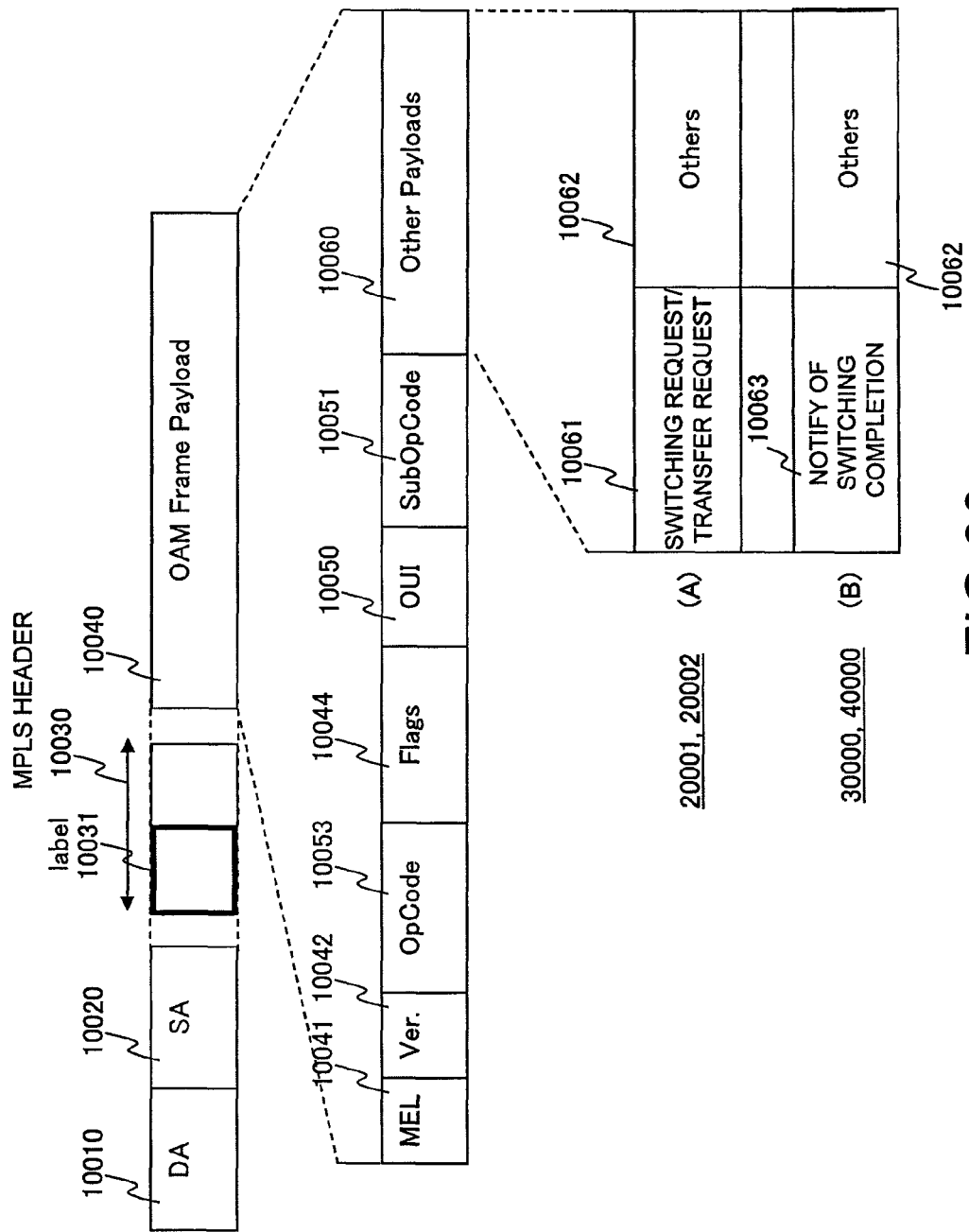
FIG. 30 is a signal configuration diagram illustrating a configuration example of the switching request frame 20001, transfer request frame 20002, and process completion notification (ACK) frames 30000 and 40000.

FIG. 30 is a signal configuration diagram illustrating a configuration example of the switching request frame 20001, transfer request frame 20002, and process completion notification (ACK) frames 30000 and 40000.

The figure (A) shows a configuration example of the switching request frame 20001 which is transmitted from the AE 112 to the BHE 172 and the transfer request frame 20002 which is transmitted from the BHE 172 to the BHE 171. This configuration example is based on a Vendor Specific Message (VSM) frame format defined in ITU-T Y.1731.

L2 information (10010, 10020, and 10030) of the frame configuration of this figure is the same as in FIG. 29, and thus description thereof will be omitted. In addition, in relation to MEL (10041) which is basic payload information of the OAM frame, OAM version information 10042, and a code number OpCode (10053) indicating a VSM frame, a meaning indicated by each field is the same as in the frame configuration example of FIG. 28. Further, Operatally Unique Parameters (OUI) 10050 and SubOpCode (10051) are described in G.8031, and thus description thereof will be omitted here.

In the present embodiment, information of which a notification is to be sent from the AE 112 to the BHE 172 and from the BHE 172 to the BHE 171 is stored in the payload 10040 part. Specifically, a part of the control information field 10060 is used. This includes an instruction content regulation field 10061 for requesting a switching process and a transfer process, and a reserve field 10062 for inserting other flags or the like. In addition, the reserve field 10062 is an option.

The figure (B) shows a configuration example of the ACK frame which is transmitted from the BHE 171 to the BHE 171. An ACK frame which is transmitted from the BHE 172 to the AE 112 also has the same configuration. The switching completion notification (ACK) message 30000 (or 40000) includes a switching completion notification field (10063) to which the instruction content regulation field 10061 used in the figure (A) is rewritten.

In the above-described embodiment, the path switching method using detection of communication failures by the AE 112 as a trigger has been described. Hereinafter, a description will be made of a path switch method when the BHE 171 or the BHE 172 detects path failures.

B. Second Embodiment

Figure 31:
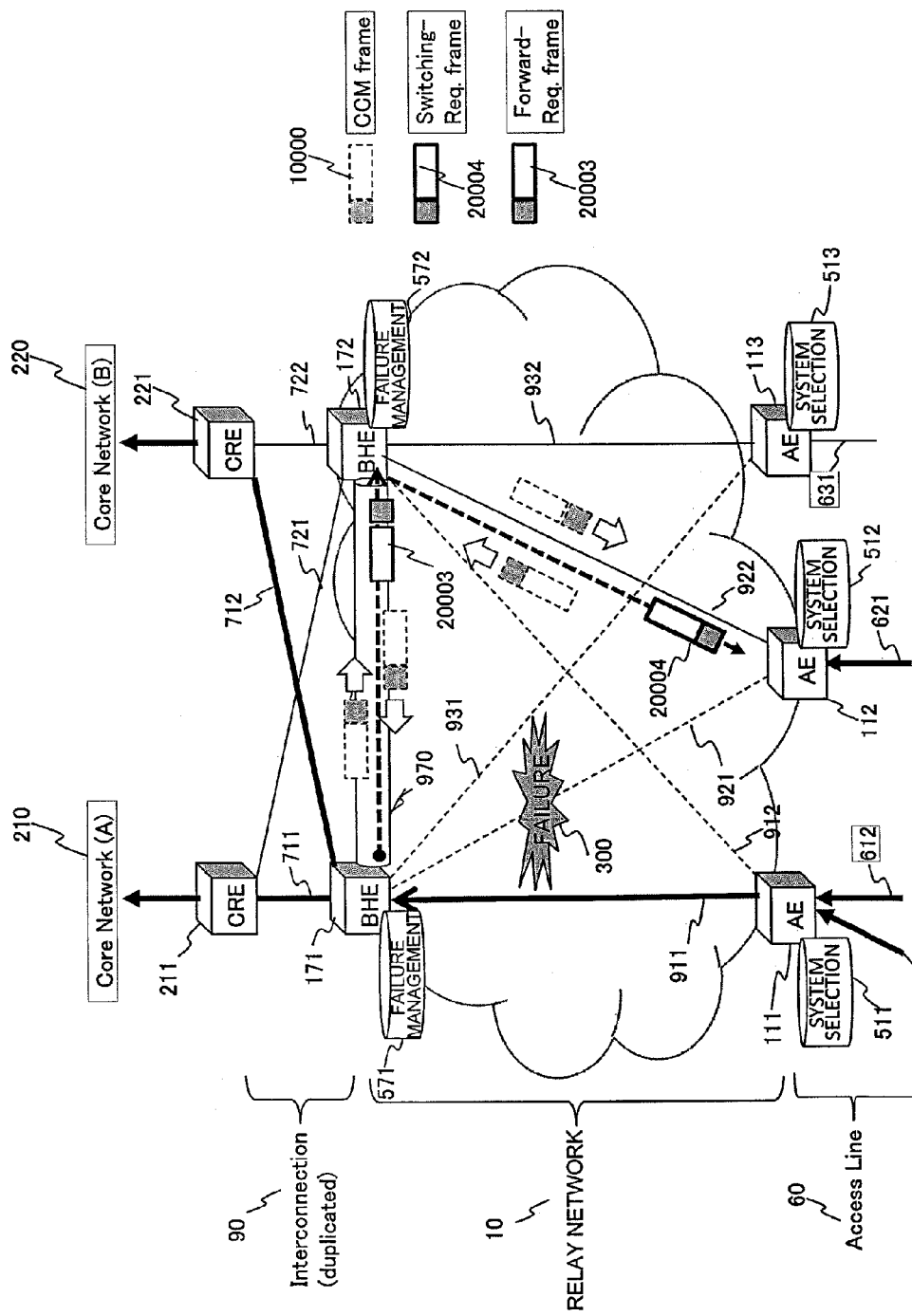
FIG. 31 is a network configuration diagram illustrating a path switching method in a case where failures in uplink communication are recognized from arrival circumstances of a CCM signal when the BHE 171 monitors a CCM frame from the AE 112.

FIG. 31 is a network configuration diagram illustrating a path switching method in a case where failures in uplink communication are recognized from arrival circumstances of a CCM signal when the BHE 171 monitors the CCM frame from the AE 112. When failures are detected, the BHE 171 first transmits a transfer request frame 20003 for requesting relay (relay of the signal in the BHE 172) of an uplink signal which is directed to the BHE 171 from the AE 112, to the BHE 172. The BHE 172 which has received the transfer request frame 20003 updates the transfer table 5110, the inter-BHE path table 5510, the delay table 5210, and the management table 5310 therein, and sends a switching request frame 20004 for switching an uplink signal sending path from the active system path 921 to the standby system path 922, to the AE 112.

Frame configuration examples of the transfer request frame 20003 and the switching request frame 20004 are the same as the signal configuration shown in FIGS. 30(B) and 30(A) respectively. Only the frame type identifier 10061 or 10063 of the payload 10060 may be changed. In addition, other-information field 10062 includes an identifier of a path which is set as a switching/transfer target by the frame, and an identifier of a path after being switched, and thereby the BHE 172 or the AE 112 which receives the signal can clearly recognize changed contents.

Figure 32:
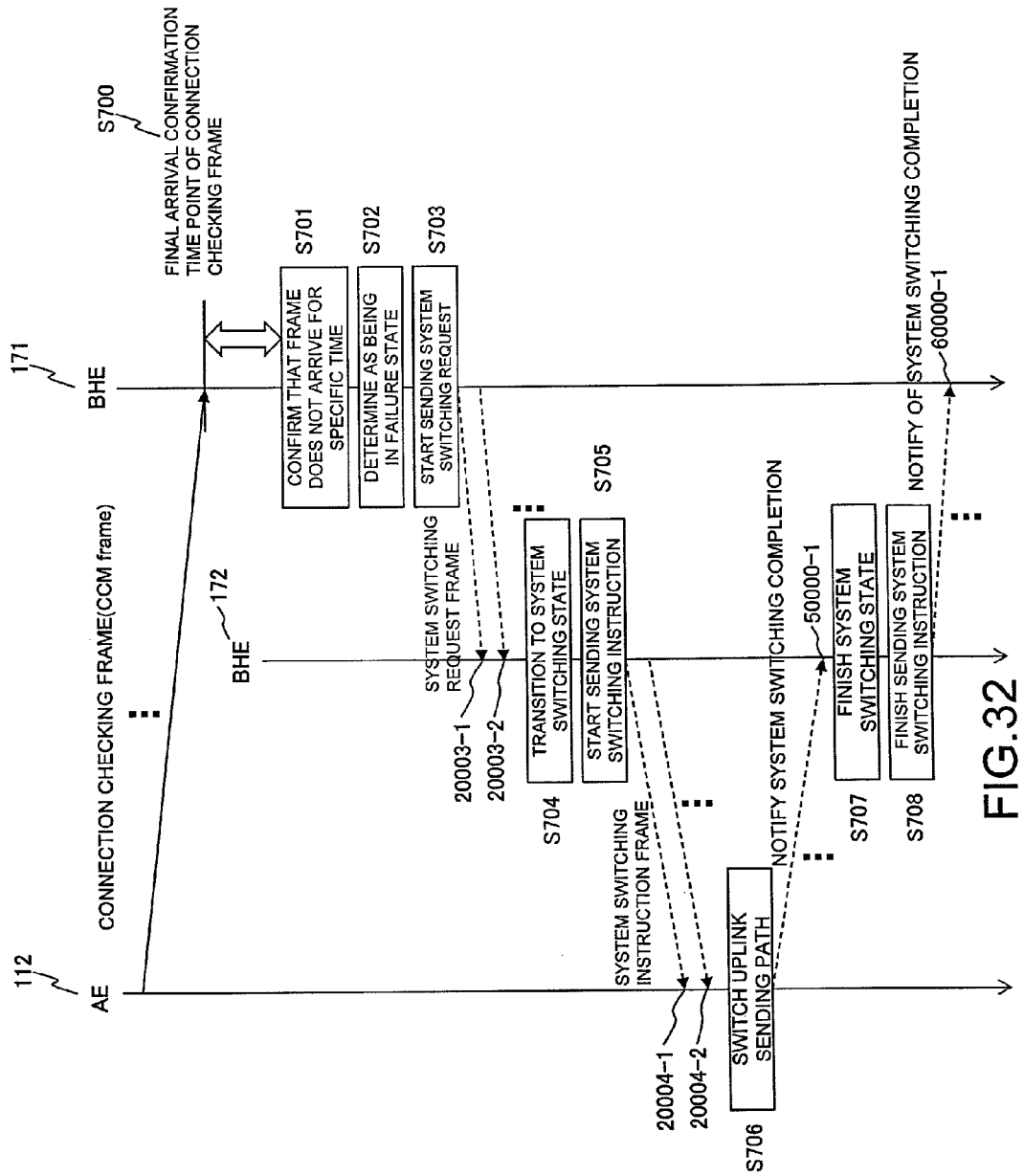
FIG. 32 is a sequence diagram illustrating a flow of a path switching process in a second embodiment.

FIG. 32 is a sequence diagram illustrating a flow of a path switching process in the second embodiment. This figure shows an example of using an ACK signal in order to confirm notification completion of the control signal and path switching/transfer process completion in the opposite equipment BHE 172 or the AE 112, in transmission of the transfer request frame 20003 from the BHE 171 to the BHE 172 and transmission of the switching request frame from the BHE 172 to the BHE 171. As another method, a path switching means which uses a timer is possible as shown in FIGS. 5 to 9. In any means, transmission and reception of a control signal between equipments or a signal processing method inside equipment is approximately the same as the sequence shown in FIGS. 5 to 9, thus process procedures will be described by exemplifying a case using an ACK frame in the second embodiment, and an example employing a time will be omitted.

In order to monitor communication circumstances from the AE 112 to the BHE 171, the AE 112 periodically sends a CCM frame to the communication path 921. An arrival time point and an arrival time interval of the CCM frame are confirmed and are recorded. In this figure, a state is shown in which the CCM frame arrives last at a time point S700 and the BHE 171 fails to observe the arrival of a series of CCM frames.

In a case where the BHE 171 cannot confirm reception of a subsequent CCM frame within a specific time set in advance (S701), it is determined that failures occur in the path (S702). Then, in the BHE 171, the failure monitoring unit 5400 instructs the frame generation unit 6230 or 6470 to generate a transfer request frame, and notifies the reading control unit 6280 or 6460 of an instruction for sending of the transfer request frame so as to start sending the transfer request frame 20003-1 and transfer request frame 20003-2.

When the transfer request frame 20003 is received, the BHE 172 transitions to a path switching state (that is, starts a path switching process) (S704). Here, the BHE 172 changes the transfer table 5110, the management table 5310, the inter-BHE path table 5510, and the delay table 5210 regarding a path or a flow of which a notification is sent from the BHE 171. A configuration method and an update method of each database are the same as the methods described in the first embodiment, and thus description thereof will be omitted. When the process in the BHE 172 is completed, the path switching request frames 20004-1 and 20004-2 are sent to the AE 112. The AE 112 which has received the instruction changes an uplink signal sending path from the active system path 921 to the standby system path 922. When update of the transfer table 1110, the management table 1310, and the delay table 1210 of the AE 112 is completed in relation to this change, the AE 112 sends change completion notification frames (ACK frames) 50000 (50000-1, 50000-2, . . . ) to the BHE 172. The BHE 172 which has received the ACK frame 50000 confirms completion of settings therein, and sends switching completion notifications (ACK frames) 60000 (60000-1, 60000-2, for informing of setting completion of a communication path using the standby system path 922 and the standby path 970, to the BHE 171. The BHE 171 resumes communication with the AE 112 when the ACK frame 60000 is received. Data communication from the AE 112 to the BHE 172 and from the BHE 172 to the BHE 171 may be resumed after the AE 112 and the BHE 172 start sending an ACK signal. When the data communication is resumed, the CCM frame may be transmitted from the AE 112 to the BHE 171 via the BHE 172, and thereby a communication path state may be checked. At this time, for example, if the AE 112 can normally receive the CCM frame from a reverse communication path which is directed to the AE 112 from the BHE 171, it can be determined that a state in which data communication can be resumed happens.

C. Third Embodiment

FIG. 32 is a network configuration diagram illustrating a state in which three or more relay network edge equipment BHEs on the core networks 210 and 220 side are connected to a single access side edge equipment AE in the relay network 10 of FIG. 1. Hereinafter, a description will be made of another path switching method in the relay network 10.

In the paths 911, 912, 921, 922, 923, 931, 932, and 933 formed in the relay network 10, in order to check normality of a packet communication path, the CCM frame is periodically transmitted in the same manner as in the configuration of FIG. 1. In the present embodiment, circumstances are shown in which a communication failure 300-1 occurs in the active system path 921 located at the shortest communication distance, and the first standby system 922 is used as a communication path.

In this figure, attention is paid to a signal process in a redundant system path formed by the AE 112 and the BHEs 171, 172 and 173, and this will be described as a representative example. Also here, the AE 112 will be described as a representative example; however, frame transmission and reception and the path switching method of the AE 111 and the AE 113, and the BHEs 171, 172 and 173 are the same as in FIG. 1.

A frame transfer process is performed by referring to a table held in the transfer table (FIG. 10: 1110) provided in the AE, the BHE, and relay communication equipment using the paths 921, 922 and 923. A method of forming and referring to the transfer table (FIG. 10: 1110) is approximately the same as the description of FIG. 2. Further, as described with reference to FIG. 2, for example, there is a possibility that a communication signal (including the CCM frame) from the AE 112 to the BHE 171 and a communication signal (including the CCM frame) from the BHE 171 to the AE 112 may pass through the same physical line, and there is a possibility that the signals may pass through paths (physically) different from each other and be transmitted and received in a case where a plurality of physical lines are installed. In the present embodiment, a description will be made of a method of handling (path switching) failures regarding communication from the AE 112 to the CRE 211 (the BHE 171) as a representative example.

In a case where connectivity is not confirmed in this configuration, path switching is performed between the AE 112 and the BHE 171 so as to secure continuity of communication. In the circumstances of this figure, the path failure 300-1 has already disrupted communication from the AE 111 to the BHE 171. In addition, it is considered that a second failure 300-2 occurs, and it is difficult to continuously perform communication using the standby system path 922.

The path failure 300-2 can be detected when periodical reception of a CCM frame by the BHE 172, transmitted from the AE 112 to the BHE 172, stops. The BHE 172 determines that it is difficult to continuously perform communication in the path 922 through this detection.

When the path failure 300-2 is detected, the BHE 172 requests the BHE 173 to relay communication with the BHE 171 by using a replacement system path (accurately, a part thereof) 923 which is set in advance from the BHE 171 via the BHE 173. This request uses, for example, the switching request frame 20001 (FIG. 30). When the request is received, the BHE 173 requests the AE 112 to switch a frame transfer path directed to the transmission destination BHE (here, the BHE 171). In other words, the AE 112 is requested to change signal distribution settings so as to send a frame directed to the BHE 171 sent by the AE 112 to the BHE 173 using the standby path 923.

Figure 33:
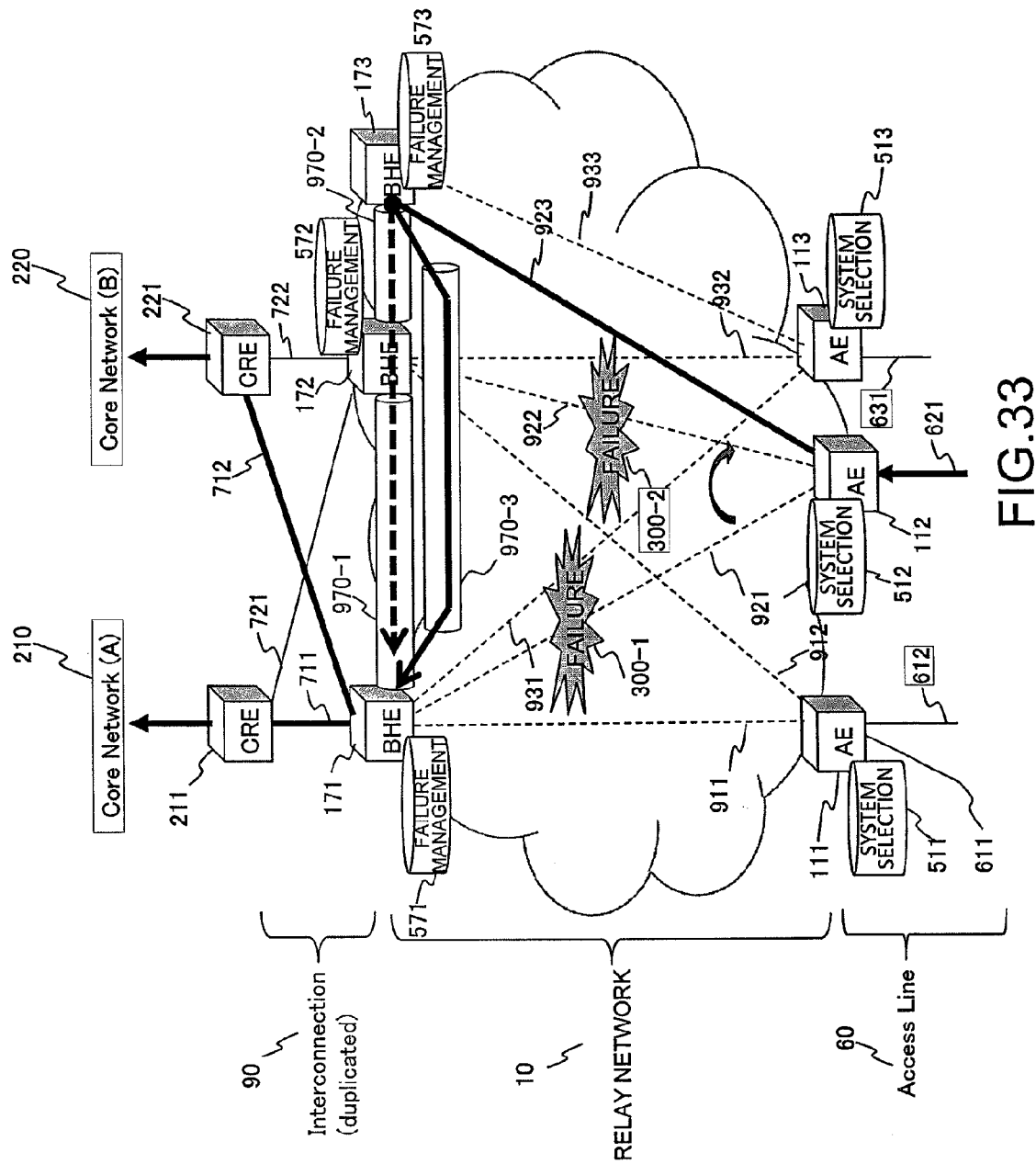
FIG. 33 is a network configuration diagram illustrating a state in which three or more relay network edge equipment BHEs on the core networks 210 and 220 side are connected to a single access side edge equipment AE in the relay network 10 of FIG. 1.

In addition, in FIG. 33, the paths 970-1 and 970-2 are communication paths (a portion thereof) used after a communication path is changed from the path 921 to the path 922 after the failure 300-1 occurs. As in the present embodiment, when the second failure 300-2 occurs, communication between the AE 112 and the BHE 171 is continuously performed using still another path 970-3. The BHEs 171, 172 and 173 are connected to each other using a topology in which a pair of BHEs can communicate with each other. As an example of the topology, there is a mesh type or a ring type connection form between the BHEs which can be used. In this figure, a mesh type connection is exemplified.

Figure 34:
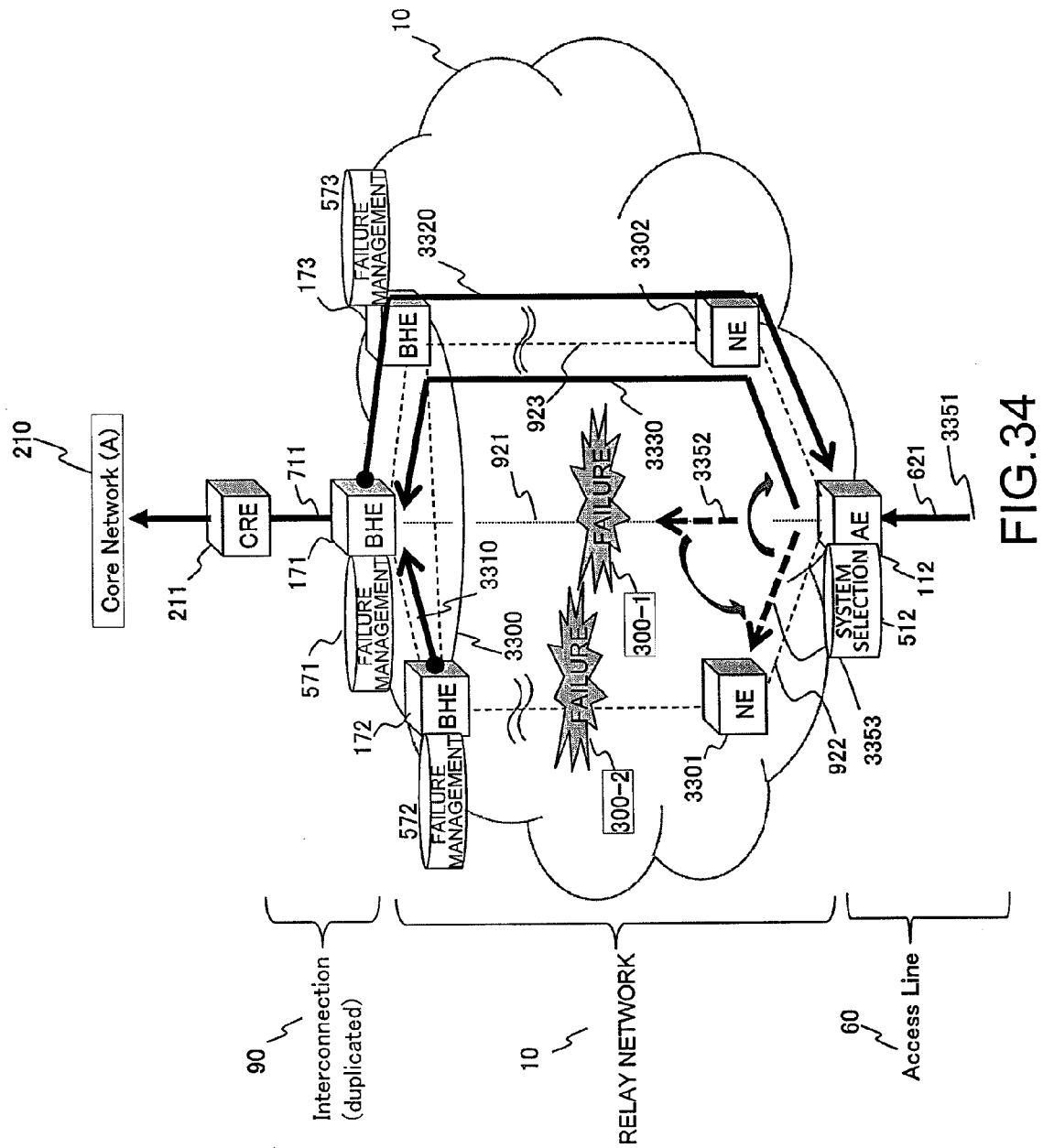
FIG. 34 is a communication path configuration diagram illustrating a standby system path configuration method in a case where connectivity is not confirmed due to a second failure 300-2 in the communication circumstances checking process described in FIG. 32.

FIG. 34 is a communication path configuration diagram illustrating a standby system path configuration method in a case where connectivity is not confirmed due to the second failure 300-2 in the communication circumstances checking process described in FIG. 33. As described in FIG. 33, this figure shows a path configuration example in a case where an abnormal state (or an abnormal operation) is detected when the CCM frame 10000 is delivered.

This figure shows a replacement system (standby system) in which a signal output from the AE 112 passes through the BHE 173 and arrives at the BHE 171 as a communication path after the path 922 is switched to the path 923.

In the same manner as the path switching methods (FIGS. 1 to 32) for the first failure, a feature different from the existing switching method (for example, ITU-T Recommendation G.8031) lies in that the BHE 173 is a relay point of a switching request signal and communication after path changing. In other words, a tree type communication network in which the BHE 173 is a top forms a sub-tree when viewed from the BHE 171. In this figure, the BHEs 171, 172 and 173 are mesh-connected to each other, and this forms a pyramidal (conical) topology in which three communication paths are connected to a flat mesh network 3300 formed by three equivalent communication equipments (BHEs) when viewed from the AE 112. A communication signal from the AE 112 to the core network 210 is input to the mesh network 3300 which corresponds to the bottom side of the pyramid and arrives at the core network 210 via the BHE 171.

A feature of an operation realized by the pyramidal connection is derived from a configuration in which (1) the BHEs 171, 172 and 173 are communication relay (collection) equipment having an equivalent function, and (2) all the AEs 111 to 113 are connected to the BHEs 171, 172 and 173 in advance via paths 921, 922 and 923 which are independent from one another. Using the feature of (1), the connection relationship among the BHEs 171, 172 and 173 is changed at random, and thereby the AE 112 can freely change a single hierarchical tree to which the equipment belongs in a certain time point. Further, the communication path between the BHEs is used for data communication as a bypass path, and thereby a form of the communication network is changed to a multi-hierarchical tree of two or more hierarchies (realized by a pyramidal structure in which two or more BHEs are connected to one another) so as to continuously perform communication even in a failure. In addition, if using the feature of (2), when a path change which depends on a communication network building plan is needed, it is possible to secure a communication path having an equivalent performance and to change easily without labors such as installation of lines or movement of equipment. Further, there is also a method in which an existing protection switching technique determines an operation system and a standby system (switched destination) in advance for each communication unit (for example, "connection" or "path") as indicated by 1+1 or 1:1 (generally, N+M type or N:M type (a method of preparing for M standby paths in order to protect N items of communication)). In this case, if each item of communication is to be more reliably protected, communication network resources which are preliminarily necessary increase to that extent. In contrast, in the present embodiment, communication is collected in the BHEs 171 and 172, the standby path 970 connecting between the BHEs is shared as a standby path, and thereby it is not necessary to secure a large number of network resources. In addition, since there is a low probability that a plurality of path failures may occur, a part of the communication path 3300 is connected to all the paths 921, 922 and 923 so as to form a communication path between the AE 112 and the BHE 171, and thereby it is possible to effectively use the resources. In the existing protection switching technique, only a single communication unit is protected for a single standby line (the number of settings), but the standby path 3300 can be assigned to all items of communication in the configuration of FIG. 34. The cost-effectiveness thereof is high. Generally, when the number of accommodated items of communication (the number of collections) is taken into consideration, the BHEs 171, 172 and 173 are higher in a process performance of the communication equipment than the AE 112. In most cases, the BHE employs a configuration of equipment itself with the higher reliability than the AE. Further, a large capacity line is easily to be used for the standby path 3300 between the BHEs, and, since traffics do not flow into the standby path 3300 in a normal operation, it is easy to cope with the emergency.

In this figure, the arrows 3310 and 3320 indicating the signal transmission path and direction, and the arrows 3352, 3353 and 3330 indicating signals from the AE 112 to the BHE 171 indicate a flow of the switching control signal described in FIG. 34 and signals from the AE 112 to the BHE 171 after the path is switched. Procedures of the path switching process will be described in detail with reference to FIG. 35.

In this way, the relay equipment monitors communication circumstances, and a location closer to a failure point detects a failure when the failure occurs, thereby shortening time until handling of the failure starts as compared with the typical protection switching. This is realized by equipment relaying communication having a function equivalent to that of equipment which is an end point of the communication. Here, the equivalent function also includes requirements in terms of network design such as a function of playing a role as edge equipment of the relay network 10 and including table information in addition to a function of processing a user (data) signal and a control signal. For this reason, there is provided a function of capable of transmitting and receiving table setting information between the BHEs, and control information is exchanged via the core network side edge mesh network 3300.

Figure 35:
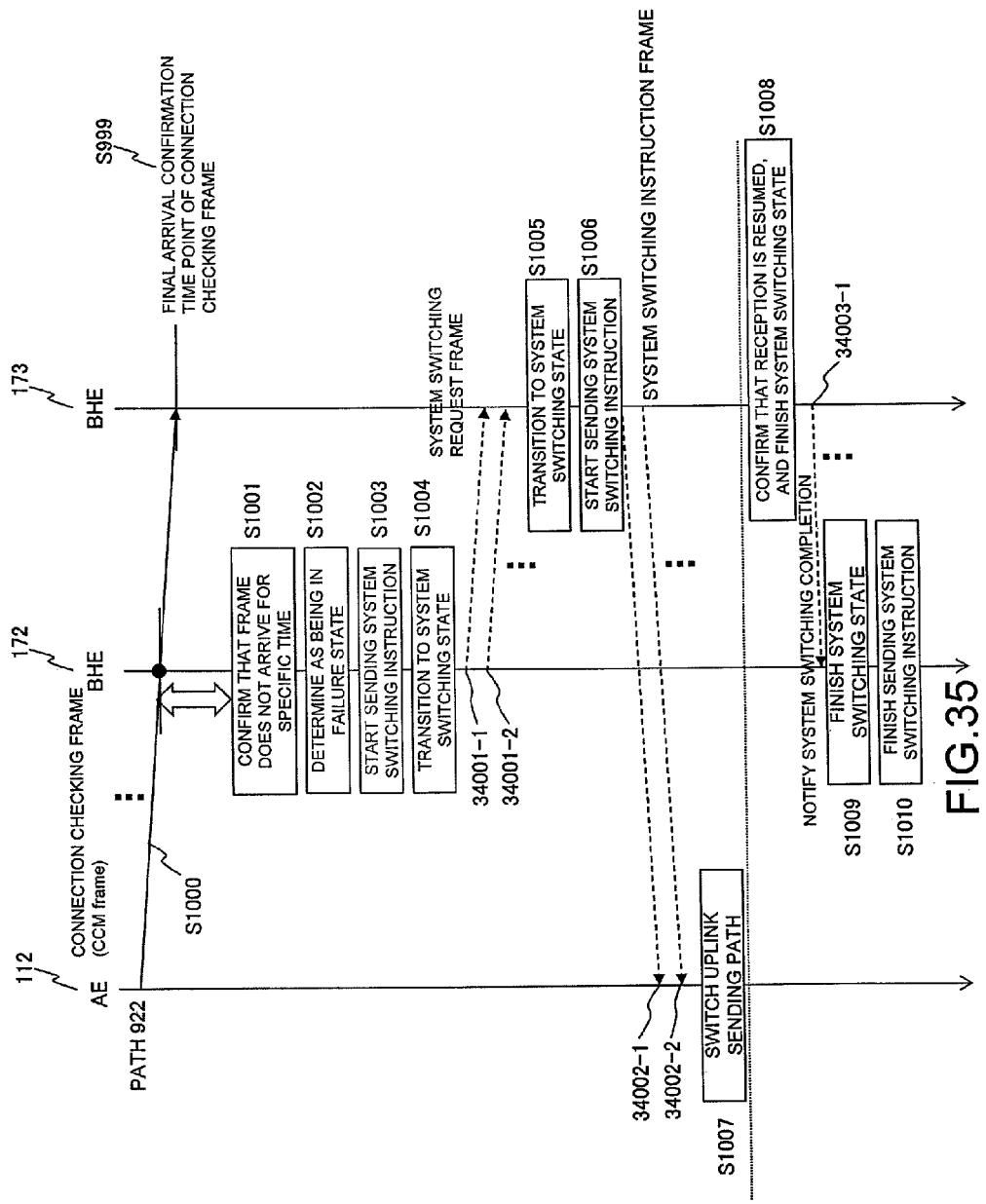
FIG. 35 is a sequence diagram illustrating a flow of a path switching process in the path configuration example of FIGS. 33 and 34.

FIG. 35 is a sequence diagram illustrating a flow of a path switching process in the path configuration example of FIGS. 33 and 34. This figure shows an example using an ACK signal in order to confirm notification completion of a control signal and path switching/transfer process completion in the opposite equipment AE 112, in transmission of a switching notification transmission request frame 3310 from the BHE 172 to the BHE 173 and transmission of a switching request frame (not shown) from the BHE 172 to the BHE 171. As another switching completion determining means, a method which uses a timer is possible as shown in FIGS. 5 to 9. In any means, transmission and reception of a control signal between equipments or a signal processing method inside equipment is approximately the same as the sequence shown in FIGS. 5 to 9, thus process procedures will be described by exemplifying a case using an ACK frame in the embodiment, and an example employing a timer will be omitted.

In order to monitor communication circumstances from the AE 112 to the BHE 171, the AE 112 periodically sends a CCM frame to the communication path 922. An arrival time point and an arrival time interval of the CCM frame are confirmed and are recoded. In this figure, a state is shown in which the CCM frame arrives last at a time point S999 and the BHE 172 fails to observe the arrival of a series of CCM frames.

In a case where the BHE 172 cannot confirm reception of a subsequent CCM frame within a specific time set in advance (S1001), it is determined that failures occur in the path (S1002). Then, in the BHE 172, the failure monitoring unit 5400 instructs the frame generation unit 6230 or 6470 to generate switching notification transmission request frame 3310, and notifies the reading control unit 6280 or 6460 of an instruction for sending of the request frame 3310 so as to start sending the switching notification transmission request frame 3310 (in this figure, 34001-1 and 34001-2) (S1003 and S1004).

When the switching notification transmission request frames 34001-1 and 34001-2 which are equal to or more than a predetermined number are received, the BHE 173 transitions to a path switching state (that is, starts a path switching process) (S1005). Here, the BHE 173 changes the transfer table 5110, the management table 5310, the inter-BHE path table 5510, and the delay table 5210 regarding a path or a flow of which a notification is sent from the BHE 172. A configuration method and an update method of each database are the same as the methods described in the first and second embodiments, and thus description thereof will be omitted. When the process in the BHE 173 is completed (S1006), the path switching request frames 34002-1 and 34002-2 are sent to the AE 112. The AE 112 which has received the instruction changes an uplink signal sending path from the active system path 922 to still another standby system path 923. When update of the transfer table 1110, the management table 1310, and the delay table 1210 of the AE 112 is completed in relation to this change, the AE 112 sends change completion notification frames (ACK frames; not shown) to the BHE 172. When the ACK frames are received, the BHE 173 regards settings therein and path switching as being completed (S1008). Successively, a switching completion notification (ACK frame; an ACK frame directed to the BHE 171 is not shown) 34003-1 is sent so as to inform the BHE 171 and the BHE 172 of setting completion of a communication path using the standby system path 923 and the standby path 970-3. When the ACK frames 34003-1 which are equal to or more than a predefined number are received, the BHE 172 determines that the switching is completed, and resumes communication with the AE 112. In addition, as another procedure, data communication from the AE 112 to the BHE 173 and from the BHE 173 to the BHE 171 may be resumed after the AE 112 and the BHE 172 start sending an ACK signal. When the data communication is resumed, the CCM frame may be transmitted from the AE 112 to the BHE 171 via the BHE 173, and thereby a communication path state may be checked.

Figure 36:
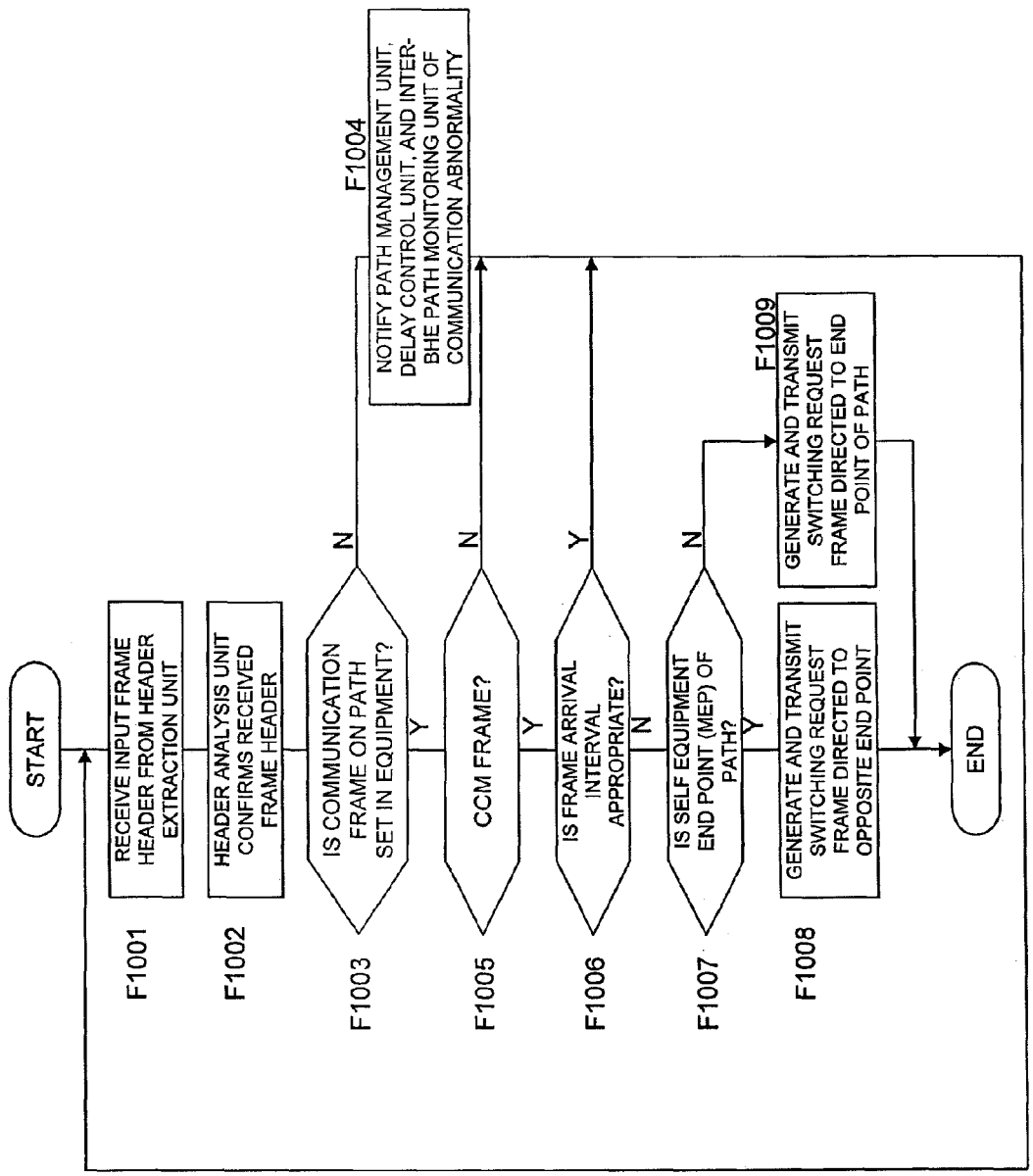
FIG. 36 is a flowchart illustrating process procedures when a data frame or a control (for example, CCM) frame is received by a header analysis unit 6260 of the BHE 172.

FIG. 36 is a flowchart illustrating process procedures when a data frame or a control (for example, CCM) frame is received by the header analysis unit 6260 of the BHE 172.

The processes in steps F1001 and F1002 are approximately the same as the procedures of FIG. 17 which show the process method of the CCM frame. In the present embodiment, the BHE 172 is operated as relay equipment of a communication path from the AE 112 to the BHE 171. Hereinafter, frame process procedures in the path control unit are extracted and are shown.

When a frame is received by the interface of the BHE 172 (F1001), the BHE extracts an identifier of a path through which the frame should pass based on header information of the frame (F1002 and F1003). In a case where the frame is a CCM frame, and the path through which the frame passes is a path in which the self equipment is an end point (the core network is connected to the access network via the self equipment) (F1004 to F1007), the CCM frame is terminated. An analysis process of reception circumstances of the CCM frame after the termination is the same as described above, and thus repeated description thereof will be omitted (F1008). In addition, if the self equipment is not an end point, the CCM frame is transferred to another BHE which is an end point (F1009). At this time, in relation to a path in which the self equipment should be operated as relay equipment, an arrival interval of the CCM frame is confirmed, and a preliminary operation for handling failure detection and path switching is performed (F1006, F1007, and F1009).

If the CCM frame is confirmed in F1005 and F1006, it is confirmed in F1003 that the request frame is received from a correct path, and, then, it is detected that failures occur in the path, the BHE 171 is requested to perform path switching so as to use the standby path, thereby securing a communication path using the standby path 970-3 (F1004). Specifically, the BHE 171 is instructed to change the transfer table so as to receive an upward communication signal from the AE 112. This switching request frame (not shown) is generated by the frame generation unit 6230.

Further, in order to continuously perform uplink communication of the flow via the BHE 173, the path control unit 5100 sends an instruction frame so as to change the path information of the transfer table 5110 of the AE 112, thereby changing the communication from the AE 112 to the BHE 173. This process is performed using a system switching instruction frame 34002.

Figure 37:
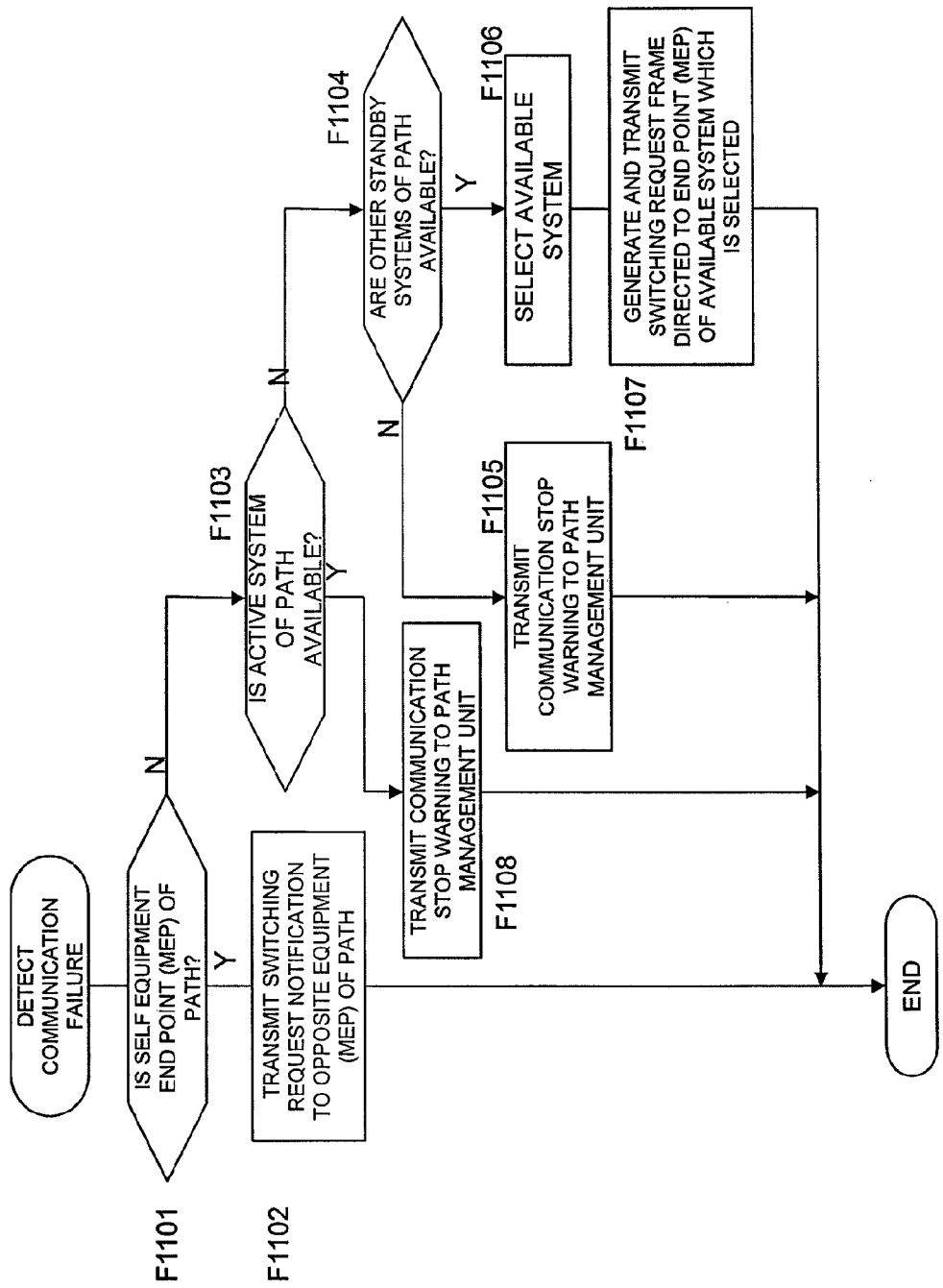
FIG. 37 is a flowchart illustrating procedures of a path switching process in the path control unit when the BHE 172 detects the failure 300-2.

FIG. 37 is a flowchart illustrating procedures of a path switching process in the path control unit when the BHE 172 detects the failure 300-2.

This process starts at a time point when a failure is detected. A location of the detected failure on a target path of the self equipment is confirmed in step F1101. If the equipment is an end point of the path, the path switching process described in FIGS. 1 to 32 is performed (F1102). Here, for example, a path switching request is transmitted to the AE 112 and the BHE 171, and thereby communication from the AE 112 to the self equipment is secured. The opposite equipment described in F1102 indicates the AE 112 in this case.

There is a high probability that the failure 300-1 may occur before the failure 300-2 in the path in which the self equipment is set as relay equipment. Therefore, first, it is checked whether or not the active path (the path 921 in the examples of FIGS. 32 and 33) is recovered (is in an available state) in relation to the path (F1103). If the path 921 is available, a path switch-back process F1108 is performed. Specifically, the AE 112 is instructed to change a sending path (from the path 922 to the path 921) of an uplink signal, and, further, the BHE 171 is instructed to change a reception path so as to receive a frame from the AE 112.

In a case where the active system path 921 is not recovered at the time point when the failure 300-2 occurs, other paths are selected (F1104). In this case, since a third path passing through the BHE 173 is available, the BHE 173 which is relay equipment of an available path and the AE 112 which is a transmission source of an uplink signal are respectively instructed to change a reception path and a transmission path in steps F1106 and F1107. In addition, if other standby systems cannot be selected in step F1104, a communication stop warning is transmitted to the path control unit (F1105).

The invention claimed is:

1. A communication network system comprising:
a plurality of edge equipments (AEs) on an access line side that accommodate an access line; and
a plurality of backhaul edge equipments (BHEs) connected to a network side,
wherein each of the BHEs
is located at a top of a tree structure formed in a relay network including the plurality of AEs, and includes communication paths with the plurality of AEs;
includes an intercommunication path through which a data signal does not flow in a normal operation and the data signal is mutually transmitted and received as a traffic accommodation path in an emergency between each of the plurality of BHEs, each of which is at the top of the tree structure; and
includes a BHE transfer table which stores in advance a correlation between an input communication path and an output communication path, and an inter-BHE path table which stores in advance a correlation between an input communication path and an output communication path in the intercommunication path,
wherein each of the plurality of AEs
has communication paths for the plurality of BHEs, and is connected to the plurality of BHEs in advance via paths independent from one another;
sets an active system path for one of the plurality of BHEs which are tops of a plurality of tree structures to which the self AE belongs, and sets a standby system path for one or a plurality of BHEs among the other BHEs;
wherein
the AE, in a normal operation state, receives data communication from a first BHE, and periodically receives a connection checking frame for checking normality of a communication path in order to monitor communication circumstances of a first communication path between the AE and the first BHE;
the AE determines that a failure occurs in the first communication path when a subsequent connection checking frame is not received until a specific time has elapsed; and
the AE sends a path switching request frame to a second BHE using a second communication path with the second BHE in which abnormality is not recognized on the communication path,
wherein,
when the second BHE receives the path switching request frame transmitted by the AE,
the second BHE recognizes that some sort of problem which disrupts continuous communication between the AE and the first BHE occurs;
the second BHE makes the second communication path connected between the AE and the second BHE valid as a main signal path in a second BHE transfer table in the second BHE, sets a communication path directed to the AE using the intercommunication path connecting the first BHE and the second BHE for a downlink signal to the AE, and changes settings so as to set a transmission path by the intercommunication path for an uplink signal from the AE; and the second BHE further transmits a transfer request frame for accommodating communication which is directed to the AE from the first BHE in the intercommunication path, to the first BHE, wherein, when the first BHE receives the transfer request frame from the second BHE, the first BHE changes settings in the first BHE transfer table in the first BHE so as to switch a path, which receives an uplink signal from the AE, from the first communication path to the intercommunication path; and the first BHE further changes settings in the first BHE transfer table so as to transfer a downlink signal directed to the AE received from the network to the intercommunication path, in relation to the downlink signal to the AE which has been transferred using the first communication path connecting the first BHE to the AE, and wherein a sub-tree having a sub-tree structure in which the second BHE of a standby system by passing a failure point is placed as a top is built under the first BHE of an active system, and communication between the AE and the first BHE of the active system is relayed by a standby system path via the second BHE of the standby system.

2. The communication network system according to claim 1, wherein the AE completes transmission of the switching request frame after stopping or waiting for a user data frame process for a specific time, and resumes sending of user data frames which are accumulated in the AE during a switching process.

3. The communication network system according to claim 1, wherein, when a specific time has elapsed from a start of sending of the transfer request frame or an ACK signal for the transfer request frame is received from the first BHE, the second BHE confirms that information update of a second BHE transfer table and/or a second inter-BHE path table in the second BHE is completed, and then sends the ACK signal for notifying the AE of transfer preparation completion, and wherein, when the ACK signal is received, the AE changes a transmission destination from the first communication path to the second communication path from that point, and starts communication to the network via the second BHE.

4. The communication network system according to claim 1, wherein, when the transfer request frame is received from the second BHE, the first BHE sends an ACK signal for notifying the second BHE of transfer preparation completion, after path setting in the first BHE transfer table and/or the first inter-BHE path table in the first BHE is completed, wherein, when the ACK signal is confirmed, the second BHE transmits an ACK frame for notifying of preparation completion to the AE via the second communication path, and wherein, when the ACK frame is confirmed, the AE changes a transmission destination from the first communication path to the second communication path from that point, and starts communication to the network via the second BHE.

5. The communication network system according to claim 1, wherein the BHE transfer table and/or the inter-BHE path table correlate an input communication path with an output communication path, and further store identification information of active and standby or identification information of a failure in advance, and wherein, when arrival of a path switching request frame is recognized, the second BHE sets a flag of the identification information of active and standby or the identification information of a failure in standby system path information which is set in the second BHE transfer table and/or the second inter-BHE path table in advance, and makes an entry of the intercommunication path valid to perform path switching on a targeted flow.

6. A communication network system comprising:

a plurality of edge equipments (AEs) on an access line side that accommodate an access line; and a plurality of backhaul edge equipments (BHEs) connected to a network side, wherein each of the BHEs is located at a top of a tree structure formed in a relay network including the plurality of AEs, and includes communication paths with the plurality of AEs;

includes an intercommunication path through which a data signal does not flow in a normal operation and the data signal is mutually transmitted and received as a traffic accommodation path in an emergency between each of the plurality of BHEs, each of which is at the top of the tree structure; and includes a BHE transfer table which stores in advance a correlation between an input communication path and an output communication path, and an inter-BHE path table which stores in advance a correlation between an input communication path and an output communication path in the intercommunication path, wherein each of the plurality of AEs has communication paths for the plurality of BHEs, and is connected to the plurality of BHEs in advance via paths independent from one another;

includes an AE transfer table which stores in advance a correlation between an input communication path and an output communication path, sets an active system path for one of the plurality of BHEs which are tops of a plurality of tree structures to which the self AE belongs, and sets a standby system path for one or a plurality of BHEs among the other BHEs;

wherein a first BHE, in a normal operation state, receives data communication from the AE, and periodically receives a connection checking frame for checking normality of a communication path in order to monitor communication circumstances of a first communication path between the AE and the first BHE;

the first BHE determines that a failure occurs in the first communication path when a subsequent connection checking frame is not received until a specific time has elapsed; and the first BHE sends a transfer request frame to a second BHE using an intercommunication path connected to the second BHE, wherein, when the second BHE receives the transfer request frame transmitted by the first BHE, the second BHE recognizes that some sort of problem which disrupts continuous communication between the AE and the first BHE occurs;

the second BHE makes the second communication path connected between the AE and the second BHE valid as a main signal path in a second BHE transfer table in the second BHE, sets a communication path directed to the AE using the intercommunication path connecting the first BHE and the second BHE for a downlink signal to the AE, and changes settings so as to set a transmission path by the intercommunication path for an uplink signal from the AE; and the second BHE further sends a switching instruction frame to the AE so as to switch an uplink signal sending path from the first communication path to a second communication path with the second BHE, in which abnormality is not recognized on the communication path, and wherein the AE changes settings in the AE transfer table so as to switch an uplink signal sending path from the first communication path to the second communication path with the second BHE, in which abnormality is not recognized on the communication path, when the switching instruction frame is received, and wherein, on the other hand, the first BHE changes settings in the first BHE transfer table in the first BHE so as to switch a path, which receives an uplink signal from the AE, from the first communication path to the intercommunication path; and the first BHE further changes settings in the first BHE transfer table so as to transfer a downlink signal directed to the AE received from the network to the intercommunication path, in relation to the downlink signal to the AE which has been transferred using the first communication path connecting the first BHE to the AE, and wherein a sub-tree having a sub-tree structure in which the second BHE of a standby system by passing a failure point is placed as a top is built under the first BHE of an active system, and communication between the AE and the first BHE of the active system is relayed by a standby system path via the second BHE of the standby system.

7. The communication network system according to claim 6, wherein, in a case where the AE has already been connected to the first BHE via the second communication path and the second BHE due to a failure regarding the first communication path connecting the AE to the first BHE, when the second BHE detects a failure regarding the second communication path according to stop of periodical reception of a connection checking frame which is transmitted from the AE to the second BHE, the second BHE sends a switching request frame to a third BHE using the intercommunication path, wherein, when the third BHE receives the switching request frame transmitted by the second BHE, the third BHE recognizes that some sort of problem which disrupts continuous communication between the AE and the second BHE occurs;

the third BHE makes the third communication path connected between the AE and the third BHE valid as the main signal path in a third BHE transfer table in the third BHE, sets a communication path directed to the AE using the intercommunication path connecting the first BHE and the third BHE for a downlink signal to the AE, and changes settings so as to set a transmission path by the intercommunication path for an uplink signal from the AE; and the third BHE further sends a switching instruction frame to the AE so as to switch an uplink signal sending path from the first communication path to a third communication path with the third BHE, in which abnormality is not recognized on the communication path, and wherein the AE changes settings in the AE transfer table so as to switch an uplink signal sending path from the first communication path to the second communication path with the second BHE, in which abnormality is not recognized on the communication path, when the switching instruction frame is received, and wherein, on the other hand, the first BHE changes settings in the first BHE transfer table in the first BHE so as to switch a path, which receives an uplink signal from the AE to the intercommunication path connected to the third BHE; and the first BHE further changes settings in the first BHE transfer table so as to transfer a downlink signal directed to the AE received from the network to the intercommunication path connected to the third BHE, in relation to the downlink signal to the AE, and wherein a sub-tree having a sub-tree structure in which the third BHE of a standby system by passing a failure point is placed as a top is built under the first BHE of an active system, and communication between the AE and the first BHE of the active system is relayed by a standby system path via the third BHE of the standby system.

8. A communication network configuration method using a communication network system comprising:

a plurality of edge equipments (AEs) on an access line side that accommodate an access line; and a plurality of backhaul edge equipments (BHEs) connected to a network side, wherein each of the BHEs being at a top of a tree structure formed in a relay network including the plurality of AEs, and including communication paths with the plurality of AEs;

including an intercommunication path through which a data signal does not flow in a normal operation and the data signal is mutually transmitted and received as a traffic accommodation path in an emergency between each of the plurality of BHEs, each of which is at the top of the tree structure; and including a BHE transfer table which stores in advance a correlation between an input communication path and an output communication path, and an inter-BHE path table storing in advance a correlation between an input communication path and an output communication path in the intercommunication path, wherein each of the plurality of AEs providing communication paths for the plurality of BHEs, and is connected to the plurality of BHEs in advance via paths independent from one another;

setting an active system path for one of the plurality of BHEs which are tops of a plurality of tree structures to which the self AE belongs, and setting a standby system path for one or a plurality of BHEs among the other BHEs;

wherein the AE, in a normal operation state, receiving data communication from a first BHE, and periodically receives a connection checking frame for checking normality of a communication path in order to monitor communication circumstances of a first communication path between the AE and the first BHE;

the AE determining that a failure occurs in the first communication path when a subsequent connection checking frame is not received until a specific time has elapsed; and the AE sending a path switching request frame to a second BHE using a second communication path with the second BHE in which abnormality is not recognized on the communication path, wherein, when the second BHE receives the path switching request frame transmitted by the AE, the second BHE recognizing that some sort of problem which disrupts continuous communication between the AE and the first BHE occurs;

the second BHE causing the second communication path connected between the AE and the second BHE valid as a main signal path in a second BHE transfer table in the second BHE, setting a communication path directed to the AE using the intercommunication path connecting the first BHE and the second BHE for a downlink signal to the AE, and changing settings so as to set a transmission path by the intercommunication path for an uplink signal from the AE; and the second BHE further transmitting a transfer request frame for accommodating communication which is directed to the AE from the first BHE in the intercommunication path, to the first BHE, wherein, when the first BHE receives the transfer request frame from the second BHE, the first BHE changing settings in the first BHE transfer table in the first BHE so as to switch a path, which receives an uplink signal from the AE, from the first communication path to the intercommunication path; and the first BHE further changing settings in the first BHE transfer table so as to transfer a downlink signal directed to the AE received from the network to the intercommunication path, in relation to the downlink signal to the AE which has been transferred using the first communication path connecting the first BHE to the AE, and wherein a sub-tree having a sub-tree structure in which the second BHE of a standby system by passing a failure point being placed as a top is built under the first BHE of an active system, and communicating between the AE and the first BHE of the active system is relayed by a standby system path via the second BHE of the standby system.

9. A communication network configuration method using a communication network system comprising:

a plurality of edge equipments (AEs) on an access line side that accommodate an access line; and a plurality of backhaul edge equipments (BHEs) connected to a network side, wherein each of the BHEs being at a top of a tree structure formed in a relay network including the plurality of AEs, and including communication paths with the plurality of AEs;

including an intercommunication path through which a data signal does not flow in a normal operation and the data signal is mutually transmitted and received as a traffic accommodation path in an emergency between each of the plurality of BHEs, each of which is at the top of the tree structure; and including a BHE transfer table which stores in advance a correlation between an input communication path and an output communication path, and an inter-BHE path table storing in advance a correlation between an input communication path and an output communication path in the intercommunication path, wherein each of the plurality of AEs providing communication paths for the plurality of BHEs, and is connected to the plurality of BHEs in advance via paths independent from one another;

including an AE transfer table storing in advance a correlation between an input communication path and an output communication path, setting an active system path for one of the plurality of BHEs which are tops of a plurality of tree structures to which the self AE belongs, and setting a standby system path for one or a plurality of BHEs among the other BHEs;

wherein a first BHE, in a normal operation state, receiving data communication from the AE, and periodically receives a connection checking frame for checking normality of a communication path in order to monitor communication circumstances of a first communication path between the AE and the first BHE;

the first BHE determining that a failure occurs in the first communication path when a subsequent connection checking frame is not received until a specific time has elapsed; and the first BHE sending a transfer request frame to a second BHE using an intercommunication path connected to the second BHE, wherein, when the second BHE receiving the transfer request frame transmitted by the first BHE, the second BHE recognizing that some sort of problem which disrupts continuous communication between the AE and the first BHE occurs;

the second BHE causing the second communication path connected between the AE and the second BHE valid as a main signal path in a second BHE transfer table in the second BHE, setting a communication path directed to the AE using the intercommunication path connecting the first BHE and the second BHE for a downlink signal to the AE, and changing settings so as to set a transmission path by the intercommunication path for an uplink signal from the AE; and the second BHE further sending a switching instruction frame to the AE so as to switch an uplink signal sending path from the first communication path to a second communication path with the second BHE, in which abnormality is not recognized on the communication path, and wherein the AE changing settings in the AE transfer table so as to switch an uplink signal sending path from the first communication path to the second communication path with the second BHE, in which abnormality is not recognized on the communication path, when the switching instruction frame is received, and wherein, on the other hand, the first BHE changing settings in the first BHE transfer table in the first BHE so as to switch a path, receiving an uplink signal from the AE, from the first communication path to the intercommunication path; and the first BHE further changing settings in the first BHE transfer table so as to transfer a downlink signal directed to the AE received from the network to the intercommunication path, in relation to the downlink signal to the AE which has been transferred using the first communication path connecting the first BHE to the AE, and wherein a sub-tree having a sub-tree structure in which the second BHE of a standby system by passing a failure point being placed as a top is built under the first BHE of an active system, and communicating between the AE and the first BHE of the active system is relayed by a standby system path via the second BHE of the standby system.

10. The communication network configuration method according to claim 9,
wherein, in a case where the AE has already been connected to the first BHE via the second communication path and the second BHE due to a failure regarding the first communication path connecting the AE to the first BHE,
when the second BHE detects a failure regarding the second communication path according to stop of periodical reception of a connection checking frame which is transmitted from the AE to the second BHE,
the second BHE sends a switching request frame to a third BHE using the intercommunication path,
wherein,
when the third BHE receives the switching request frame transmitted by the second BHE,
the third BHE recognizes that some sort of problem which disrupts continuous communication between the AE and the second BHE occurs;
the third BHE makes the third communication path connected between the AE and the third BHE valid as the main signal path in a third BHE transfer table in the third BHE, sets a communication path directed to the AE using the intercommunication path connecting the first BHE and the third BHE for a downlink signal to the AE, and changes settings so as to set a transmission path by the intercommunication path for an uplink signal from the AE; and
the third BHE further sends a switching instruction frame to the AE so as to switch an uplink signal sending path from the first communication path to a third communication path with the third BHE, in which abnormality is not recognized on the communication path, and
wherein the AE changes settings in the AE transfer table so as to switch an uplink signal sending path from the first communication path to the second communication path with the second BHE, in which abnormality is not recognized on the communication path, when the switching instruction frame is received, and
wherein,
on the other hand, the first BHE changes settings in the first BHE transfer table in the first BHE so as to switch a path, which receives an uplink signal from the AE to the intercommunication path connected to the third BHE; and
the first BHE further changes settings in the first BHE transfer table so as to transfer a downlink signal directed to the AE received from the network to the intercommunication path connected to the third BHE, in relation to the downlink signal to the AE, and
wherein a sub-tree having a sub-tree structure in which the third BHE of a standby system by passing a failure point is placed as a top is built under the first BHE of an active system, and communication between the AE and the first BHE of the active system is relayed by a standby system path via the third BHE of the standby system.

* * * * *